United States Patent
Balent (12)

(10) Patent No.: US 7,797,204 B2
(45) Date of Patent: Sep. 14, 2010

(54) DISTRIBUTED PERSONAL AUTOMATION AND SHOPPING METHOD, APPARATUS, AND PROCESS

(76) Inventor: Bruce F. Balent, P.O. Box 8324, Long Beach, CA (US) 90808

( * ) Notice: Subject to any disclaimer, the term of this patent is extended or adjusted under 35 U.S.C. 154(b) by 1506 days.

(21) Appl. No.: 10/315,905

(22) Filed: Dec. 9, 2002

(65) Prior Publication Data

US 2003/0158796 A1    Aug. 21, 2003

Related U.S. Application Data

(60) Provisional application No. 60/339,166, filed on Dec. 8, 2001.

(51) Int. Cl.
*G06Q 10/00* (2006.01)
*G06F 17/60* (2006.01)
(52) U.S. Cl. .......................................... 705/28; 705/26
(58) Field of Classification Search .................. 705/14, 705/26, 28
See application file for complete search history.

(56) References Cited

U.S. PATENT DOCUMENTS 5,903,454 A * 5/1999 Hoffberg et al. .............. 700/83
6,400,996 B1 * 6/2002 Hoffberg et al. .............. 700/83
6,850,252 B1 * 2/2005 Hoffberg ..................... 715/716
7,406,436 B1 * 7/2008 Reisman ...................... 705/10
2001/0014868 A1 * 8/2001 Herz et al. .................... 705/14
2003/0093334 A1 * 5/2003 Barzilay ....................... 705/26
2003/0220841 A1 * 11/2003 Maritzen ..................... 705/26

OTHER PUBLICATIONS

Cambar Software Announces Strategic Partnership with Kewill Systems, Business Editors/High Tech Writers. Business Wire. New York: Nov. 19, 2001. p. 1.*

* cited by examiner

*Primary Examiner*—Matthew S Gart
*Assistant Examiner*—Garcia Ade
(74) *Attorney, Agent, or Firm*—Marcia A. Devon

(57) ABSTRACT

A business method utilizing a system comprising one or more distributed computers, application software, off-the-shelf peripheral components including keyboard-and-mouseless data entry (KDE) devices, business processes, human and KDE device readable data, related information on removable data storage media or available from external databases, and existing communications systems for speeding and improving: 1) personal or business automation, efficiency and productivity, goal attainment; 2) improving, speeding and automating the person-computer interface; 3) selection, acquisition, and tracking usage of items acquired from an existing supply chain; 4) marketing items and retaining customers buying the products, controlling their usage, and disseminating information about the products.

9 Claims, 26 Drawing Sheets

Overall Architecture As Data Flow Diagram (DFD)

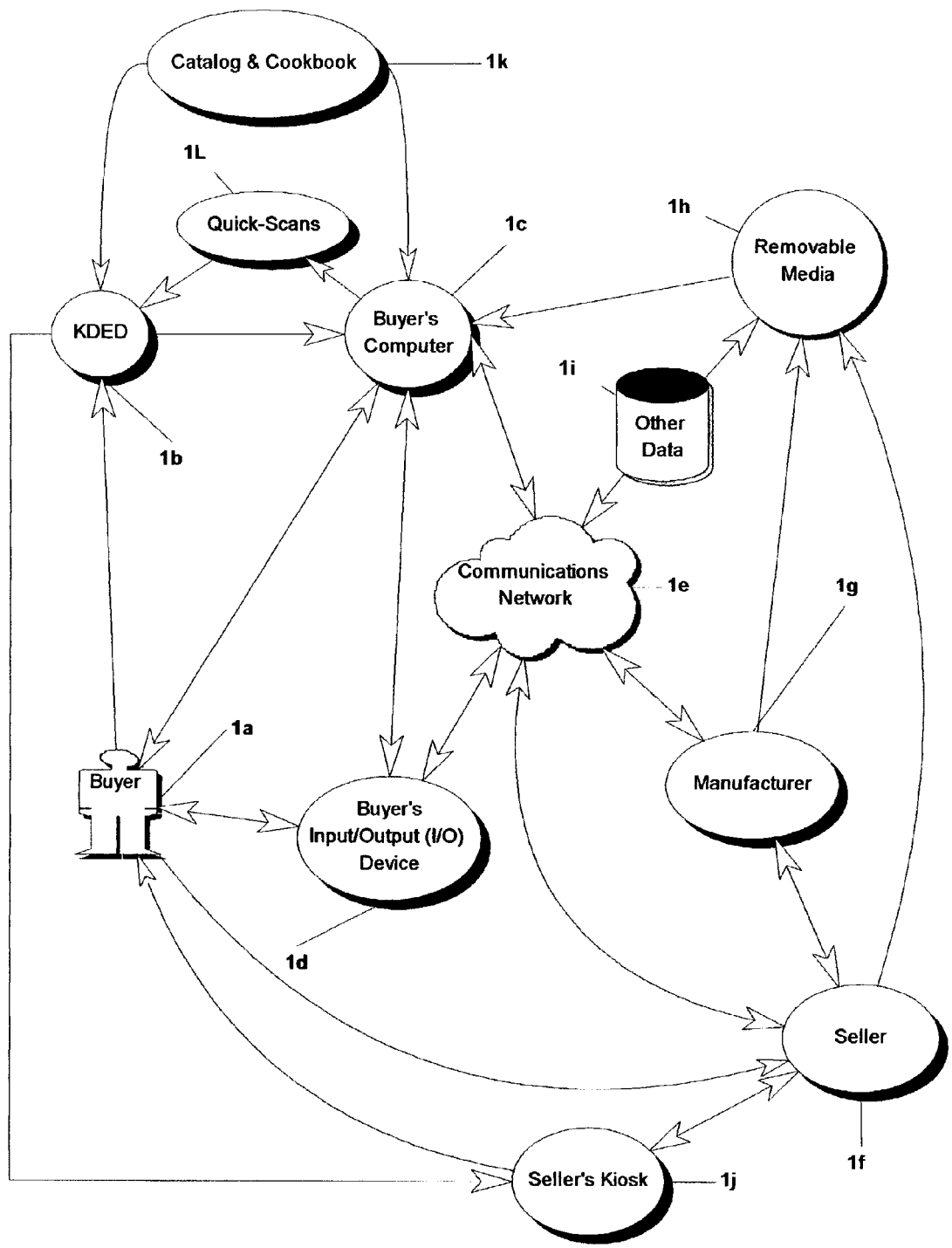
FIG. 1—Overall Architecture As Data Flow Diagram (DFD)

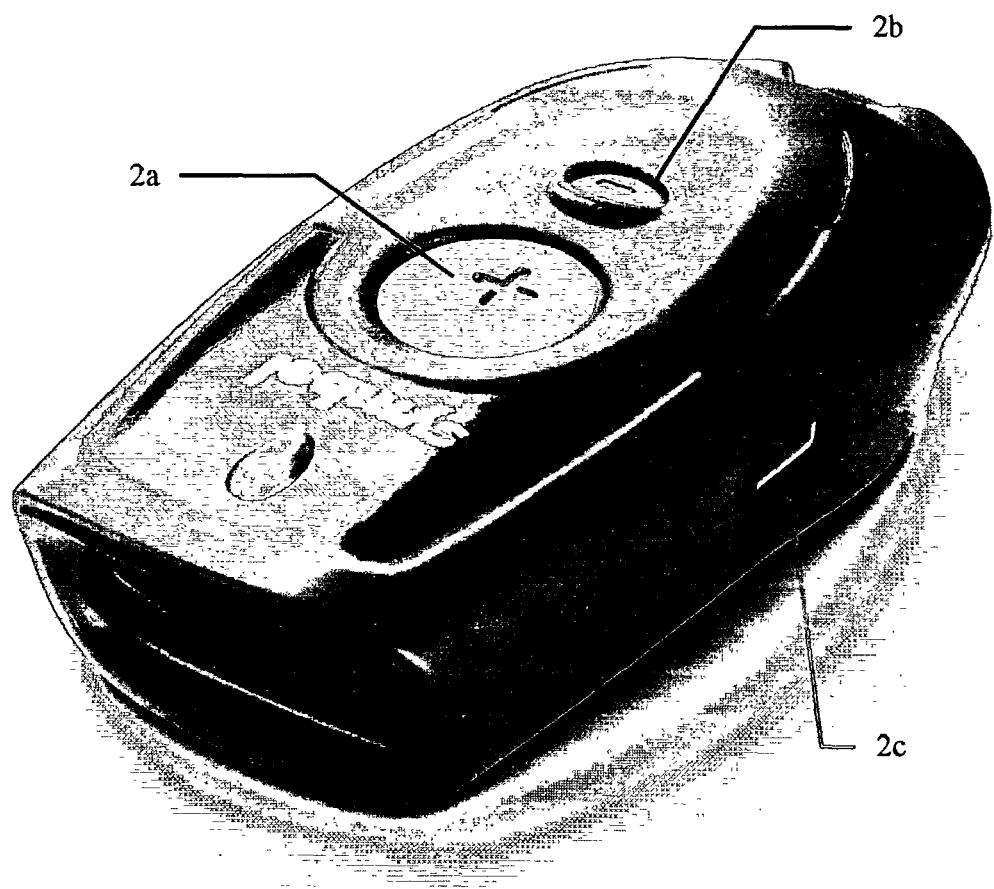
FIG. 2—KDED Preferred Embodiment: Symbol CS1504 Consumer Memory Scanner

FIG. 3—Additional Preferred Embodiment: I/O Capable KDED}
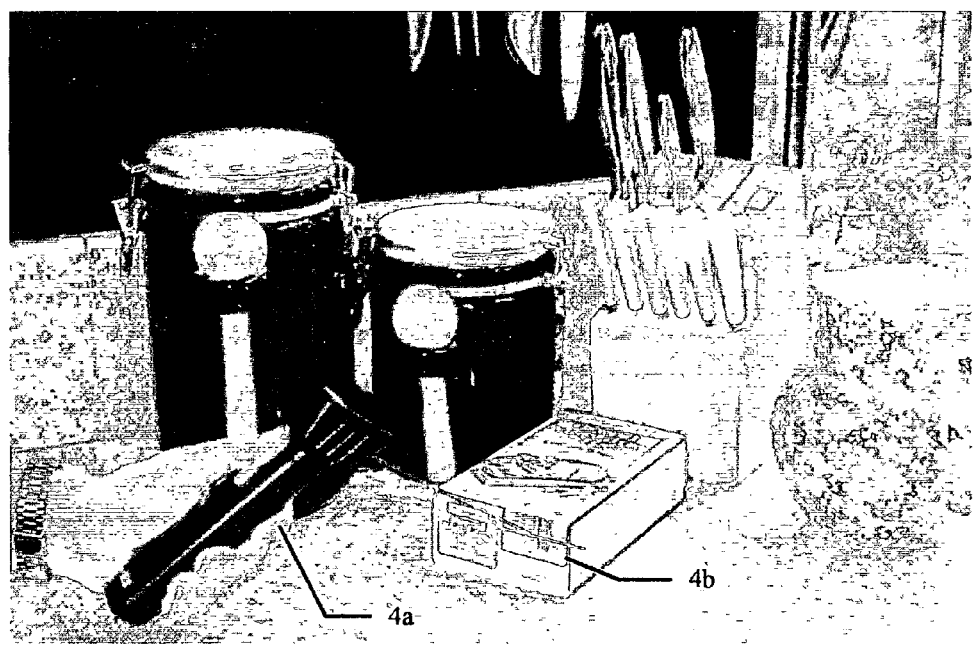
FIG. 4—Alternate Embodiment: KDED, Videx LaserLite Scanner

FIG. 5—KDED Used For Point-Of-Consumption Selection Via UPC Barcode
FIG. 6—Preferred Embodiment: Barcoded Catalog Of Groceries

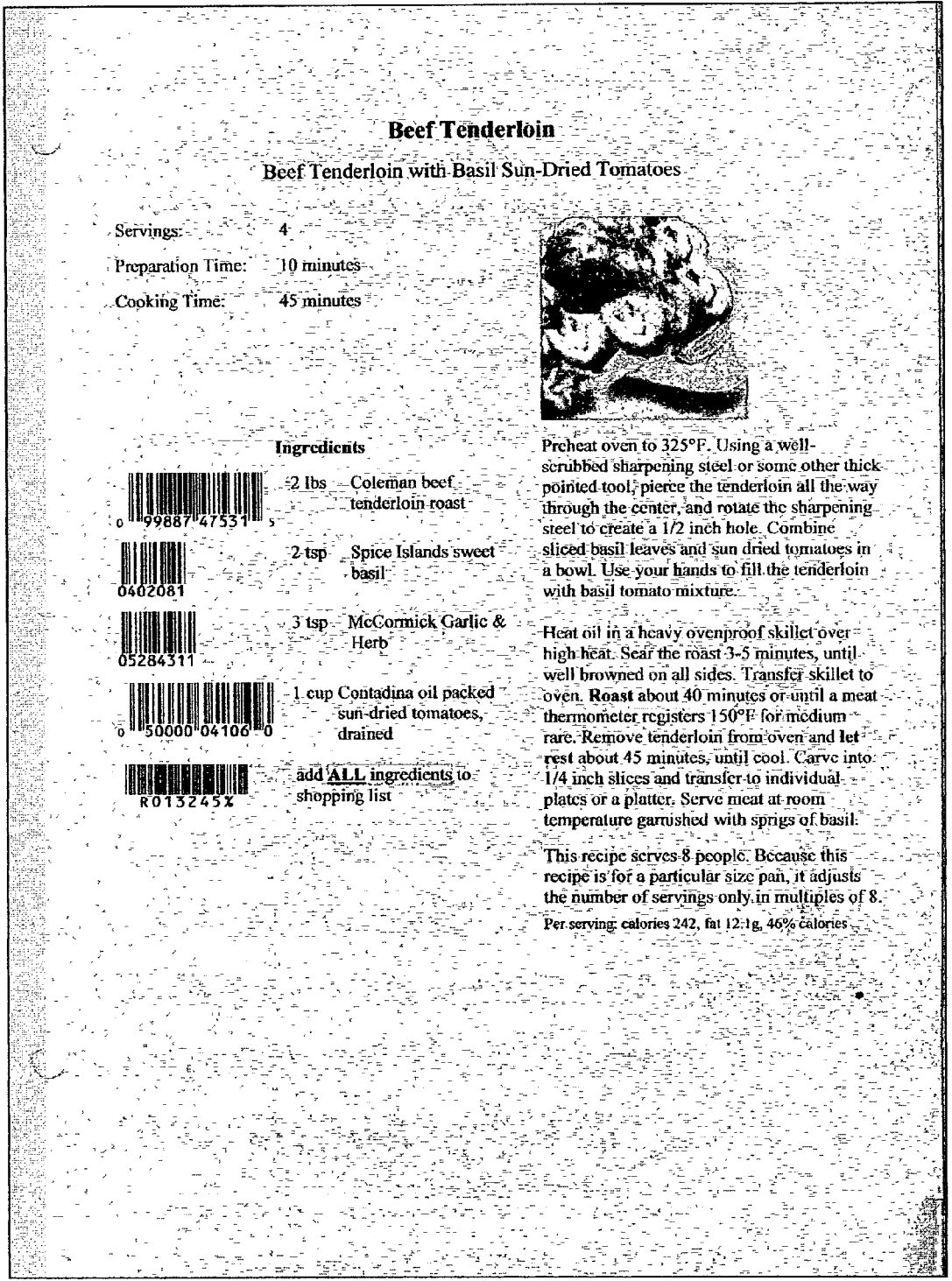
FIG. 7—Preferred Embodiment: Sample Recipe Page

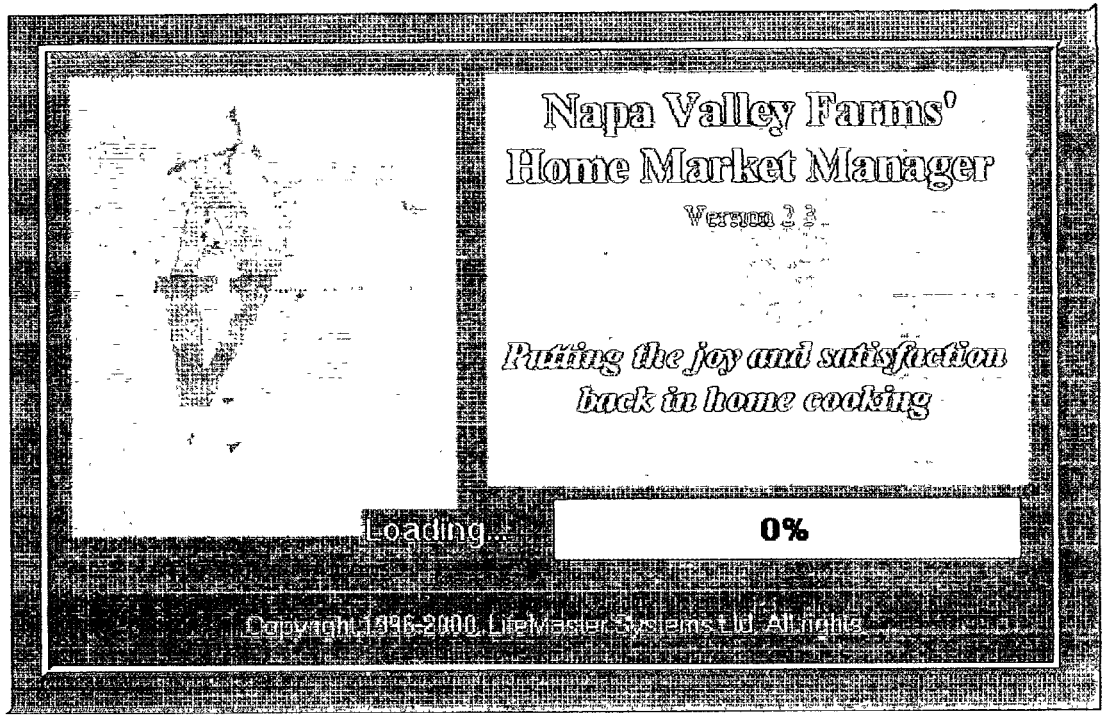
FIG. 8—Preferred Embodiment: Application Title Screen
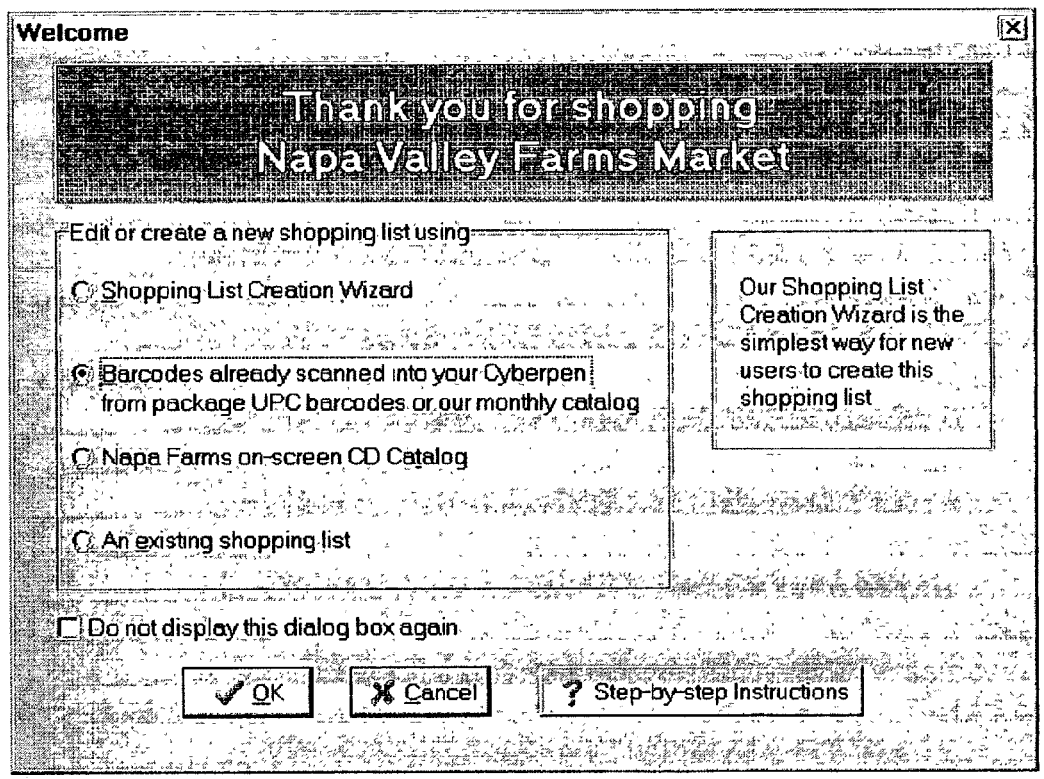
FIG. 9—Wizard Window Of Software

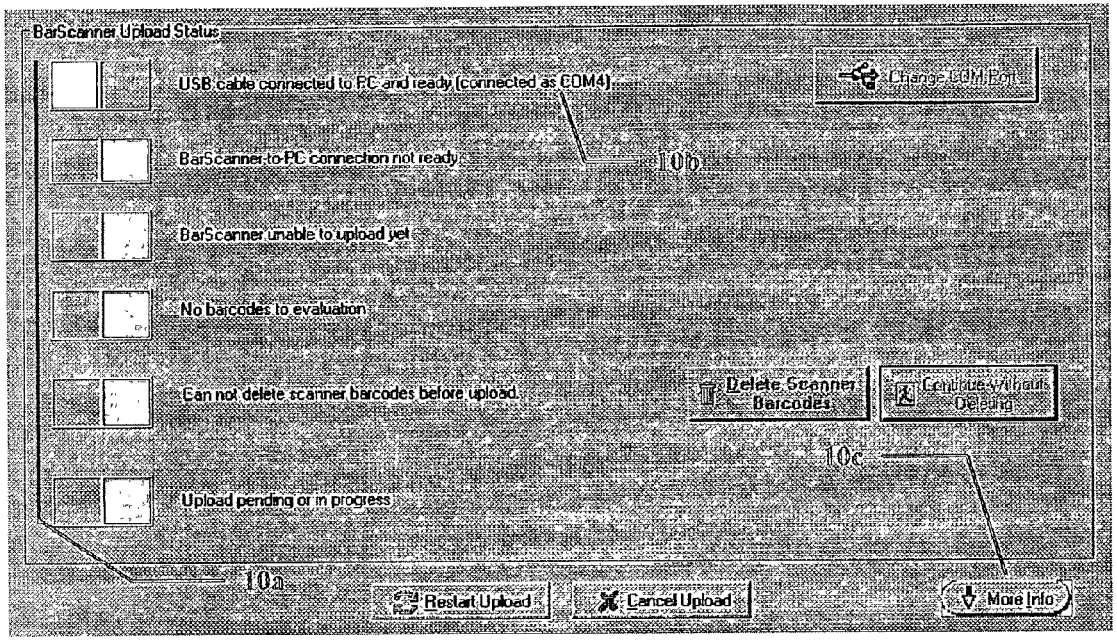
FIG. 10—Preferred Embodiment, KDE Device Uploading
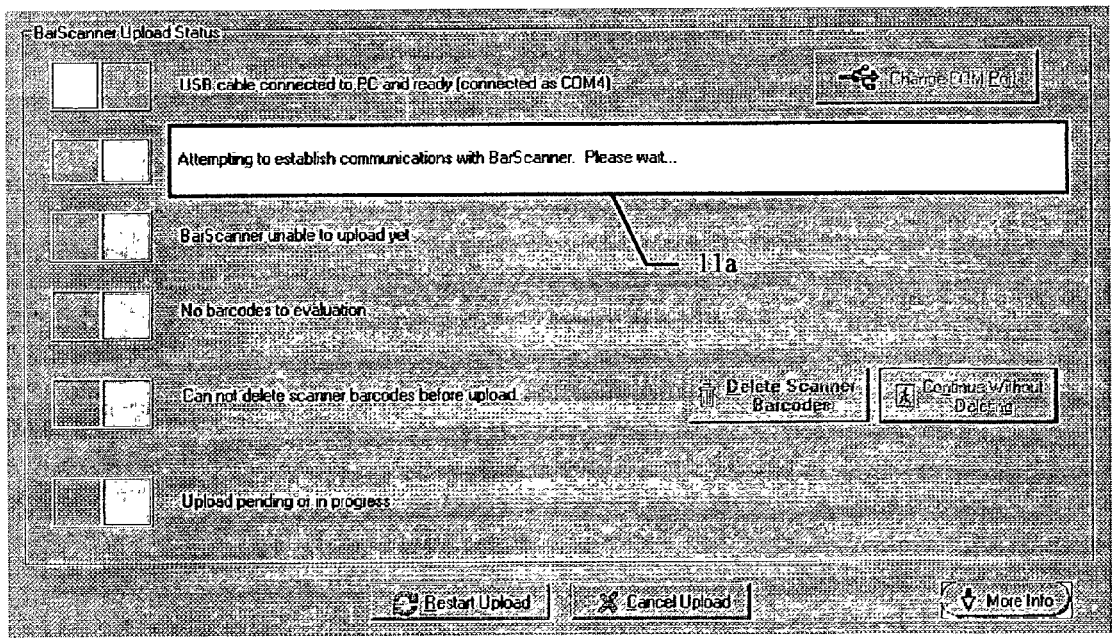
FIG. 11—Preferred Embodiment, KDE Device Uploading (con't)

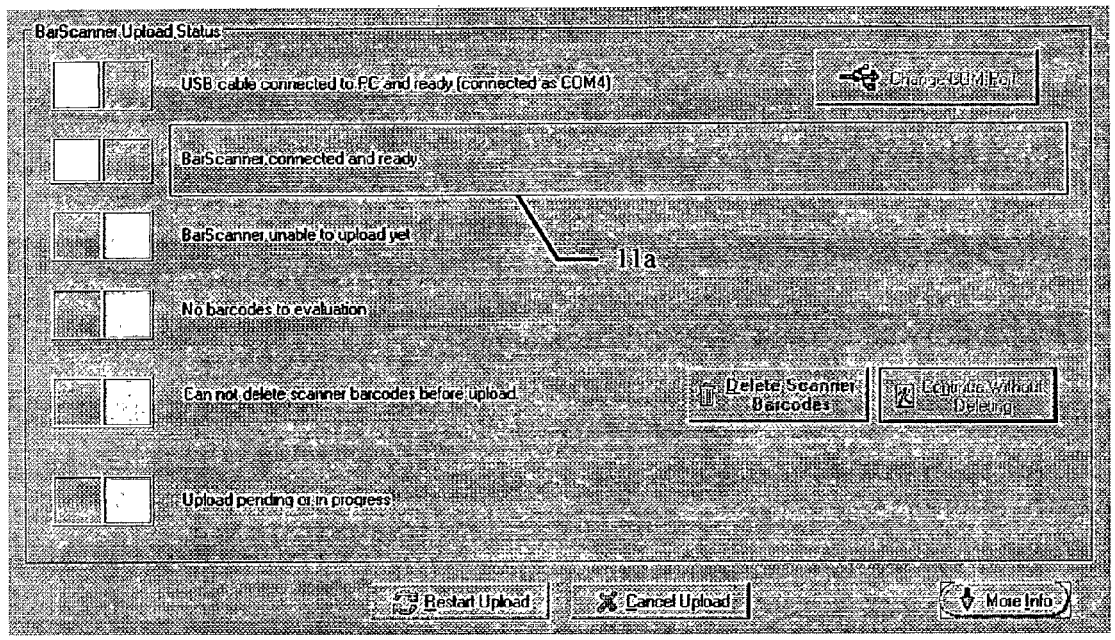
FIG. 12—Preferred Embodiment, KDE Device Uploading (con't)
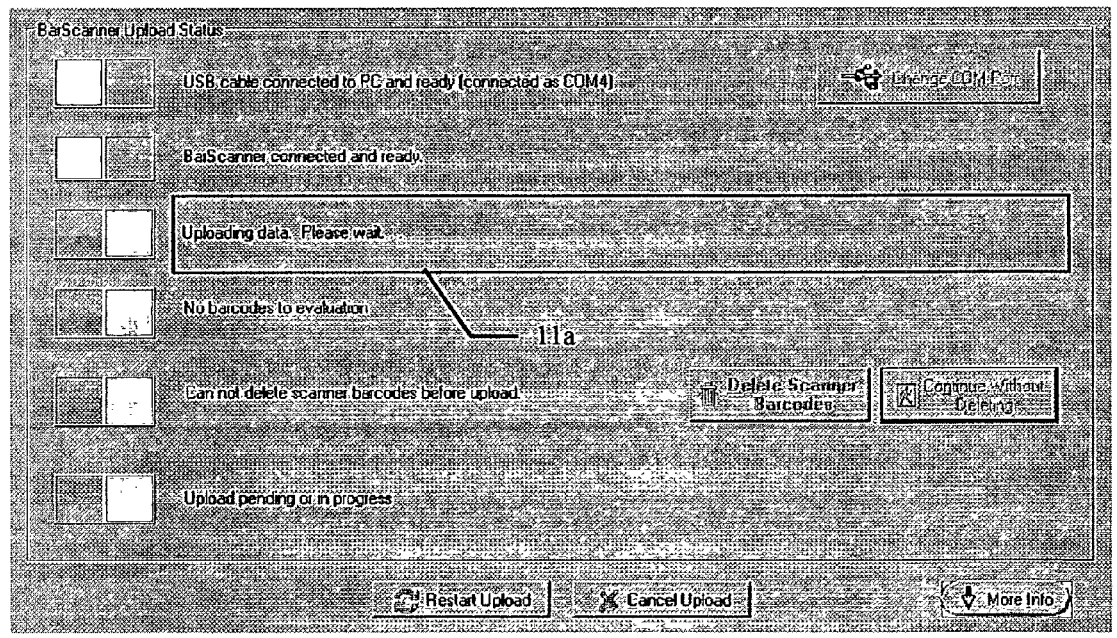
FIG. 13—Preferred Embodiment, KDE Device Uploading (con't)

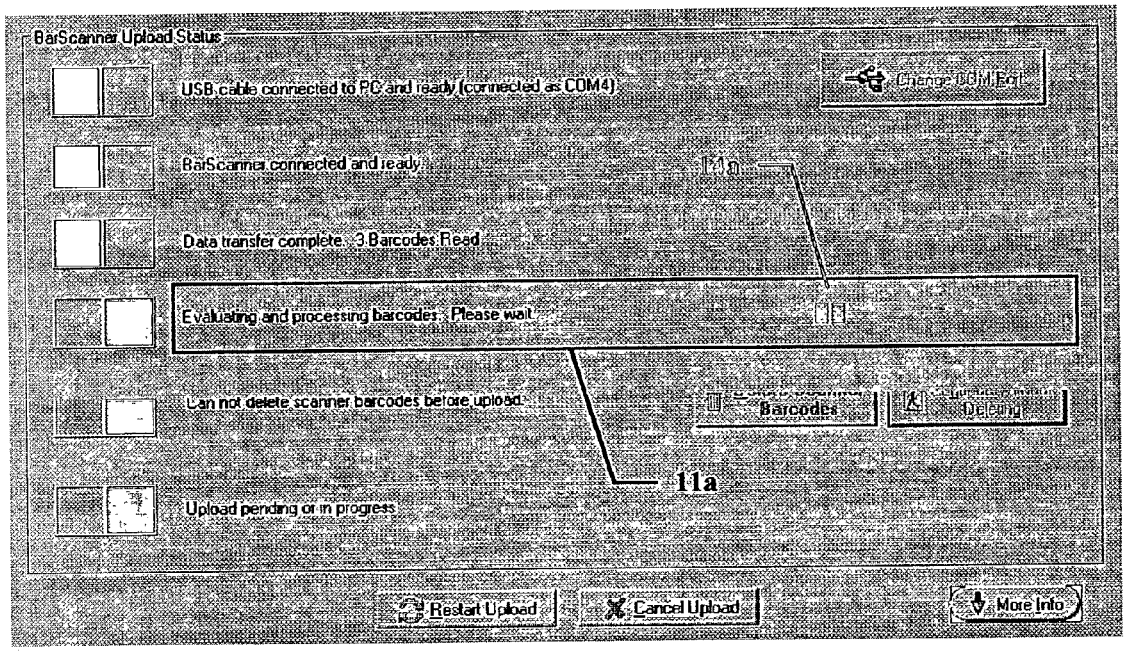
FIG. 14—Preferred Embodiment, KDE Device Uploading (con't)
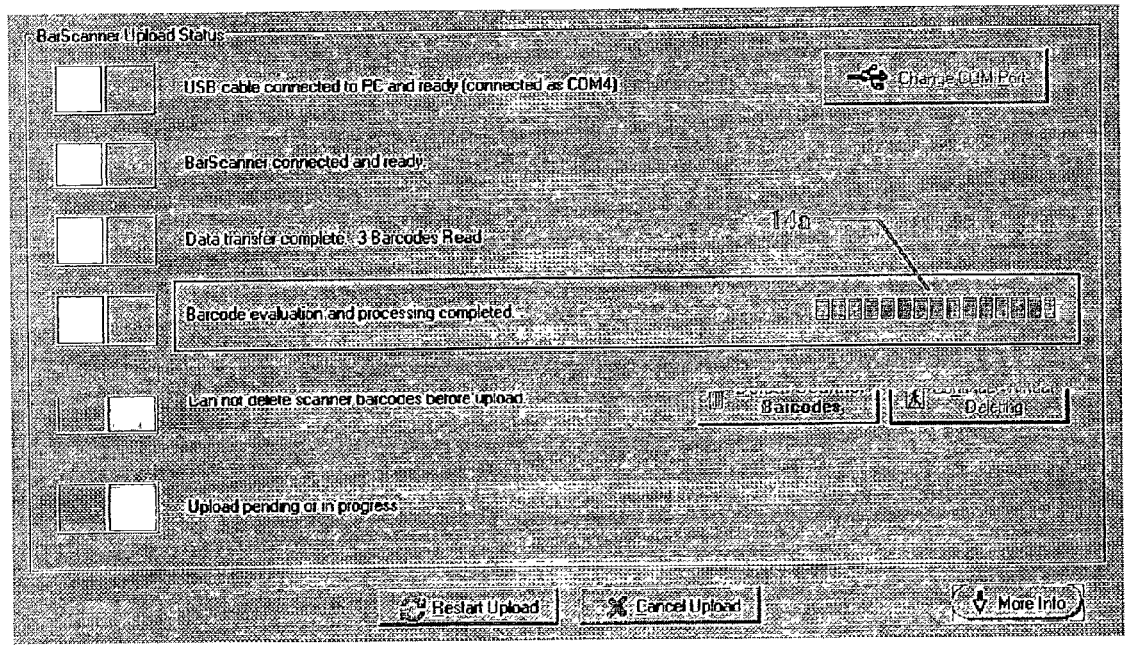
FIG. 15—Preferred Embodiment, KDE Device Uploading (con't)

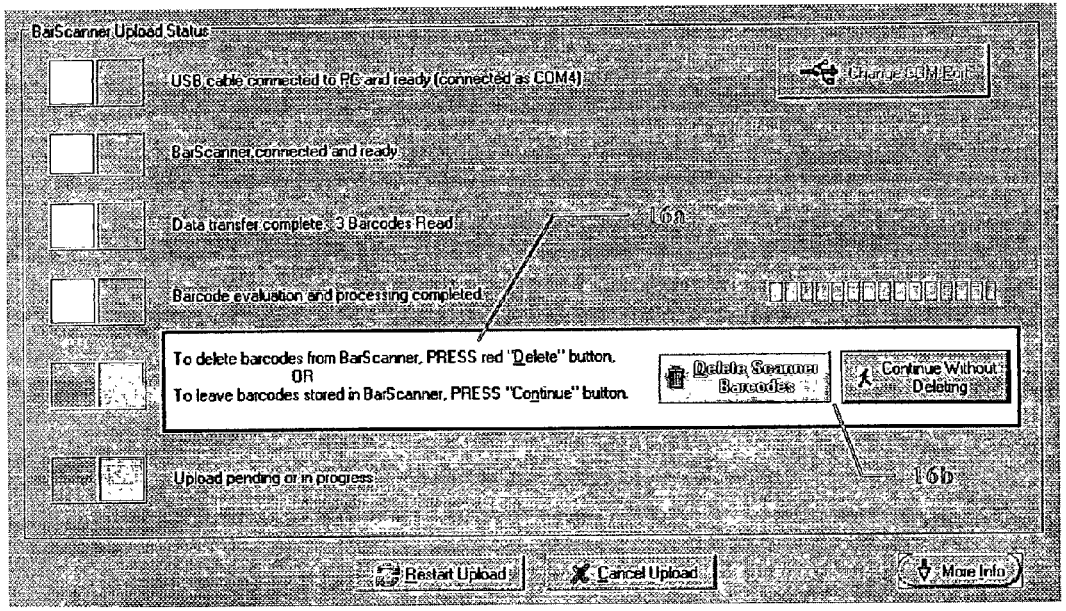
FIG. 16—Preferred Embodiment, KDE Device Uploading (con't)
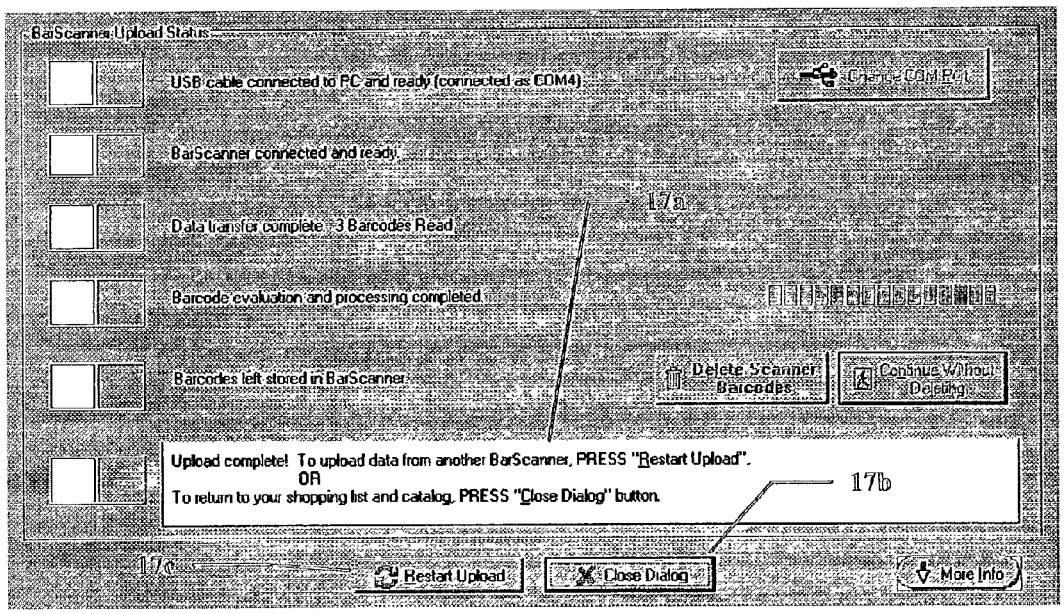
FIG. 17—Preferred Embodiment, KDE Device Uploading Completed

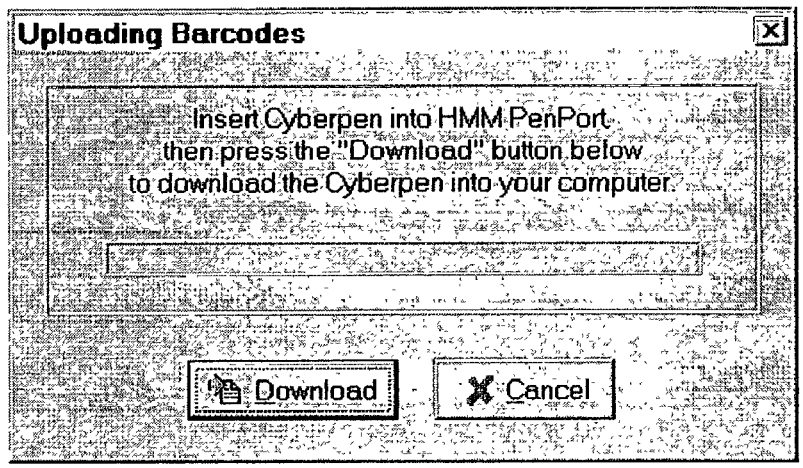
FIG. 18—Alternate Embodiment KDE Device Upload Dialog
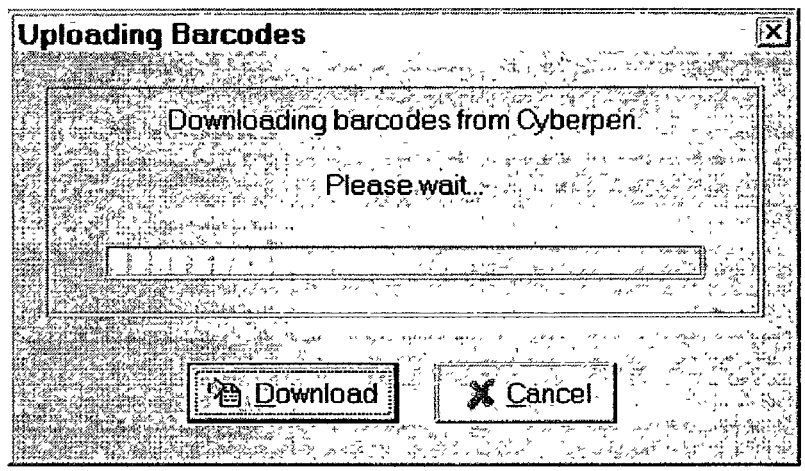
FIG. 19—Alternate Embodiment, KDE Device Upload Progress
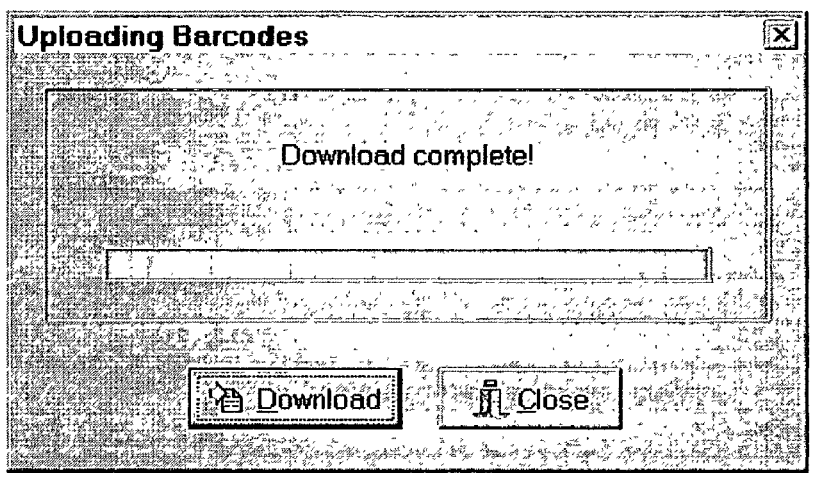
FIG. 20—Alternate Embodiment, KDE Device Upload Complete

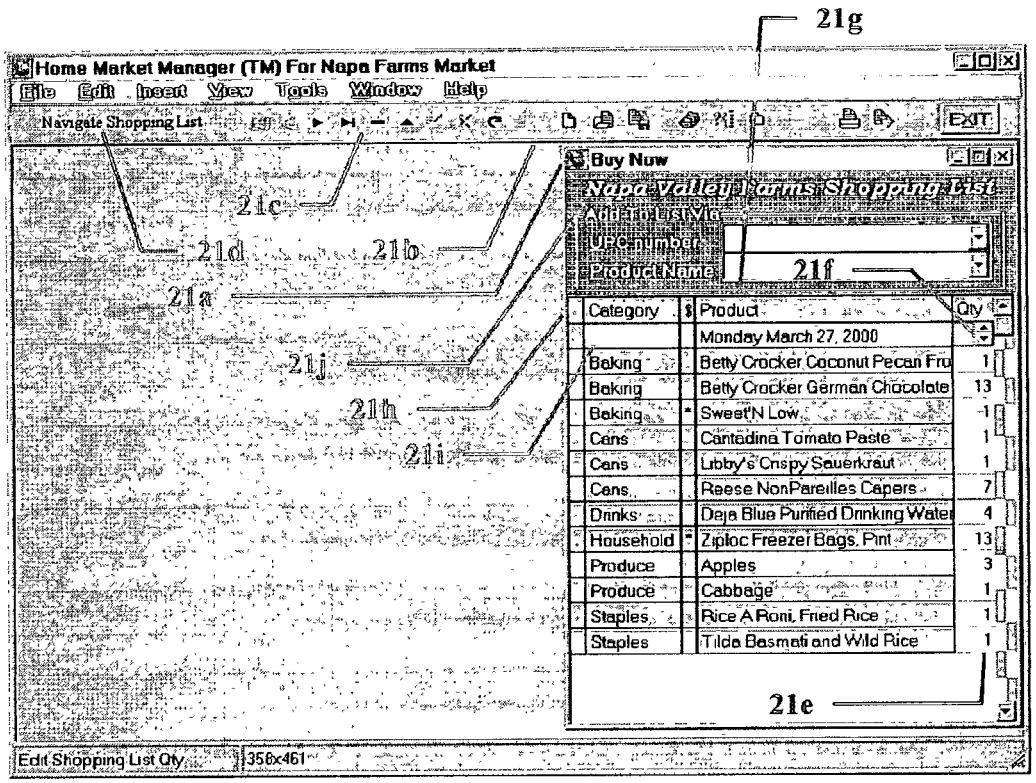
FIG. 21—Preferred Embodiment, Onscreen List After KDE Device Upload

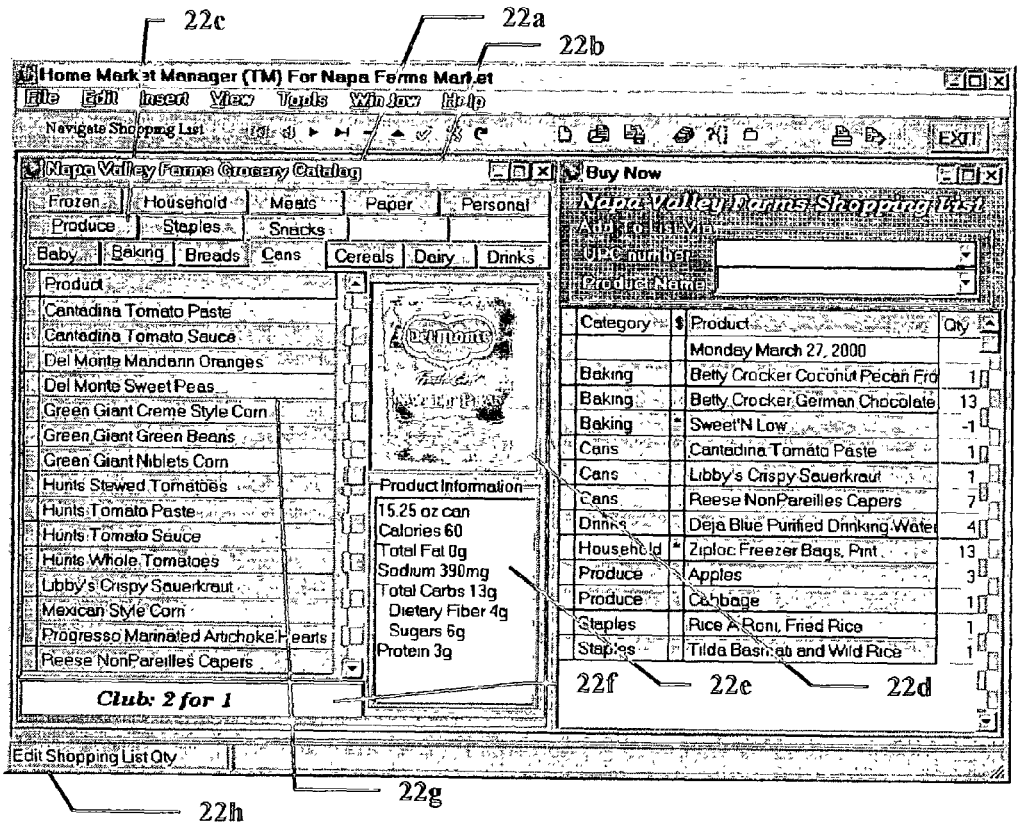
FIG. 22—Preferred Embodiment, CD Catalog Window

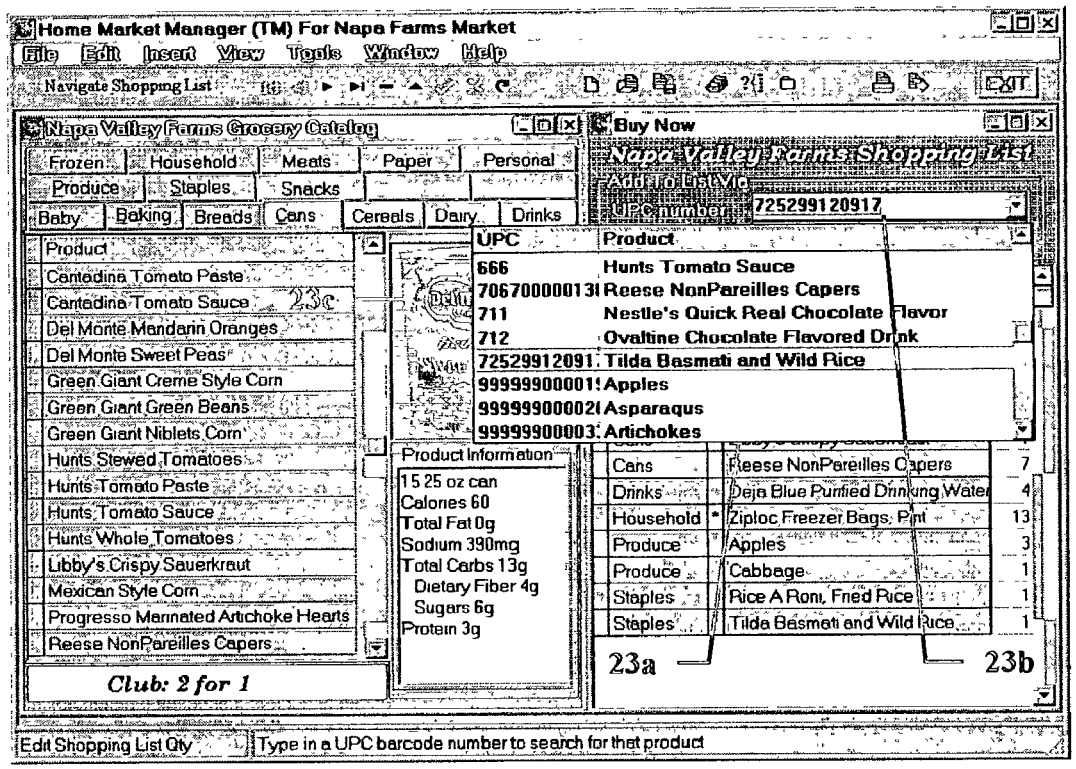
FIG. 23—Preferred Embodiment, Adding Items Via UPC Progressive Search
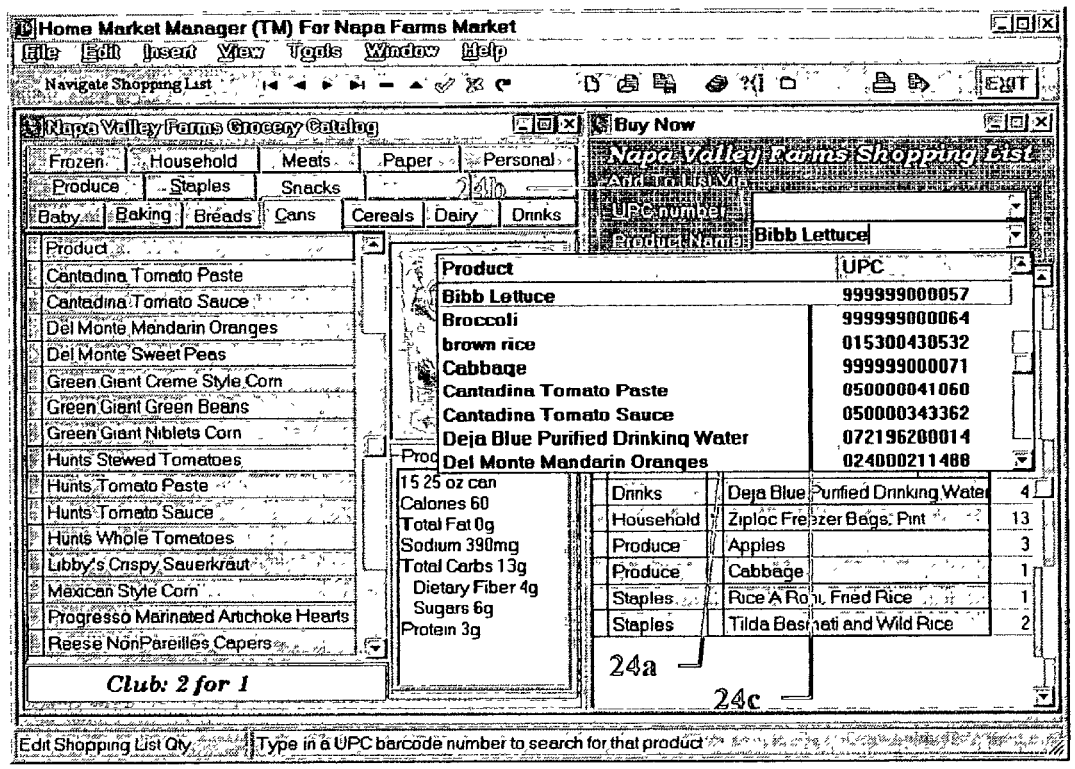
FIG. 24—Preferred Embodiment, Adding Items Via Produce Name Progressive Search

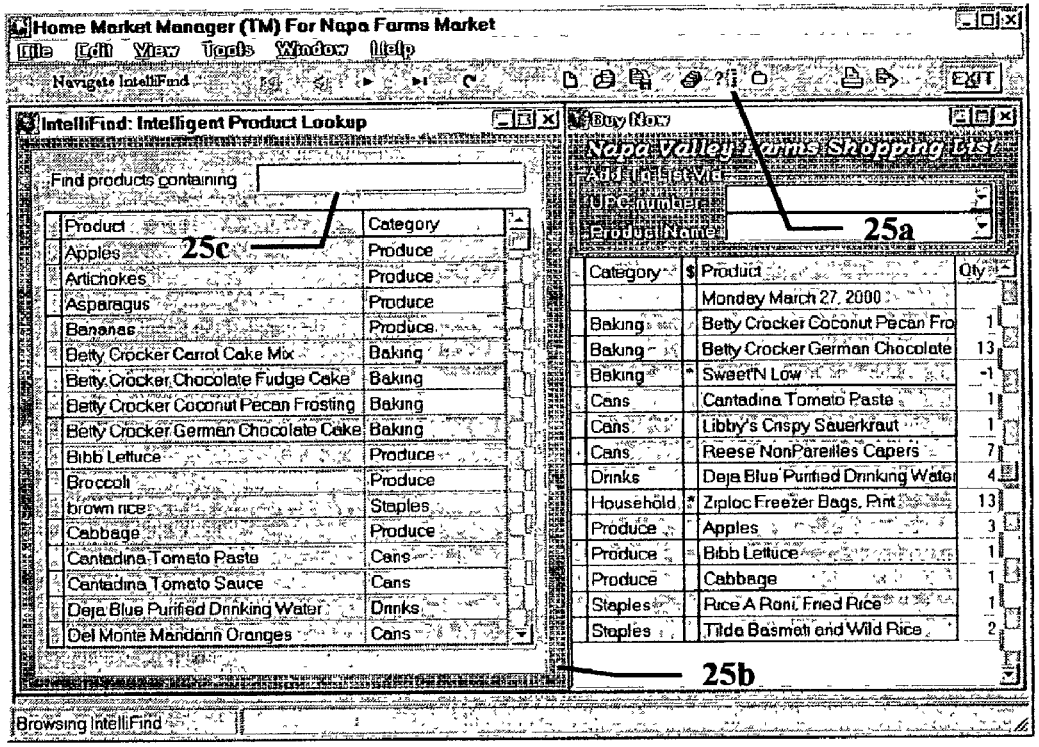
FIG. 25—Preferred Embodiment, IntelliFind Window For Searching All Categories
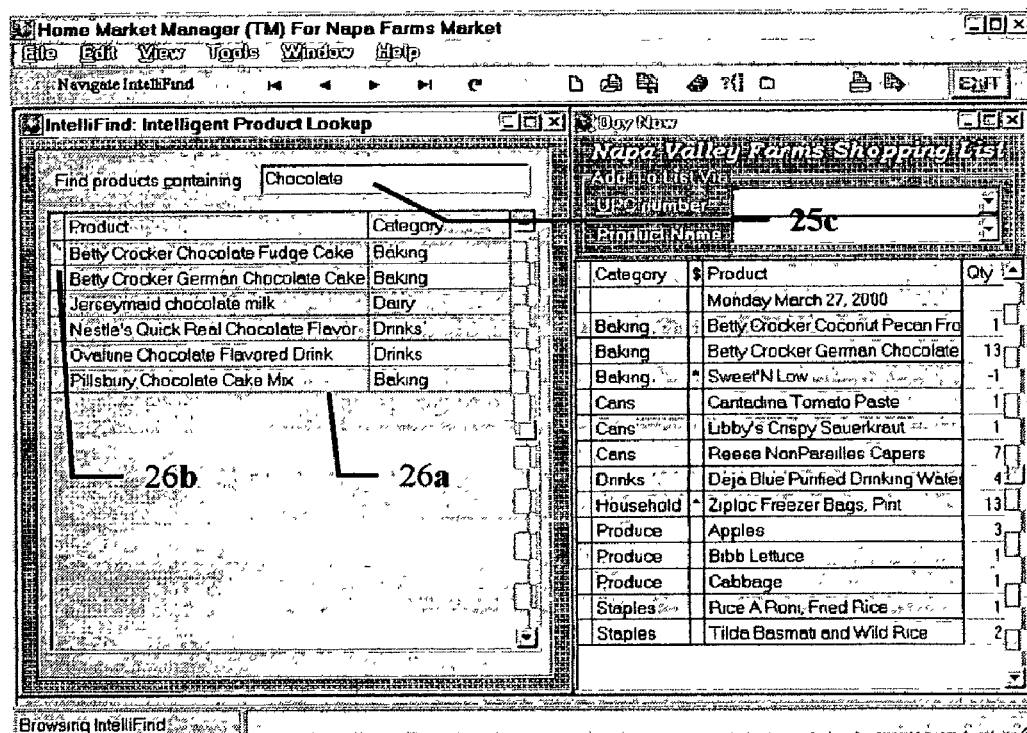
FIG. 26—Preferred Embodiment, Progressive Partial-Name Search Using IntelliFind

FIG. 27a—Preferred Embodiment, List For Self-Shopping

Shopping List

*Baking*
1 box Betty Crocker Coconut Pecan Frosting mix
1 box Betty Crocker German Chocolate Cake mix
1 box Betty Crocker Chocolate Fudge Cake mix
1 box, Sweet'N Low          COUPON!

*Canned Goods*
2, 6oz can, Contadina Tomato Paste
1, 8 oz can Libby's Crispy Sauerkraut
1, 15 ¼oz can, Del Monte Sweet Peas
1, 4 oz bottle, Reese NonPareilles Capers
6 bottles Deja Blue Purified Drinking Water

*Rice & Pasta*
1 box Fried Rice Flavor Rice A Roni
2 boxes Tilda Basmati and Wild Rice
1 bag Contadina linguine

*Household*
Right Side, Shelf 3
1 box, pint size Ziploc Freezer Bags   COUPON!

*Produce Section*
1 Apple
2 Artichokes

FIG. 28—Alternate Embodiment, Compact Shopping List

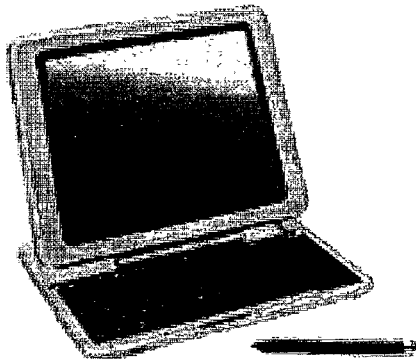
Fig. 29a—Alternate Embodiment, Shopping or Task List on Convertible Version of TabletPC
Fig. 29b—Alternate Embodiment, Shopping or Task List on Slate Version of TabletPC
FIG. 30—Preferred Embodiment, First Tab Of Order Form

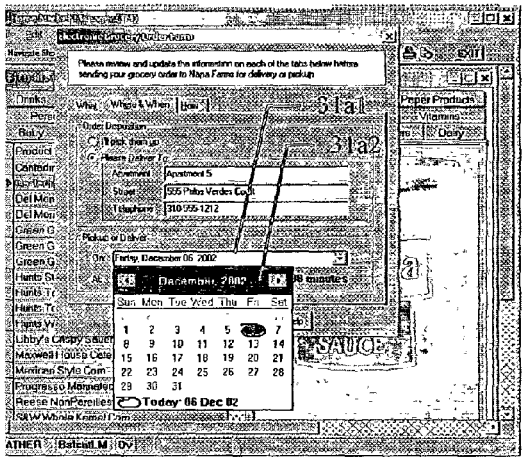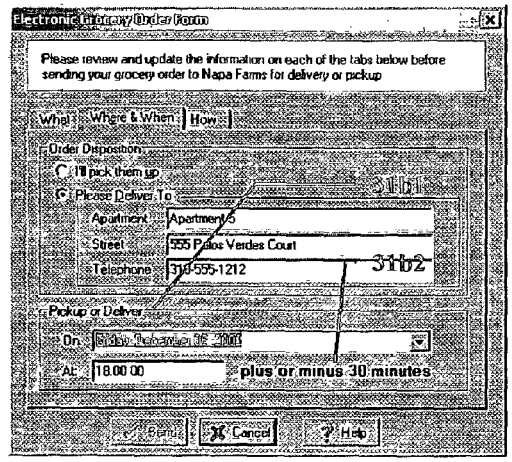
Fig. 31a—Preferred Embodiment, 2nd Tab, Electronic Order Form With Pop-up Calendar
Fig. 31b—Preferred Embodiment, 2nd Tab, Electronic Order Form
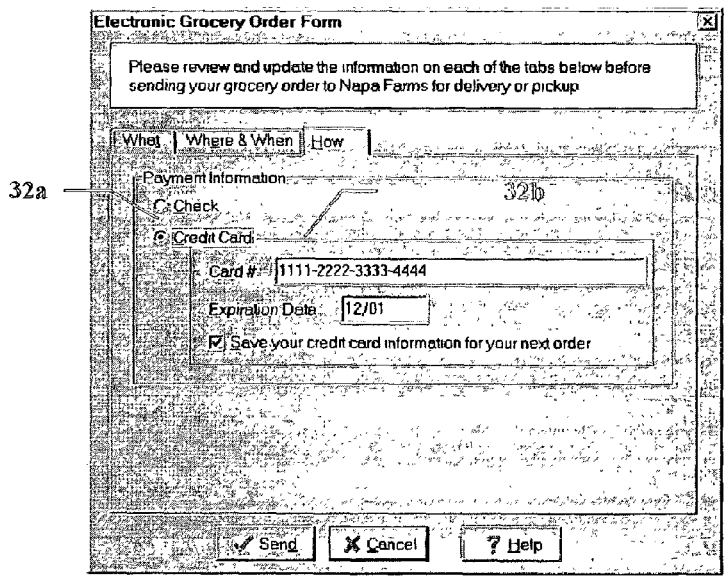
FIG. 32—Preferred Embodiment, 3rd Tab, Electronic Order Form

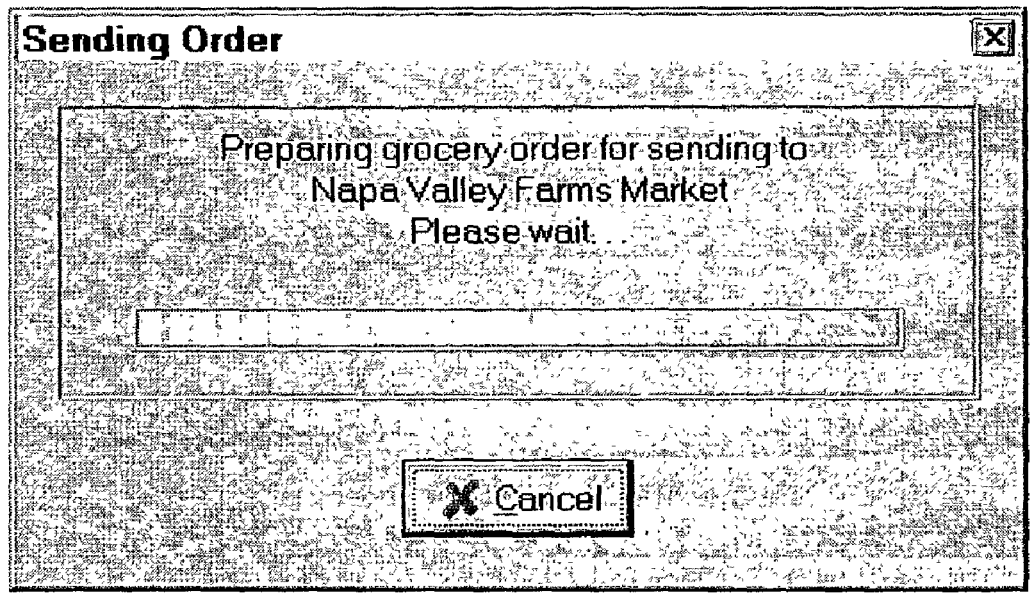
FIG. 33—Preferred Embodiment, Preparing Electronic Order
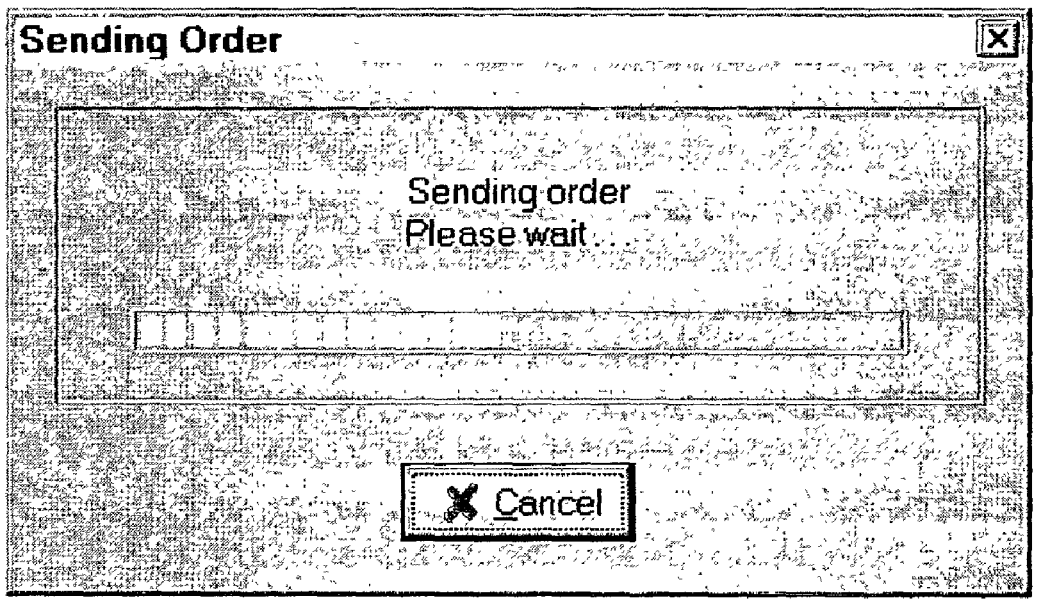
FIG. 34—Preferred Embodiment, Sending Electronic Order

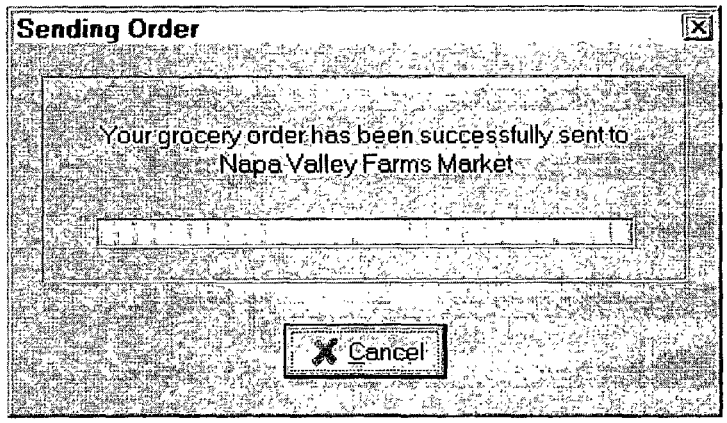

FIG. 35—Preferred Embodiment, Electronic Order Successfully Sent

| Napa Valley Farms Market ||||
|---|---|---|---|
| 36a1 — Electronic Order ||||
| Customer Information | Acct #: 1626  Ph: 310-555-1212 | ☐ Will Pickup ||
| Jane Smith  1234 Palos Verdes Drive  Palos Verdes, CA || ☑ Deliver To: Jane Smith  1234 Palo Verdes Drive  Palos Verdes, CA 90725 ||
| Pickup/Delivery Time || ☐ Check ||
| Date: | Friday March 1, 2000 | ☑ Credit Card ||
| Time | 6:00 PM – 6:30 PM | ☐ MasterCard | ☑ Visa | ☐ Discover |
| Payment Information || Credit Card Number: 1111-2222-3333-4444 ||
| Jane Smith  1234 Palos Verdes Drive  Palos Verdes, CA || Billing Address:   Expires: 02/02  1234 Palos Verdes Drive  Palos Verdes, CA ||

FIG. 36a—Preferred Embodiment, Payment Portion Of Electronic Order

FIG. 36b—Preferred Embodiment, Shopping List For Brick-N-Mortar Store

ENTRÉE
*(All Entrees served with choice selection of Bay Shrimp Salad or Soup du Jour, Rice Pilaf or Potato, and Freshly Baked Breads)*

— 38a  — 38e

HERB ROASTED PRIME RIB
*Certified Choice Slo11' Roa.s'ted Prime Rib*

SINGLE CUT.............................................................$17.95

ORANGE HILL CUT...................................................$19.95

DOUBLE CUT............................................................$24.95

CHICKEN j1.fOZZARELLA, Stuffed 11Jith
Mozzarella Cheese, Mushroom, and Spinach,
in a Chardonnay Cream Sauce ....................................$17.95

CHICKEN PICATTA, Capers, Herbs and Lemon Butter, $16.95

TOPSIRLOIiV, Steak lover's hearty cut .......................$12.95

SCAMPI CHARDONNAY,
Sauteed Shrimp with Garlic Butter and Fresh Herbs.........$27.95

GRILLED 17oz YORK STEAK,
With Shallot-Green Peppercorn Butter, ..........................$27.95

*Coffee* ...........................................................................$ 2.95

*Decaffinated Coffee* ....................................................$ 2.95

*Regular Milk*................................................................$ 2.95

*Skim Milk*....................................................................$ 2.95

GRILLED 17oz YORK STEAK,
With Shallot-Green Peppercorn Butter, ..........................$27.95

38b
38c — 38d

*BANQUET FACILITIES AVAILABLE ACCOMMODATING FROM 30 TO 200*
*\*\* RESERVATIONS ALWAYS ACCEPTED*

FIG. 37—Preferred Embodiment, Barcoded Restaurant Menu

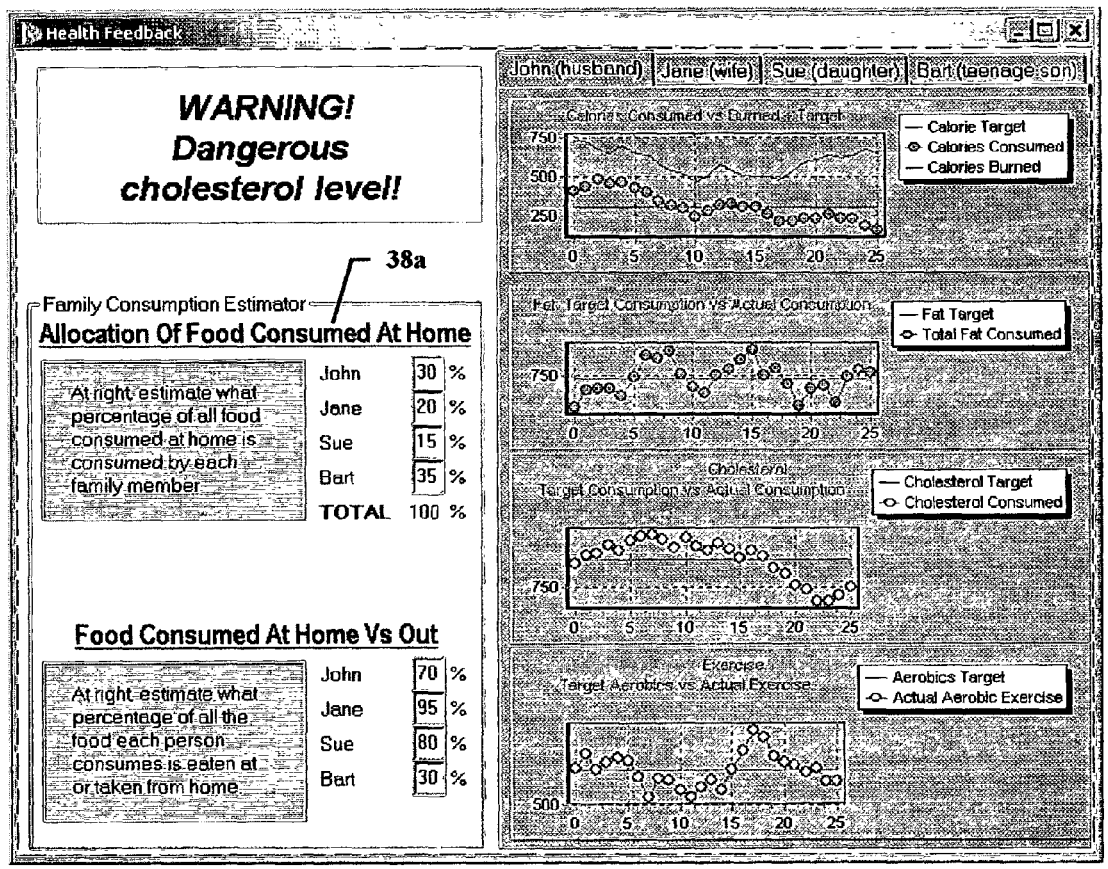
FIG. 38—Preferred Embodiment, Health Feedback Window

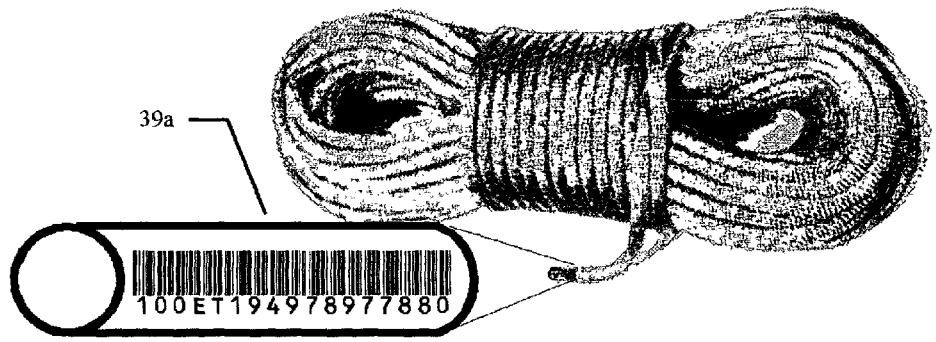
FIG. 39—Additional Embodiment, KDED Readable Climbing Rope
| Safety Quick-Scans 39b / 39a / 39c | | | |
|---|---|---|---|
| Household Device Testing | | Climbing Equipment Events | |
| Fire extinguisher | 2010S025417127559 | minor fall | 101QS188878977880 |
| Smoke alarm | 2010S025417127539 | MAJOR fall | 102QS188878977880 |
| GFCIs | | chemicals exposure | 103QS188878977880 |
| Kitchen 1 | 2010S078477126530 | 39d | |
| Kitchen 2 | 2020S078477126530 | | |
| Bathroom | 2030S078477126530 | 39e | 39f |
FIG. 40—Additional Embodiment, Safety Quick-Scan Card FIG. 41 Preferred Embodiment, Kitchen Quick Scans & Quick Scan Card For Purse, Pocket, Planner or Wallet

DISTRIBUTED PERSONAL AUTOMATION AND SHOPPING METHOD, APPARATUS, AND PROCESS

This is a continuation of Provisional Patent Application by Bruce F. Balent for Methods, Apparatus And Software For Shopping And Supply Chain Management, Application Number 60/339,166 with a filing date of Dec. 8, 2001.

FEDERALLY SPONSORED RESEARCH

Not Applicable

SEQUENCE LISTING OR PROGRAM

Program of the preferred embodiment of the distributed personal automation and shopping system (dPASS) is provided on the enclosed/accompanying CD-ROM. This program runs on an 1BM-compatible PC running under Microsoft Windows 2000. It also requires the Borland Database Engine version 5.0 be installed on the same PC. Copy all files to the PC's D: drive into the directories/folders indicated on the CD. This preferred embodiment of the program is designed to communicate with the Symbol Technologies CS1504 Consumer Memory Scanner using the SmartUSB cable and W2Kdrvr.zip driver dated Oct. 17, 2002.

BACKGROUND

1. Field of Invention

This personal automation and shopping system relates to methods and information systems (including hardware, software, communications and peripherals) for automating or improving personal or business productivity, efficiency and goal attainment, and buying and selling of goods and services. To accomplish this integrates, simplifies and democratizes methods, apparatus, and processes from a variety of other related and independent fields, including, but not limited to: barcodes and other machine readable symbologies or identifying means, barcode scanners and other KDED's; inventory control; business processes, human behavior as it relates to the adoption. In summary it improves the integration, ease of use, flexibility, speed, and accuracy of the hardware, software and processes for selecting an item, product or service (hereafter called "item" or "items"), acquiring items, controlling items on hand, using items, and the resulting product usage data from manufacture through final usage.

2. Description of Prior Art

When I invented my distributed personal automation and shopping system all consumers and many business bought commodities at local retailers. Many commonly prepared a handwritten list before shopping for such items, particularly consumables like groceries, office supplies, building supplies, auto parts, gardening supplies, etc.

When this distributed personal automation and shopping system (dPASS) was invented, there were few past systems or knowledge relating to my dPASS. Prior art was limited to industry and retail inventory control and ordering systems operating on point-of-sale systems, larger computerized systems, and a very limited number of portable barcode scanners. Keyless data entry was limited to optical character recognition and barcodes. Barcode printing was very limited capabilities were limited and required specialized knowledge and hardware Automation and distributed processing was limited to low power personal computers and office automation applications. Intercomputer communications was limited to dedicated or leased phone lines or analog modems dialing into the public switched telephone network (PTSN) or plain old telephone service (POTS).

During the building and testing of dPASS I experience numerous delays, because various required supporting systems and incorporated subcomponents were either unavailable, technically inadequate, unreliable and hence didn't satisfactorily solve myriad and complex problem of dPASS such as being distributed, flexible, adaptable, user acceptability, and easy to use, or if they were technically satisfactory, they were too expensive for a standalone or distributed solution, or networked solution. Also during my building and testing a number of subsequent methods, systems and apparatus were developed which tried to address some small aspect of the problems associated with personal automation and productivity, personal and electronic shopping, electronic ordering and delivery. Some incorporated methods, apparatus, and processes I had already invented, but was still testing. None have solved the underlying problems or been commercially acceptable to users, or financially success despite any patents issued or demonstrations of limited technical performance, as evidenced by the commercial failure of all such subsequent systems Recently, a small percentage of consumers have tried buying products from online retailers using these suppliers' automated or semiautomated buying or replenishment systems. None of these subsequent apparatus, methods, or processes of the intervening past embodies all the features, capabilities, integration, and flexibility of my distributed personal automation and shopping system (dPASS) The following are some of the more noteworthy intervening patents and public disclosures.

U.S. Pat. No. 6,026,376, issued on Feb. 15, 2000, to John A. Kenney, discloses an interactive electronic shopping system and method which creates a virtual shopping facility from an actual shopping facility, such as a grocery store, store, restaurant or office. A shopper at a computer or other suitable display device can move through the virtual shopping facility and see replicas of what would be seen in moving through the actual shopping facility. While this method enables a customer to shop from home, as well as reduce shopping time and ease or enhance the shopping experience, it's use is very limited as it requires a high bandwidth connection to the Internet and the use of a computer or web based equipment. Additionally, this system requires a person to be located near a computer or area where they have access to the Internet and doesn't allow for the ease of spontaneous, task driven ordering one might expect in a kitchen, which today is often far away from the computer and display device For example: at the office, in the kitchen or at the job site Their invention depends on or is tied to specific vendors and requires the participation of retailers. This invention also requires a substantial investment in equipment and transfer of large amounts of data between the vendor and the consumer across the Internet or other communications network. This invention doesn't enable a user to create or add to their shopping list electronically without a real-time connection to a PC or the internet at the time the product is added to the list, U.S. Pat. No. 6,236,974 B1 to Kowawa al. (2001) Method And Apparatus For Automated Selection And Organization Of Products Including Menus U.S. Pat. No. 5,691,684 to Maurrah (1997) Article Storage Container With Bar Code Scanning U.S. Pat. No. 5,483,472 issued on Jan. 9, 1996, to Anthony J. Overman, discloses a portable electronic food shopper which is related to a portable electronic list device with calculator functions. It's a menu-driven, shopping list device with price comparison functions and a customized list retained in device memory. The invention is distinguishable, in that it is not a portable electronic list device.

U.S. Pat. No. 6,076,068 to DeLapa et al. Coupon Delivery System

U S. Pat. No. 6,125,352 to Franklin et al. (2000) System And Method For Conducting Commerce Over A Distributed Network U.S. Pat. No. 6,000,610, issued on Dec. 14, 1999, to Theresa Talbott et al., discloses a store specific shopping system method including a map/shopping list bearing written identifications of articles arranged in a pictoral representation corresponding to their display locations in a store. The invention doesn't allows users to create a shopping list at home, free from control by the retailer U.S. Pat. No. 5,664,110 to Green et. al. (1997) Remote Ordering System U.S. Pat. No. 5,640,002 to Ruppert et. al. (1997) Portable RF ID Tag And Barcode Reader U.S. Pat. No. 4,373,133 to Clyne et. al. (1983) Method For Producing A Bill, Apparatus For Collecting Items, And A Self-Service Shop U.S. Pat. No. 4,634,845 to Hale et. al. (1987) Portable Personal Terminal For Use In A System For Handling Transactions U.S. Pat. No. 5,821,513, issued on Oct. 13, 1998, to Timothy O'Hagan et. al. discloses a shopping cart mounted portable data collection device with tethered dataform reader. This is a retail consumer product data collection and information system. This instant invention is distinguishable, in that it allows the user to create a shopping list at home.

U.S. Pat. No. 5,884,281, issued on Mar. 16, 1999, to Samuel Bernard Smith et. al., discloses a means for creating an electronic grocery list. This device stores, displays and prints grocery list items. The device is a computer which stores names of grocery items according to broad classifications. The device can be used independently or in connection with a printer or via an internet connection for electronic shopping. The instant invention is distinguishable, in that it is not a computer.

U.S. Pat. No. 5,898,594 to Leason et al. (1999) Virtual Catalog And Product Presentation Method And Apparatus U.S. Pat. No. 5,970,471 to Hill (1999) Method And Apparatus For Enabling A Selection Of Catalog Items U.S. Pat. No. 5,979,757 to Tracey et al. (1999) Method And System For Presenting Item Information Using A Portable Data Terminal U.S. Pat. No. 6,029,889 to Whalen, Jr. et al. (2000) Firefighter Accountability Apparatus And Method U.S. Pat. No. 6,123, 259, issued on Sep. 26, 2000, to Nobuo Ogasawara, discloses an electronic shopping system including customer relocation recognition. This shopping system aids customers by saving time and money while shopping. Through the use of a hand-held or mounted terminal the system gives consumers directions on where to locate an item in a particular store based on the customer's current location in the store. Additionally, the device displays suggestions on promotional items that the customer may need to replenish. Unlike the previously listed inventions, this device is provided by a specific retailer and primarily benefits the retailer interests. Additionally, the hardware costs are substantial and limits the product to commercial not home use. Like other inventions, this instant invention ties users to specific retailers and doesn't allow creation of a shopping list at home independent of the retailer's involvement.

U.S. Pat. No. 6,129,276 to Jelen et a. (2000) Shopping Cart Mounted Portable Data Collection Device With Tethered Dataform Reader U.S. Pat. No. 6,246,998 B1, issued on Jun. 12, 2001, to Kunihiko, discloses a system and method for home grocery shopping including item categorization for efficient delivery and pick up. This invention is another variation of the increasingly popular internet based home shopping system. It differs in that the software is able to characterize purchased items according to weights and measures, environmental storage and nutritional content such that a customer is able to make effective purchase decisions and is able to prepare appropriate space and environment for receiving the goods. The highlights of this invention satisfy the needs of a consumer looking for home delivery of products and also assists the transportation company in regards to loading and shipping requirements. However, this invention is internet based and is therefore limited in it's functions as listed in the previous internet based home shopping systems. This invention is also severely limited in its usefulness and where it can be used by its dependence on a active Internet connection U.S. Pat. No. 6,249,773 B1 to Allard et al (2001) Electronic Commerce With Shopping List Builder. This invention is a client/server tool that manages an individualized selection of product offerings, referred to as a "shopping list". This shopping list tool comprises several components, which enable consumers to peruse inventories that are unmanageably large, which simplify repetitive purchase of consumable and perishable items and which simplify the computer operating tasks associated with electronic shopping. Although this invention seems to handle large inventories quite well, it is still very limited in its use. The user must still be tethered to a computer and a local area network (LAN) or Internet connection. It's not a stand-alone product that can be easily accessed in the room/location you need it. It also doesn't involve the full participation of the consumer, manufacturer and retailer. The product is designed primarily to improve the efficiency of the home shopper as she browses through various shopping sites on the Internet. The product also is limited in that it requires a tremendous amount of manual inputting on the part of the user. Unlike the invention proposed in this patent application which automates the selection process thus greatly reducing input errors and allows for spontaneous decision making This invention is distinguishable, in that it is a device that allows users to create their own shopping lists electronically, that does not require a connection to the internet and it allows data input by a bar code reader device.

None of the prior art inventions, disclose the instant invention claimed The shortcomings in the past systems may result from the inventors' failure to fully and accurately identify all the shopping problems to be solved. The past systems primarily solve the problems of retailers and/or manufacturers with minimal understanding or solution of the consumer's problems, which may result from approaching the problems from a retail or manufacturing background. Since I approached the problem from the consumer's perspective I've been able to identify and solve most of the consumers' problems with product selection, shopping, and inventory management. These unaddressed problems include:

a. Flexibility: People don't like to change. People identify, select, and shop for consumables in a variety of ways, and many people use a variety of methods as their available resources and responsibilities change over time or from one shopping event until the next. Yet all the past systems requires consumers and businesses dramatically change the way they select, shop for, buy, sell or distribute groceries or other consumables; they lack the ability to be used in a variety of ways. They require a revolutionary or dramatic change methods versus the preferred evolutionary change in the way a users currently accomplishes the task, and they don't enable users to identify, select and shop for consumables in whatever fashion is most natural or effective at any given time.

b. Incremental Adoptability: Most people and many businesses—particularly low margin businesses like grocers want to tryout or start using a new system at a very rudimentarily level, at minimal cost before committing their entire operation to the new system. For example, a person new to computers and word processors would want to start by using it to write a single business letter, before committing the time, money, and risks of storing all client/customer information in the computer and then using the word processor's mail merge abilities to generate hundreds of personalized Christmas cards. The past systems ignores this problem and requires users to adopt their entire invention or system in an all-or-nothing approach. They are deficient in their ability to progressively provide more capabilities, personal productivity, and shopping automation at incremental expenditures of time and money; thus are deficient in reducing resistance to buying and using their systems.

c. Selection At Point Of Consumption. While some past systems permits selection at the point of consumption, like the kitchen counter, they fail to address the preceding problems. Also, only a few provide selection any time and any place without a wired or wireless connection to some other device, computer system or network.

d. Vendor and Time Independence, and Privacy. While some consumers do not mind being tied to a single supplier or allowing that supplier access to their personal information, preferences, and habits, most consumers want to maintain more privacy than afforded by the past systems and the freedom to shop at any store they want and at whatever time they want. Most people like the personal freedom and real-time independence from vendors provided by software loaded and running on their PC, hence the failure of thin-clients displaying the output of software running on a remote server or PC's running software stored, rented and downloaded from a remote server each time they want to run an application. Like the automobile—vs a metro bus or subway—the PC and locally stored software provides people with the privacy, freedom, and flexibility they prefer None of the past systems adequately solves these problems.

e. Speed and Rich Environment. Users expect things to happen fast if not instantaneously, they want rich content (i.e. an easily selectable amount of multimedia information: pictures, videos, text, smell, etc-) that can be accessed in a variety of ways. In addition to the above, people like the fast, rich environment provided by Windows or the MAC, various methods of input (mouse, keyboard, voice, barcode reader, scanner, etc.), multimedia output (e g. text, graphics, pictures, sound, video, printouts, removable media, and smell in the future), and its speed All the past systems fails to solve all these problems; some lack the speed, others the independence, some the rich input or output being limited by their small form factors, bandwidth or capabilities (e.g. a PDA, browser, web-enabled cellular phone, etc,)

Despite this consumer-centric approach, my personal shopping system also solves retail and manufacturing problems and improves their portions of the supply chain. In essence dPASS enhances and improves existing apparatus, processes and methods. It keeps the freedom and flexibility of the existing, fairly efficient retail consumables market and day planner and its associated methods and enhances and augments them in an incrementally adoptable way. No new, expensive, monolithic systems to replace what isn't broken, requiring radical changes methods that work and people are comfortable with Instead evolutionary enhancements and behind-the-scenes system integration that transparent to users that are economical and easy to begin using, while maintaining all the advantages of the old: freedom of choice, flexibility, and adaption to existing methods.

| | Glossary |
|---|---|
| data processor | a general or special purposed containing means for input, output, data storage, and capable of specific or programmable data manipulation (e.g computers from main frames to embedded microprocessors |
| GSET | goods, services, events and/or tasks; gouds may also be called: products or items |
| KDED | a keyless/mouseless data entry device which is a computers or peripheral device capable of: 1) capturing data encoded or stored in a machine readable symbology or device, or 2) receiving data input without use of a keyboard or mouse; however, some KDED's can keys or pointing devices as a secondary or auxiliary means of capturing or receiving data, and may have a display for user feedback, prompts, etc.; |
| Buyer | refers to one or more people or companies buying goods or services and anyone using this dPASS invention; |
| Seller | refers to people or companies selling or delivering good or services, or arranging for their sale or delivery; |
| Manufacturer | (mfg) refers to people or companies that manufacture goods or provide services; |
| Data | refers to unaltered data input to a data processor while 'information' generally refers to one or more pieces of data that have been operated on, manipulated on, or transformed in some way by a data processor, often to arrange data in ways more meaningful to humans or other data processors, or to synthesize such data in less, but more meaningful information for subsequent use by humans or other machines; |
| Quick-Scans ™ | Pairs of human readable names and KDED readable identifiers for either 1) frequently captured GSETs, or 2) GSETs lacking a KDED readable identifier; |

| | -continued |
|---|---|
| | Glossary |
| Quick-Scan Card | refer to some handy media containing Quick-Scans ™; |
| Token | The KDED readable portion of a GSET-token pair; by way of example, not by way of limitation, this token could be a barcode that uniquely identifies the manufacturer (mfg) of said GSET, a radio frequency identification tag (RFID), or a complex symbology or device which contains additional information such as the item's name, size, mfg, etc. |

Objects and Advantages

Accordingly, besides the objects and advantages of being consumer centered described above, several objects and advantages of the present personal automation and shopping system are:

(a) to provide an "incrementally adoptable"™ system that integrates the buyer/consumer, retailer/vendor, and manufacturer (i.e. the segments) into a synergistic supply chain where each gains optimal benefit without unfairly taking advantage of the other segments. A person or business can begin by using the most basic features for little cost, disruption to or change in current methods and then buy or begin using additional system capabilities as its benefits become more apparent and familiarity with the system grows;

(b) to provide greater buyer control of their interface with the supply chain;

(c) to provide an open supply chain where the consumer can more easily choose which seller, retailer or vendor to buy items from (i.e. as opposed to a closed system which ties the buyer to a single seller, retailer or retail chain); and (d) to provide retailers the ability to offer the invention as a closed system—where the sellers pay the cost of the system or at least subsidize its cost—and the consumer in return, is tied or at least rewarded for using the retailer providing the system

SUMMARY

In accordance with the present invention a computerized buying and supply chain management system is provided which uses existing computer, peripheral, software, and communications technology along with new software, processes, and methods to create a modular, "incrementally adoptable"™ system that speeds and improves dissemination of product information, product selection, shopping list compilation and maintenance, product acquisition and delivery, inventory control and usage. The personal automation and shopping system can be used in a variety of markets, including but not limited to: consumable markets with wide selection of items and their periodic consumption and replacement (e.g. groceries, office supplies, building materials, etc.), service industries providing a variety of selectable services which are requested on a periodic basis (e.g. building cleaning, laundry and dry cleaning, auto repair, etc.)

This personal automation and shopping system creates for the first time a triple-win synergy between the consumer or buyer, the retailer or service provider, and the manufacturer. (i.e. each person gains by using this system, instead of existing systems which are based on the traditional, adversarial, win-lose relationships.) All three user segments (i.e. consumer/buyer, retailer/vendor, and manufacturer) can incrementally adopt or add the various modules to their usage of the personal automation and shopping system. This incremental usage reduces the typical obstacles (i.e. cost, complexity, difficulty of use, change in habits, etc.) to adoption of new technology or systems. Unlike competing systems, a core aspect of this personal automation and shopping system is that it enhances the way each user segment already interfaces with the supply chain. For example, household consumers often create a handwritten list of groceries to be replaced as they are consumed; keeping the list on the refrigerator until shopping day. This personal automation and shopping system requires the consumer to make only a small, incremental change in this habit; they scan the product's UPC barcode with a portable scanner—which could be kept next to or attached to the refrigerator or carried with them—to add the product to their shopping list. Then they simply print out the list before going to the store. This scanning process is faster and more accurate than writing a generalized term for a specific product on the paper list (e.g. writing "cheese" on the list when what the consumer really wants is "Kraft, Cracker Barrel, Extra Sharp Cheddar Cheese, 12 oz package"). Competing items expect the consumer to go to another room, start the computer, log onto the internet, surf to a website, and then laboriously search for each item they want, wait while the text and graphics slowly download, and then finally add the product to their shopping cart. These competing systems also expect consumers to coordinate a specific time for home delivery, wait one or more days for the items to arrive, and pay for them by credit card, whereas the personal automation and shopping system allows the consumer to shop as they always have: at any store, at any time, without the constrains of a narrow (e.g 30 minute) delivery time.

The personal automation and shopping system has similar advantages for the retailer. Retailers can chose their level of participation from simply providing a file of the UPC's for the items they stock to complete, electronic receipt of orders and home delivery. This allows all user segments to use the personal automation and shopping system initially with little change in existing habits or procedures, little expenditure of capital, and then begin using other features and capabilities of the personal automation and shopping system as the personal automation and shopping system's value becomes apparent.

In summary this personal automation and shopping system provides:

Flexibility,

A synergistic, integrated and balanced supply chain management system for all three chain user segments (i.e. buyer, seller and manufacturer), Incremental adoptability of the personal automation and shopping system, A variety of usage modes and features that adapt or blend well with the current methods used by the three user segments.

DRAWINGS

Drawing Figures

FIG. 1—Overall Architecture As Data Flow Diagram (DFD) shows the overall architecture of the preferred embodiment of my Distributed Personal Automation and Shopping Method, Apparatus, and Process (dPASS) as it applies to a retail commodities supply chain like the grocery industry (i.e. items bought in a typical supermarket circa 2001); however, this embodiment and sample application should not be construed to restrict this personal automation and shopping system in scope to only grocery shopping. This market and usage was chosen strictly for ease of illustration and description, and its broad appeal.

FIG. 2—KDE Device Preferred Embodiment shows the preferred embodiment of the keyboard-mouseless data entry (KDE) device, the Symbol CS-1504 Consumer Memory Scanner. This laser scanner captures most popular barcode symbologies an alternative embodiment of the keyless data entry (KDE) device, KDED 1b, the Videx Inc. LaserLite barcode scanner, to add a grocery product identifier (i.e. UPC) to the shopping list.

FIG. 3—KDE Device Used For Point-Of-Consumption Selection Via UPC barcode shows the preferred embodiment as a small, portable and disconnected KDE device used in the kitchen to capture the identifier (i.e. the can's UPC barcode) of a product the Buyer 1a wants to get more of, or is about to use and wants to rebuy.

FIG. 4—Alternate Embodiment: KDE Device, Videx LaserLite Scanner shows one of many alternate embodiments of the KDED 1b; in this case a more rugged Videx, Inc LaserLite pistol-grip laser scanner.

FIG. 5—Alternate Embodiment: KDE Device {cigarette pack scanner} shows another alternate embodiment of the KDED 1b with integrated display for user prompts and information and a keypad for augmenting or replacing scanned input, such as quantity iventask just scanned or inputting iventask information that won't scan for any reason, such as improperly printed barcode This embodiment would be particularly useful in a deluxe version of the dPASS by providing electronic prompts of the FIG. 6—Preferred Embodiment: Barcoded Catalog Of Groceries shows printed version of Catalog & Cookbook 1k listing groceries and their associated UPC barcode for fast selection anywhere via portable KDE device, products for the grocery industry with each products' universal product code (UPC) encode in KDE device readable format as a UPC barcodes plus a prefix or suffix denoting this UPC was scanned from the printed catalog. If the product doesn't have a UPC code (e.g. some fruits and vegetables) or the dPASS is embodied for other uses, anticipated or not, there would be a dPASS specific identifier (UPC code in this example) for each generic product, item, task or event (iventask) for that market or usage.

FIG. 7—Preferred Embodiment: Sample Recipe Page shows a sample page for the recipe or cookbook portion of Catalog & Cookbook 1k.

FIG. 8—Preferred Embodiment: Application Title Screen shows opening screen for the preferred embodiment of the software portion of the dPASS shown here "Home Market Manager" or "HMM") running on a Buyer's Computer 1c or kiosk of Seller 1f FIG. 9—Wizard Window Of Software shows an initial dialog that lets the user select how much help they want from the software for in this session's use of Home Market Manager™.

FIG. 10—Preferred Embodiment, KDE Device Uploading thru FIG. 17—Preferred Embodiment, KDE Device Uploading Completed lead Buyer 1a through the uploading data stored in the KDED 1b into Buyer' Computer 1c or Seller 1f's kiosk providing prompts and feedback as necessary.

FIG. 18-FIG. 20—Alternate Embodiment KDE Device Upload Dialog shows an alternate dialog for Buyer 1a to start the uploading barcodes or other product identifier data stored in an alternate embodiment of KDED 1b.

FIG. 19—Alternate Embodiment, KDE Device Upload Progress shows the progress uploading barcodes from the alternate embodiment of KDED 1b.

FIG. 20—Alternate Embodiment, KDE Device Upload Complete shows the dialog after the product data stored in the KDED 1b has been uploaded into the Buyer's Computer 1c.

FIG. 21—Preferred Embodiment, Onscreen List After KDE Device Upload shows the main window of Home Market Manager and the shopping list that has just been uploaded from the KDED 1b.

FIG. 23—Preferred Embodiment, CD Catalog Window shows the simple, logical, intuitive interface for browsing the electronic version of a grocery catalog of Catalog & Cookbook 1k, retrieved from a CD-ROM, DVD, harddisk, or other media in a second window.

FIG. 22—Preferred Embodiment, Adding Items Via UPC Progressive Search shows adding an iventask to list by progressively searching for an iventask's Universal Product Code (UPC) into the UPC drop-down list.

FIG. 24—Preferred Embodiment, Adding Items Via Produce Name Progressive Search shows adding a product to the shopping list by progressively searching for a iventask's name into the Product Name drop-down list, which would progressively search the database of products until the correct UPC was found. Buyer would then press ENTER to add the highlighted item to their shopping below.

FIG. 25—Preferred Embodiment, IntelliFind Window For Searching All Categories shows alphabetically listing off all iventasks on the locally stored CD, DVD, harddisk, or other locally stored catalog using the IntelliFind™ progressive, partial-word search window.

FIG. 26—Preferred Embodiment, Progressive Partial-Name Search Using IntelliFind shows Buyer 1a searching for all iventasks containing the word "Chocolate" anywhere in their name.

FIG. 27—Preferred Embodiment, Shopping List For Brick-N-Mortar Store shows the shopping list organized by aisle, side, and shelf along Buyer 1a's preferred route through the store in the order in which items would appear, along with barcodes to speed check-out or automate removal purchased items from stored shopping list.

FIG. 28—Alternate Embodiment, Compact Shopping List shows an alternative, compact embodiment of the printed shopping list: 1) organized by generic categories, 2) without barcodes, for buyers who either didn't get the KDED 1b version or weren't provided with it by a sponsoring Seller 1f or Manufacturers 1j; and 3) to augment a list downloaded into the deluxe KDE device of FIG. 5.

FIG. 29a—Alternate Embodiment, Shopping or Task List on Convertible Version of TabletPC shows a TabletPC in its convertible notebook form factor for taking advantage of all the capabilities of the desktop version of dPASS, and for displaying an interactive shopping or task list, or events while shopping.

FIG. 29b—Alternate Embodiment, Shopping or Task List on Slate Version of TabletPC shows a TabletPC in its slate form factor for displaying an interactive shopping or task list, or events, electronic catalog, and interacting with the list or program via the stylus and handwriting recognition.

FIG. 30—Preferred Embodiment, First Tab Of Order Form shows where a Buyer 1a can select which list to send to Seller 1f, and which items they want to shop for themselves, and which they want Seller 1f to provide.

FIG. 31a—Preferred Embodiment, 2nd Tab, Electronic Order Form With Pop-up Calendar shows $2^{nd}$ page of dialog for selecting pickup or delivery, delivery location, and date with popup calendar.

FIG. 31b—Preferred Embodiment, 2nd Tab, Electronic Order Form shows $2^{nd}$ page of dialog after pickup or delivery date and time were selected.

FIG. 32—Preferred Embodiment, 3rd Tab, Electronic Order Form shows $3^{rd}$ page of dialog with payment information.

FIG. 33—Preferred Embodiment, Preparing Electronic Order shows progress preparing the electronic order for sending from Buyer's Computer 1c to Seller 1f via the Communications Network 1e.

FIG. 34—Preferred Embodiment, Sending Electronic Order shows progress of the next phase of the "Sending Order" dialog: sending electronic order to Seller 1f.

FIG. 35—Preferred Embodiment, Electronic Order Successfully Sent shows final phase of the "Sending Order" dialog, providing Buyer 1a with confirmation their order has been successfully received electronically by Seller 1f.

FIG. 36a—Preferred Embodiment, Payment Portion Of Electronic Order shows customer, billing, and delivery information for an electronic order; this information is tied to the product pull list of FIG. 36b below by the "Account Number".

FIG. 36b—Preferred Embodiment, Shopping List For Brick-N-Mortar Store shows the pull list for the electronic order of FIG. 36a above; these two parts are tied together by the "Account Number".

FIG. 37—Preferred Embodiment, Barcoded Restaurant Menu shows a restaurant menu with barcode identifiers for each meal, side-dish, dessert, drink, etc.

FIG. 38—Preferred Embodiment, Health Feedback Window shows the health feedback window for a family of four, with the husbands' page selected.

FIG. 39—Additional Embodiment, KDED Readable Climbing Rope shows a typical piece of personal safety equipment, which could benefit for dPASS tracking of usage and sun exposure.

FIG. 40—Additional Embodiment, Safety Quick-Scan Card shows an extract of another Quick-Scan Card™— which, by way of example, not by way of limitation, could be printed on 3"×5" or 5"×7" index cards, a regular or half sheet of paper, etc—of safety Quick-Scans™.

Figure 41:
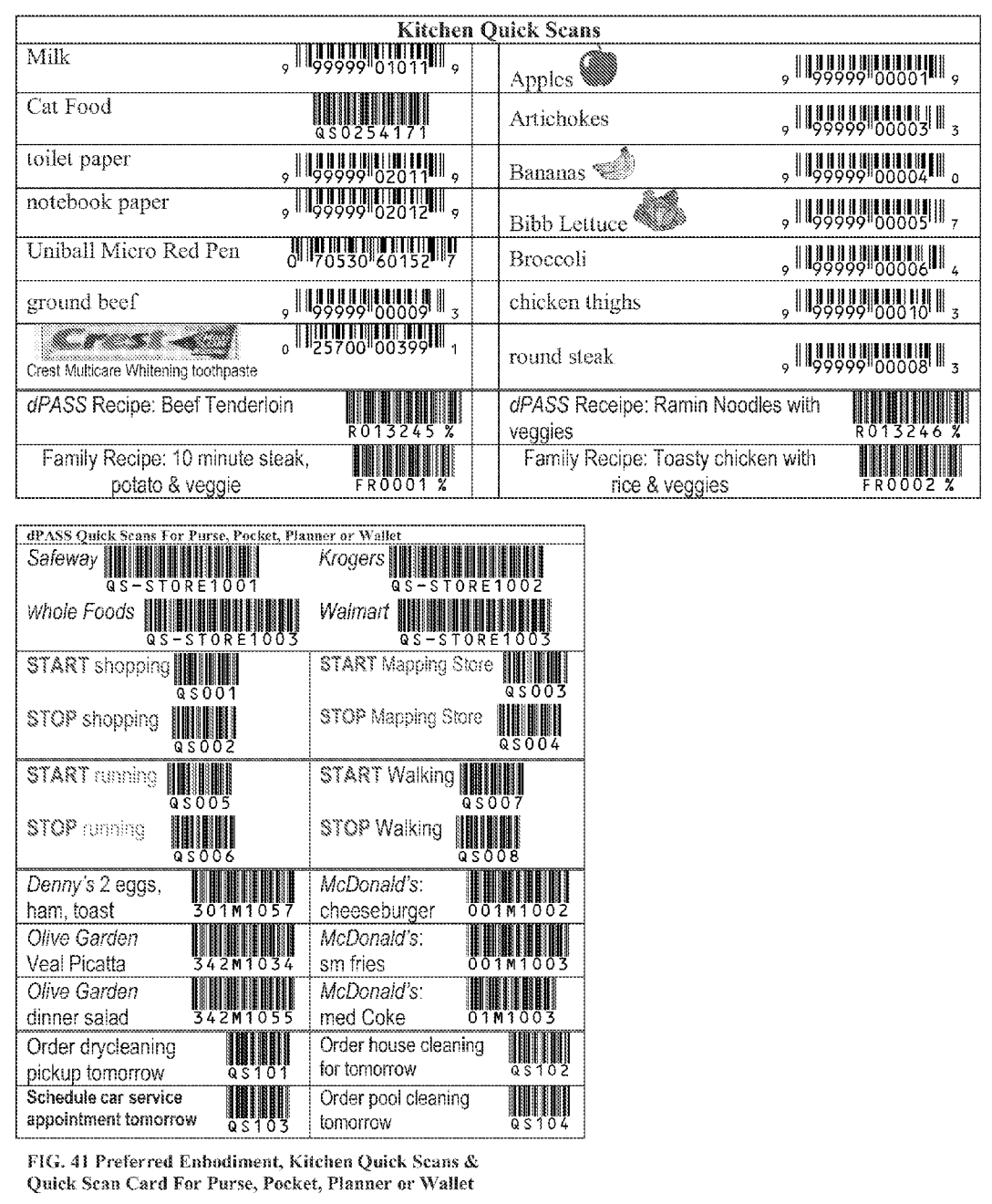

FIG. 41—Preferred Embodiment, Kitchen Quick Scans— showing example of a fictitious family's Quick Scans printed out for use in the kitchen—and .Quick Scan Card—shows an example of a Quick Scan Card printed out for a fictitious individual for he/she to carry with them.

| Reference Numerals In Drawings | |
|---|---|
| 1a | Buyer |
| 1b | KDED (i.e. keyless-and-mouseless data entry device (e.g. barcode scanner, radio frequency tag reader, voice input system, etc.)) |

-continued

| Reference Numerals In Drawings | |
|---|---|
| 1c | Buyer's Computer (e.g. personal computer (PC): IBM ™ compatible PC, Apple ™ PC, Linux PC, handheld computers, or other data processor) |
| 1d | Buyer's Input/Output Device (e.g. printer, personal digital assistant, etc.) |
| 1e | Communications Network (e.g. Internet, plain old telephone service network) |
| 1f | Seller (e.g. retailer, wholesaler, agent, or middleman) |
| 1g | Manufacturer (i.e. product makers or service providers) |
| 1h | Removable Media (for data storage, e.g. Compact Disc - Read Only Memory (CD-ROM), Digital Video Disc (DVD), solid state removable memory, etc.) |
| 1i | Other Data (i.e. other sources of data and information) |
| 1j | Seller's Kiosk (e.g. a touch-screen computer) |
| 1L | Catalog & Cookbook (e.g. printed catalogs, cookbook recipe, home or craft project manual, etc.) |
| 1k | Quick-Scans or Cards (on human readable media) |
| 2a | Scan Barcode button |
| 2b | Delete Barcode button |
| 2c | Communications Port (USB or Serial) |
| 3a | KDED I/O Barcode Scanner |
| 3b | Display |
| 3c | Integrated Scanner |
| 3d | Auxiliary Input Keypad |
| 4a | Pistol-grip Barcode Scanner |
| 4b | UPC Barcode |
| 5a | Portable Barcode KDED |
| 5b | Package UPC Barcode |
| 6a | Product/Service Info (e.g. name, description, picture, size, flavor, etc.) |
| 6b | Product UPC Barcode (with catalog identifying prefix) |
| 6c | Category Index (e.g. Produce) |
| 6d | Subcategory or Group Name (e.g. vegetables) |
| 6e | Logo (of Home Market Manager or sponsoring Seller 1f or Manfacturer 1g) |
| 7a | Ingredient Identifiers |
| 7b | Recipe Identifier (for add all ingredients) |
| 10a | Progress Lites |
| 10b | Communications Status |
| 10c | More Info Button |
| 11a | Current Border |
| 14a | ProgBar |
| 16a | Instructions |
| 16b | Buttons |
| 17a | Instructions |
| 17b | Close Dialog Button |
| 17c | Restart Upload Button |
| 21a | Buy Now List |
| 21b | Button Bar |
| 21c | Navigating Buttons |
| 21d | Navigation Reference |
| 21e | Quantity Column |
| 21f | Spin Buttons |
| 21g | Product Column |
| 21h | Title Row |
| 21i | Date Line |
| 21j | Store Name |
| 22a | Catalog Name |
| 22b | Category Tabs |
| 22c | "Produce" Tab |
| 22d | Picture |
| 22e | Product Information |
| 22f | Specials |
| 22g | GSET List |
| 22h | Status Bar |
| 23a | UPC Lookup List |
| 23b | UPC Dropdown List Box |
| 23c | Search Result |
| 24a | Product Name Lookup List |
| 24b | Product Name Dropdown List Box |
| 24c | Product Search Result |
| 25a | IntelliFind ™ Button |
| 25b | IntelliFind ™ Window |
| 25c | Find Product Edit Box |
| 26a | Search Results List |
| 26b | Product Selection Indicator |
| 27a1 | Product Pictures |

-continued

| Reference Numerals In Drawings | |
|---|---|
| 27a2 | Not Bought Designator |
| 27a3 | Store |
| 27a4 | Aisle, Side, Shelf |
| 27a5 | Coupon Flags |
| 27a6 | List Barcode |
| 30a | Items-to-order |
| 30b | List Input Box |
| 30c | Instruction Panel |
| 30d | Page Tabs |
| 31a1 | Dropdown Calendar |
| 31a2 | Input Field |
| 31b1 | Date/Time |
| 31b2 | Pickup/Delivery Window |
| 32a | Radio Buttons |
| 32b | Credit Card Info |
| 36a1 | Account Number |
| 38a | Menu Items |
| 38b | Identifier Prefix |
| 38c | Source ID |
| 38d | Vendor-item Identifier |
| 38e | Token |
| 39a | End Tag (exploded view) |
| 39a | Event |
| 39b | Quick-Scan Category |
| 39c | Event 39a Identifier |
| 39d | Event Prefix |
| 39e | Identifier Source |
| 39f | Item Identifier (i.e. object of Event 39a) |

DETAILED DESCRIPTION

While the distributed personal automation and shopping system I invented is comprehensive, flexible and easy to use, it's a complex invention to describe. Therefore I have tried to organize and describe each figure in the logical sequence going from mobile GSET selection anywhere, anytime, using the KDED 1b; to additional selections on buyer's Computer 1c; to outputting or transmitting this list; to getting the goods, receiving the service, attending the events, or accomplishing the tasks; and finally to updating dPASS. While I've tried to follow the traditional approach of presenting all component descriptions first, followed by their operation, in breaking the invention into—hopefully—more easily comprehendible pieces, some dPASS operations may be presented along with component descriptions instead of in the "Operations" section of the preferred embodiment. Also to help the reader more easily understand the this distributed personal automation and shopping system (dPASS), I will describe it as configured and used to improve grocery buying. However, use of this market to explain dPASS should not be construed to restrict the dPASS to only this market and usage, since it's a comprehensive, yet easy to use personal automation and shopping system automates, that, because of its distributed nature and novel features, improves buying, selling, marketing, and supply chain management for goods and services, managing tasks and events, and achieving goals while reducing the stresses associated with these activities. It does this for a variety of markets, industries, and activities.

Buyer's Computer 1c inputs and stores GSET data and information in various types of memory and files, including but not limited to lists, disk files and databases. The personal automation and shopping system allows for a variety of data structures, including but not limited to relational database types and structures comprising tables, fields, records, and indexes to accommodate or enable embodiment of various components of the personal automation and shopping system on a variety of computers, KDED 1b, Buyer Input/Output Devices 1d (e.g. personal digital assistants, scanner/terminals, etc.) and future technologies. The databases can be constructed and accessed by a variety of relational database management systems RDBMS's, and with a variety of structures, so long as the RDBMS, structure and relationships selected supports the various features, functions and capabilities of the personal automation and shopping system. The KDED 1b may also have an integrated display to provide information to the user and/or a keypad for typing or punching in information that cannot be captured or augmenting information electronically captured by the KDED 1b.

Description—Preferred Embodiment

FIG. 1—Overall Architecture as Data Flow Diagram (DFD).

FIG. 1 depicts the overall architecture of dPASS as a high level data flow diagram, with the bubbles representing major components and directional lines indicating the flow of data. However, the traditional listing of the actual data flowing between the modules on the DFD has been left off for clarity; it will be described later in the "Operations" section.

dPASS enables users or Buyers to add goods and services (also called "items") they want to buy, tasks they want to accomplish, and events they must attend into a computerized database of GSETs residing on their IBM™ compatible personal Computer 1c (PC) running under Microsoft™ Windows™ 95/98/me/NT4/2000MXP using a variety of manual and keyless-and-mouseless data entry devices (KDED 1b). FIG. 2 depicts one such KDED 1b capturing the barcode of an item to be purchased. This database can also store the Buyer's 1a current inventory of good on hand, along with tasks and events. The software portion of the personal automation and shopping system control's Buyer's Computer 1c to receive store, manipulate data, and output shopping lists, wish lists, service requests, task lists, events, and other information GSET related information in a variety of ways. The dPASS software can also send lists and other information to one or more of Buyer's Input/Output Devices 1d, Other Data [sources] 1i other buyer's, Sellers 1f of goods and services, and Manufacturers 1j of goods or providers of services. In the preferred embodiment these Buyer I/O Devices Id would include, but are not limited to: a color printer and a portable personal digital assistant (e.g. the Palm Pilot or Pocket PC) or an I/O enabled KDED such as depicted in FIG. 3. If a printer is the output device Id, it can also be used to print a variety of reports, updates or additions to the Catalog & Cookbook 1k, charts, Quick-Scans 1L, etc.

FIG. 2, KDED Preferred Embodiment: Symbol CS1504 Consumer Memory Scanner

FIG. 2 shows my preferred embodiment for KDED 1b, the key-fob sized, Symbol Technologies, CS-1504 Consumer Memory [laser] Scanner which captures all major barcode symbologies, storing several hundred with a date and time of each scan. It also stores a unique scanner identifier. Button 2a initiates the scan and storing the scanned barcode, date, and time of the scan; this—combined with the KDED's unique identifier—enables detailed analysis of user patterns. Button 2b scans a barcode, but delete's any matching barcode in memory. Port 2d accepts a cable for transferring stored data to Buyer's Computer 1c or Seller's Kiosk 1j.

FIG. 3, Additional Preferred Embodiment: I/O Capable KDED

FIG. 3 shows an additional preferred embodiment of KDED 1b, which includes downloadable programming, prompts, and messages for display on the scanner's LCD 3b. These include: progressively showing the shopper each item on the list, prompting the shopper to scan each pulled item with the integrated scanner 3c or additional items to denote shopper's route through the store, confirming the correct item was pulled on Display 3b, enabling input of UPC for goods that often won't scan like bags of frozen food using Auxiliary Input Keypad 3d, the number of packages of an item pulled or desired, and information for other purposes.

FIG. 4—Alternate Embodiment: KDED, Videx LaserLite Scanner

FIG. 4 shows an alternate embodiment of KDED 1b, a Pistol-grip Barcode Scanner used to capture the UPC barcode 4b for a bread mix, in the kitchen where Buyer 1a has just consumed the product and is about to throw away the empty box; this scan adds the item to buyer's shopping list for replacement. I hypothesize that this action constitutes a microbuy decision at the moment a buyer is most likely to choose to rebuy the same product; when they've just used it, assuming they are happy with the product. This captured information is also useful for marketing purposes, because it also captures which KDED was used, what time the selection was made, and where the selection was made from (i.e. off the item's UPC barcode on the box, from a coupon, advertising circular, or mailed catalog, the dPASS printed Catalog & Cookbook 1k, or a recipe with a specific brand recommendation for that ingredient. New and extremely accurate information about buyer habits and behavior which until now could only be imprecisely sampled and then extrapolated.

FIG. 5—KDED Used for Point-of-Consumption Selection Via UPC Barcode

FIG. 5 shows the preferred embodiment of KDED 1b again used to capture the UPC barcode on a product's package; this new usage for the package UPC extends the marketing value of Manufacturers 1j's investment in attractive packaging to the kitchen counter and panty, instead of limiting it just to the grocery shelf FIG. 6—Preferred Embodiment: Barcoded Catalog of Groceries FIG. 6 shows a Buyer 1a using the dPASS printed product Catalog & Cookbook 1k while watching her child pay baseball. She can use the Category Index 6c (e.g. "produce") and Subcategory or Group Name 6d (e.g. "vegetables") to quickly find the section of the catalog she wants. Product/Service Info 6a, including pictures, make selection of the right product or service—or a new and enticing product—fast. The Product UPC Barcode 6b for each item enable product/service selection with KDED 1b fast and nearly foolproof The printed Catalog & Cookbook 1k turn waiting time into productive time.

FIG. 7—Preferred Embodiment: Sample Recipe Page

FIG. 7 shows a sample page from the recipe portion of Catalog & Cookbook 1k. The first four barcodes identify individual recommended ingredients for this recipe, again making selection of needed ingredients fast, accurate and easy. They represent the UPC for each ingredient. The last barcode, prefixed with an "R" identifies all the recommended ingredients. This enables one KDED 1b to capture a single identifier to either: 1) add all ingredients to the shopping list (the default assumption), or 2) only those ingredients or suitable substitutes Buyer 1a already has on hand, if they've established an existing or ideal inventory within dPASS. These recipe ingredient or project material recommendations constitute another new marketing opportunity for Manufacturers 1j, while the one-scan recipe code makes meal planning a snap for cooks and project planning a snap for do-it-yourselfers and professional builders alike. The symbology used for the one-scan recipe code could be any suitably robust symbology; the preferred embodiment is the 3 of 9 Code.

FIG. 8—Preferred Embodiment: Application Title Screen

FIG. 8 shows the opening title screen for the dPASS application running on Buyer's Computer 1c. This application can be used with or without the KDED 1b.

FIG. 9—Wizard Window Of Software

This module provides a dialog shown in FIG. 9 which offers the user one or more wizards to help new users get the most out of the dPASS application and it lists other commonly performed tasks to help new users get started quickly and easily. By way of example, not by way of limitation, dPASS is presented here as a distributed grocery shopping system for easy reader comprehension of the invention. The one wizard listed helps a user create a shopping list from electronic product catalogs on Removable Media 1h or Other Data 1i accessed via Communications Network 1e. The other radio buttons when selected configure the application for the usage described with minimal user action.

FIG. 10-FIG. 17—Preferred Embodiment KDE Device Uploading Dialogs

Assuming the user (i.e. Buyer 1a) chose to upload the KDED 1b, this module provides a dialog shown in FIG. 10 that would appear, and—unlike many data processing programs, particularly those for Microsoft Windows PC's—present almost all of the information or feedback on the modules processing to the user on a single dialog box versus a succession of cascading or nested dialogs. We hypothesize that this single dialog method for the upload and routing of GSET identifiers stored in the KDED 1b is more logical and intuitive for users; thus faster and easier to use. The Progress Lites 10a show the progress of the multistep upload and routing process clearly and intuitively with GREEN indicating a successfully completed step and RED indicating a problem or uncompleted step. Communications Status 10b shows that the KDED 1b communications cable is properly connected to and communicating with buyer's Computer 1c. More Info Button 10c expands the dialog to show more detailed information about the upload and routing.

FIG. 11 shows the next step of the upload enclosed by a Current Border 11a, its highlighted in yellow, because it will next prompt the user to plug the BarScanner embodiment of KDED 1b into the communications cable.

FIG. 12 shows the highlight inside the Current Border 111a removed, since communications has been successfully established with the BarScanner embodiment of KDED 1b.

FIG. 13 shows the Current Border 11a advanced to the next step: uploading data stored in the KDED 1b to Buyer's Computer 1c.

FIG. 14 shows the Current Border 11a advanced to the next step: evaluating, routing, and processing the uploaded data. ProgBar 14a shows the progress of this operation.

In FIG. 15 ProgBar 14a and the text inside Current Border 11a show this step has been completed.

In FIG. 16 Current Border 11a has been advanced to the next step and highlighted in yellow to tell the user their input is required. Instructions 16a are provided, and the two Buttons 16b are enabled to receive users choice to delete the data stored in KDED 1b or FIG. 17 shows Current Border 11a advanced to the next step and highlighted in yellow to tell the user their input is required. Instructions 17a are provided and the Close Dialog Button 17b is bordered as the default user action. Restart Upload Button 17c can be used to upload data from another KDED 1b without having to close and reopen the dialog.

FIG. 18-FIG. 20—Alternate Embodiment KDE Device Upload Dialogs show an alternate, more simplified, embodiment of user feedback on the progress of uploading and routing of GSET identifiers stored in the KDED 1b to buyer's computer 1c.

This module provides the dialogs shown in FIGS. 18-20 which are an alternate embodiment of the KDED 1b upload procedure and informational dialogs.

FIG. 18 shows initial output from this module instructing the user how to begin the uploading of GSET identifiers from the KDED 1b (in this case the Cyberpen™ KDED from Symbol Technologies) to the Buyer's Computer 1c FIG. 19 shows the module's feedback to the user during the GSET identifier upload procedure.

FIG. 20 shows the modules feedback to the user after GSET identifiers have been successfully uploaded and routed.

FIG. 21—Preferred Embodiment, Onscreen List After KDE Device Upload

FIG. 21 shows the dPASS main window in the preferred software embodiment. This figure shows the Buy Now List 21a which contains the products just uploaded from KDED 1b in the previous figures. Other uploaded information—like store inventory (i.e. type of products or specific brands and sizes) offered by Seller 1f along with Buyer's preferred route through the store, exercise performed, restaurant meals eaten, tasks completed, events attended,—would have been routed to other lists or storage—based on various criteria for future access or additional processing. Such routing can also be selected on-screen, if Seller 1f provides a map of his/her store.

The main module of the dPASS application provides the display output for this main window and responds to events generated by user interaction with all the standard Windows interface elements (e.g. menus, resizing handles) and other dPASS specific elements like the speed buttons of Button Bar 21b for fast mouse access to frequently used functions or the list Navigating Buttons 21c used like VCR controls for the current list window, which is displayed in the Navigation Reference 21d. 21e Quantity Column provides an intuitive and easy way to adjust the quantity of each product desired with either the keyboard using arrow and number keys or the mouse with Spin Buttons 21f, which are displayed automatically in the quantity field as each product is selected; note also that in this embodiment only the white "Qty" can be edited directly on-screen; in other embodiments Buyer 1a can type products directly into the Product Column 21g. Clicking a particular column title in the Title Row 21h will sort the list on that column. Date Line 21i is always the first line in the list and displays the date this list was created. Store Name 21j can display either the name of the Seller 1f sponsoring or providing dPASS to Buyer 1a or the name of the store for which this list is organized (i.e. buyer's preferred route through this store and products available in this store if provided by a participating sellers); if an inventory of available products is provided for this store, only those products available there would be on this list with the remaining products for this shopping trip displayed on another list.

FIG. 22—Preferred Embodiment, CD Catalog Window

FIG. 22 again shows the main application window, but now with an electronic grocery version of Catalog & Cookbook 1k which had been copied from the Removable Media 1h to the harddisk of Buyer's Computer 1c for faster access. Catalog Name 22a lists the name of the catalog, which can be the name of a sponsoring store—if this is a closed shopping system tied to a single store or chain—or a generic name like "Groceries" or "Southern California Groceries" for regionally adjusted catalogs of products. Category Tabs 22b provide a quick, intuitive, and easy way to find and change the category of good, services, events, or tasks (GSET) displayed; they can be changed with shortcut keys (i.e. <alt>+the underlined key (e.g. [Alt][P]for "Produce" Tab 22c)). The instantly available electronic catalog on the harddisk or Removable Media 1h (as compared to an slow internet download of each picture) provides the opportunity—if desired by the Manufacturer 1j—to display a large, high-quality Picture 22d of each product or service provides new marketing space to Sellers 1f and Manufacturers 1j. Product Information 22e displays nutritional information on food products for fast and easy reference buy Buyer 1a; something particularly helpful for people on special diets. dPASS can also organize and display foods and recipes based on various nutrient criteria (e.g. low salt or low fat) via SQL queries, limiting display of products to a particular nutrient range, or by sorting on various nutrients; all of which happen instantly, because DPASS runs on Buyer's Computer 1c, not a remote server communicating with Buyer 1a via a tiny pipe such as a dialup or even the fast Digital Subscriber Line (DSL) connection to the Internet, which can become clogged, or even gridlocked, with traffic at any time. For non-food products, this Product Information 22e window or area can display other information meaningful for that particular product, such as the holding capacity of a particular concrete anchor. The Specials window 22f can display Manufacturers 1j or Seller 1f specials provided on the electronic catalog or downloaded from Other Data 1i via the Communications Network 1e. GSET List 22g displays an alphabetical listing of the goods or services in the category selected; for large categories GSET's can be grouped by brand or broken into meaningful subgroups. Also, Manufacturers 1j willing to pay for the privilege can have their goods or services displayed higher in the GSET List 22g, and rows can be alternately highlighted to increase visual differentiation of lines while still using a smaller font to display the maximum number of products at a time; naturally, dPASS users can change these fonts using Windows to a larger size if desired. Status Bar 22h can inform the user of the current activity and window (in this case editing the quantity field of the currently highlighted shopping list window). Other interface elements (e.g. menus, scroll bars, etc.) would conform to Window standards, or the standards of other computer platforms like MAC™ for Linux™.

This version of Catalog & Cookbook 1k can be updated periodically with changes good and services, new and updated layouts and inventory seller's in buyer's neighborhood, and specials. These updates could be distributed on either Removable Media 1h or via connections to the Communications Network 1e (e.g. the Internet).

FIG. 23—Preferred Embodiment, Adding Items Via UPC Progressive Search

FIG. 23 shows Buyer 1a adding another product to their shopping list by using the progressive search capabilities of the UPC Lookup List 23a of the UPC Dropdown List Box 23b. The Search Result 23c highlights the current best match to the UPC typed. Pressing <ENTER>(i.e. ↵) when the right product is highlighted adds it to the list.

FIG. 24—Preferred Embodiment, Adding Items Via Produce Name Progressive Search

FIG. 24 shows Buyer 1a adding another product to their shopping list by using the progressive search capabilities of the Product Name Lookup List 24a of the Product Name Dropdown List Box 24b. The Product Search Result 24c highlights the current best match to the product name typed. Pressing <ENTER>(i.e. ⏎) when the right product is highlighted adds it to the list.

FIG. 25—Preferred Embodiment, IntelliFind Window for Searching All Categories

FIG. 25 shows the IntelliFind™ Button 25a which is one way to open the IntelliFind™ Window 25b listing all the products in the electronic catalog in alphabetical order by product name. The user types the product name or some portion of the name into Find Product Edit Box 25c. Also, the fact that the IntelliFind™ Window 25b is a non-modal window instead of a dialog means that it can be always available on-screen, and not have to be called up each time the user wants to search for another product, service, event, or task, which also makes the application faster than dialog based searching functions. Also, because these searches are conducted against a local database or Removable Media 1h they are significantly faster than a search done across a slow Communications Network 1e on a remote server in contention with hundreds or thousands of other users on the same computer.

FIG. 26—Preferred Embodiment, Progressive Partial-Name Search Using IntelliFind

FIG. 26 shows the search getting progressively closer to the desired product as the user types in some meaningful portion of the product they're looking for into the Find Product Edit Box 25c, in this case, all products with the word "chocolate" in their name. Search Results List 26a shows the progressively smaller list of products matching the search criteria typed into Find Product Edit Box 25c. Again, when the correct item is selected by the Product Selection Indicator 26b Buyer 1a can add the selected item to the list by pressing <ENTER>(i.e.⏎), dragging-and-dropping the item to the shopping list, or double-clicking the item, or via cutting-and-pasting the item into the shopping list. Providing users with all these standard Windows methods of interacting with the software is just one of the many things that make dPASS easy to use, intuitive, and flexible, and adaptable to each users' preferred method(s) of computer/software interaction.

FIG. 27a—Preferred Embodiment, List For Self-Shopping

FIG. 27a shows the preferred embodiment of the list used for self-shopping by Buyer 1a at the physical store of Seller 1f Since this list is tailored for a particular Store 27a3, it is organized by Aisle, Side, Shelf 27a4 for that store. If a layout for the store isn't available, either because Seller 1f choose not to participate in DPASS or hasn't made the stores layout available as part of their dPASS participation, or if the user hasn't yet mapped their route through that store, then the list can be organized by standard categories like "canned goods" and "produce" or alphabetically. Coupon Flags 27a5 remind the shopper they have a coupon for that product. Product Pictures 27a1 help the shopping quickly identify the correct product to pull off the shelf, which is particularly helpful if the person doing the shopping—say a husband, teenager, or housekeeper—isn't the one who selected the product. This is one of the many ways dPASS helps eliminate errors, which I think reduces frustrations and stress over buying the wrong product. The List Barcode 27a6 is captured by the KDED 1b after that product is pulled from the shelf for purchase. It's composed of the product's UPC code (or a dPASS assigned 12 digit code), a "B" prefix to denote that the product was bought, and a numeric prefix to indicate which list the product is on, so that it can be removed from the list and not automatically carried forward to the next shopping trip or event. Note that while the numeric value of the UPC portion of List Barcode 27a6 is the same as the product's UPC, the symbology used to display this value along with the two prefixes is different (in this case Code 3 of 9) to support the composite List Barcode 27a6 and to make it smaller. All List Barcodes 27a6 that haven't been lined through with a wide felt-tipped marker as shown by the line through a List Barcodes 27a6 as a Not Bought Designator 27a2; by hiding the List Barcodes 27a6 of products not bought, the shopping list can also be used for faster clerked checkout or even self-checkout if Seller 1f chooses. This is accomplished by scanning the exposed barcodes on the shopping list with seller's point-of-sale (POS) scanner, instead of having to remove, rescan, and recart each product; a significant time and labor savings. If seller's POS scanner can't read the List Barcode 27a6 symbology or extract the UPC from the composite List Barcode 27a6, then the list can be printed with the prefix and UPC separated and the UPC printed in the standard UPC symbology readable by all UPC enabled POS scanners.

FIG. 30—Preferred Embodiment, First Tab Of Order Form

FIG. 30 shows where a Buyer 1a can chose which Items-to-order 30a for pickup or deliver and which they'll get themselves. The List Input Box 30b lets the user easily select which shopping list to send to Seller 1f. Instruction Panel 30c provides user instructions while Page Tabs 30d make completing and retaining the various steps of the electronic order intuitive and logical. By providing Buyer 1a with the option to self-shop, Buyer 1a can benefit from dPASS without having to divulge their buying preferences or patterns; thereby giving them control over their privacy.

FIG. 31a—Preferred Embodiment, 2nd Tab, Electronic Order Form With Pop-up Calendar FIG. 31a shows the Dropdown Calendar 31a1 of the Pickup or Delivery Date Input Field 31a2 displayed for intuitive and easy selection.

FIG. 31b—Preferred Embodiment, 2nd Tab, Electronic Order Form

FIG. 31b shows the Date/Time 31b1 shows the date selected by Buyer 1a and provides a place for him/her to request a pickup or delivery time. Pickup/Delivery Window 31b2 provides Buyer 1a the window of time, as determined by the Seller 1f, when the order will be ready for pickup or delivered. An alternate embodiment would download available pickup and/or delivery times from Seller 1f and present those to Buyer 1a for selection.

FIG. 32—Preferred Embodiment, 3rd Tab, Electronic Order Form

FIG. 32 shows the last tab or step in the electronic ordering process. The two Radio Buttons 32a enable Buyer 1a to select their method of payment. An alternate embodiment would provide another radio button for "cash" if Seller 1f wants to accept cash payments for deliveries, or if Buyer 1a has selected to pickup their order, identifying themselves only by a dPASS generated order ID sent to Seller 1f without the buyer's personal information; thereby allowing Buyer 1a to pickup and pay anonymously, again giving Buyer 1a the power and flexibility to determine the level of privacy important to them. The Credit Card Info group 32b enables the Buyer 1a to easily enter their credit card information, and designate whether to store their card information on their computer to speed future orders.

Another alternate embodiment for protecting buyers' privacy would be to route all orders though a purchasing agent's website that filtered out buyers' personal information, paid with their credit card, and picking up or accepting delivery of the order on buyer's behalf FIG. 33—Preferred Embodiment, Preparing Electronic Order thru FIG. 35—Preferred Embodiment, Electronic Order Successfully Sent This module provides a dialog with user feedback on its process sending the order electronically to a participating Seller 1f who offers pickup and/or home/office delivery. FIG. 33 shows the progress of preparing the order for the preconfigured Communications Network 1e (e.g. the Internet, direct modem-to-modem/buyer-to-seller, or fax) for this Seller 1f. FIG. 34 shows the progress of the actual order transmission, while FIG. 35 provides the final confirmation that the order was received properly or what problems were encountered. Alternate embodiments would display FIG. 36a—Preferred Embodiment, Payment Portion Of Electronic Order FIG. 36a shows the preferred embodiment of the delivery and payment portion of the electronic order after it has been received and printed out by Seller 1f. This portion of the order displays whether it's a pickup or deliver order, the date and time of the pickup/deliver, delivery address, Buyer 1a information, and payment information. This portion of the order is connected to the Pull list portion in Fig by Account Number 36a1.

FIG. 36b—Preferred Embodiment, Shopping List For Brick-N-Mortar Store

FIG. 36b shows the preferred embodiment of the store pull list for an electronic order to be picked up or delivered. It is nearly identical to the barcoded shopping list of FIG. 27a, except that the product barcodes are printed in UPC symbology to make scanning the list for checkout function better with a greater variety of POS scanners. Account Number 36a1 on the pull list and payment portions of the order tie the two parts together. This is another way dPASS protects buyer's financial security and personal privacy; hiding payment, personal identification, and buying information from the low level clerks pulling the order.

An alternate embodiment for the pull list of FIG. 36b is to download one or more lists into a industrial strength keypad/LCD augmented KDED 1b to 1) several orders to be pulled at once and sorted into the right pickup/delivery box right there in the store aisle via KDED 1b LCD prompts, 2) verify the right product was pulled by scanning either the barcode on the list and on the package, or just the barcode on the package and comparing it to the UPCs of the shopping list downloaded into the KDED 1b, and 3) verifying the product went into the right delivery/pickup box by next scanning the barcode on the container so the KDED 1b can match it to the either the container ID scanned off the list or stored in the KDED 1b for that list, and 4) upload the lists of actual items pulled for each order into the POS system for quick checkout without specialized terminals or rescanning the individual packages.

An additional embodiment for this store mapping module is to determine the optimal geographical route between tasks or events. This would be accomplished by combining the task or event identifier with it's physical location using things such as its address, geographical coordinates—from say a global positioning system (GPS) receiver—Thomas Guide page and grid coordinates and mapping information. Then future days requiring travel to these same locations could be organized according to various criteria, such as: shortest travel distance, least travel time, ending nearest home.

FIG. 38, Preferred Embodiment, Barcoded Restaurant Menu

FIG. 38 shows the preferred embodiment for the tagged menu feature, where each item on the menu of participating restaurants has its own unique token. In the currently preferred embodiment, this token is a unique barcoded identifier. Alternately, with more a more capable KDED 1b and KDED 1b readable token, the menu token 38e could contain more information than just a unique identifier or index into a database containing all the pertinent item information, such as: nutritional, reheating, and other information about said menu item. In the preferred embodiment the token 38e is a Code 3 of 9 barcode with the Identifier Prefix 38b indexing specific dPASS information for token routing or output to Buyer 1a, the Source ID 38c coded to indicate that this token came off a restaurant menu, and the Vendor-item Identifier 38d translated from the vendor's UPC for that item or a dPASS assigned 12 numeral vendor and item ID. The various parts of the token are used to route the token to the right list after upload from the KDED 1b, and to access information about said menu item stored on Buyer's Computer 1c or on Other Data 1i.

FIG. 38—Preferred Embodiment, Health Feedback Window

FIG. 38 shows the display window for this health module. After the nutritional information for restaurant menu items has been retrieved, DPASS adds that to the correct user's food consumption list—based either on a previously captured user IDs from a Quick-Scan Card 1L or based on the unique KDED 1b identifier and its assignment to a particular individual. The module combines this restaurant consumption information for each individual with estimated home comsumption based upon: 1) the values provided the Whenever request, dPASS then displays all stored health feedback to Buyer 1a as depicted in FIG. 37—Preferred Embodiment, Health Feedback Window.

Preferred Embodiment—Operation
  Overall
  The personal automation and shopping system (dPASS) also adds a unique barcode to each item on the shopping list to be purchased as in FIG. 36b. This enables the consumer to check off each item bought in the store by simply scanning this barcode on the list using the KDED 1b. This barcoded printout can also be scanned by Seller 1f's point-of-sale (POS) scanner; thereby enabling either self-checkout or faster clerked checkout, at significantly lower cost than a dedicated, special-purpose, self-checkout stations Alternately, the KDED 1b storing the barcodes of items taken off the shelf for purchase can be quickly downloaded to the retailers POS terminal for rapid to nearly instantaneous checkout. The listing or KDED 1b would also contain data or a barcode uniquely identifying the shopper for payment purposes. Lining through, like at 27a2, all barcodes on the list of items not pulled for purchase that not pulled for purchase using a wide felt marker would prevent the POS from scanning and charging Buyer 1a for those items. The dPASS also includes both of these methods for updating the database on the Buyer's Computer 1c with which items were and were not purchased; it can also update the stored lists base on a scanner and optical character recognition, if its so equiped.

The printout from the Buyer's Input/Output Device 1d can also include a picture of the product, like at 27a1; thereby helping to ensure that the correct product, and not some closely related product, is bought (e.g. not buying Colgate Tartar Control Toothpaste when what they really wanted was Crest Multi-Care Whitening Toothpaste Classic) as depicted in FIG. 27a—Preferred Embodiment, List For Self-Shopping, object 27a1. This can be especially important when the shopper is not the person compiling the list (i.e. another family member doing the shopping for the cook). The dPASS software can also print out instructions or product names or descriptions in other languages if the person pulling items speaks the buyer's language as a second language (e.g. a non-English speaking employee does the shopping for an English speaking buyer, or visa versa).

This includes typing in the name of a product, searching for a product, performing a progressive search by product name or universal product code (UPC) or stock keeping unit (SKU) via the Buyer's Computer 1c, using the Keyless Data Entry (KDE) Device 2 to scan the UPC barcode on a product using portable, disconnected barcode reader such as the Symbol Technologies™ CS1504 Consumer Memory Scanner, or using voice input and recognition via a microphone or portable recorder such as the Dragon Systems' Naturally Speaking™ voice recognition software and their portable voice recorder. Items can be added to the database before shopping or placing an order with a vendor (e.g. reviewing items in inventory for replacement, as a product is being pulled from inventory, as the product is being consumed, just before the package for a depleted product is discarded, or at any other time.) Buyer 1a can also easily add frequently used items by scanning the barcode associated with nonUPC items (e.g. fruits and vegetables, individual items sold by the box like pens, etc.) listed on a sheet or printout that can be attached to a wall or other surface or kept near the point of selection (e.g. stuck to the refrigerator door). The Home Market Manager application enables Buyer 1a to select and configure what items are listed on the Quick Scan Card 1L and then print it out to Buyer's Input/Output Device 1d.

In addition to adding items via package labeling, UPC, or other automated identification tag, consumers can add items from a printed Catalog & Cookbook 1k using one of the keyless data entry (KDE) devices 2 listed or that may be developed in the future. This Catalog & Cookbook 1k is part of the personal automation and shopping system, and items would be organized in one or more ways, including, but not limited to: alphabetically, by category, by manufacturer, by retailer, by some product characteristic (e.g. "low fat" for groceries, "recycled" for printer paper, etc.) Each product would include at least its name and some unique, keyless data entry symbol/tag. The consumer would add a product to the database from the Catalog & Cookbook 1k by entering the product information manually as described above—dataflow from 1k to 1c—or by acquiring the unique symbol/tag (e.g. barcode) identifying the product by one of the KDE devices 2 cited above. Depending on the mode of data entry, the product would immediately be added to the database or stored temporarily in a portable KDED 1b for later transfer to the database stored on the Buyer's Computer 1c. This Catalog & Cookbook 1k could also include one or more additional product information, including but not limited to: unique characteristics as described above, cost, size, quantity, picture or other graphic, manufacturer, etc. This same information and possibly additional information could also be made available on some removable, computer readable, data storage device 1h (e.g. compact disk—read only memory (CD-ROM), digital video/versatile disc (DVD), etc.) (hereafter called "removable media"). Examples of other information that might be included on such removable media includes, but isn't limited to: usage instructions, multimedia advertising or other vinettes, related or other items required for usage of the desired items, safety information, nutritional information for foods, coupons or specials, suitable substitutes, compatible consumption devices (e.g. printers that use this inkjet cartridge), etc.

The Catalog & Cookbook 1k and Removable Media 1h could be general in nature—listing all items for a particular market (e.g. groceries, office supplies, building items, house-cleaning services and the types of cleaning they do, auto repair shops and the types of services they provide, etc.), or it could be tailored to some significant market segment (e.g. all the products carried in one grocery store or all grocery stores in a particular geographic area, all vendors providing raw materials to a particular manufacturing industry, etc.) The Catalog & Cookbook 1k and removable media 1h would normally be provided when the consumer acquires this personal automation and shopping system, or shortly thereafter so that the correct version of the Catalog & Cookbook 1k for their locale, industry, etc. could be provided. The Catalog & Cookbook 1k and removable media 1h could also be updated periodically (e.g. every day, monthly, quarterly, yearly, etc.) to reflect changes in products carried or available. This update could occur by the personal automation and shopping system manufacturer, by retailers carrying the products in the Catalog & Cookbook 1k and removable media 1h or by the manufacturers of the products sending out new catalogs 1k and removable media 1h to all registered users of the personal automation and shopping system, electronically via some Communications Network 1e (e.g. the Internet, private electronic marketplace, etc.) with the Internet as the preferred embodiment of the Communications Network 1e.

The Catalog & Cookbook 1k and removable media 1b would also include a multimedia cookbook, how-to manual, or other appropriate guide for the market being automated by the personal automation and shopping system. For the Catalog & Cookbook 1k for the grocery supply chain, for example, this would mean a textual list of ingredients and instructions, one or more pictures with a single barcode or other symbology identifying that particular recipe or dish. By scanning that barcode using the KDED 1b, or by adding the value of the that recipe's barcode or tag to the memory of the KDED 1b using the device's keyless acquisition method—the software of the personal automation and shopping systems would add all the ingredients to the consumer's shopping list stored on the database residing on the consumer's Computer 1c, or only those items from the recipe which the consumer doesn't already have on hand (i.e. that isn't already in their inventory.)

The personal automation and shopping system software running on the Buyer's Computer 1c effects the download of stored product identifiers from the KDED 1b, adds the items to the shopping list, and displays them on the Buyer's Computer 1c screen for review and adjustment. Buyer's Computer 1c performs many of data storage, manipulation, control and output functions of the personal automation and shopping system.

Other Data 1i are external sources of information used by the personal automation and shopping system. Some examples of Other Data 1i, but not limited to these examples, are informational databases and Internet sites of various companies, organizations, and government agencies (e.g. Betty Crocker www.bettycrocker.com, American Heart Association, the Food and Drug Administration). This Other Data 1i when combined with product consumption information gathered by the personal automation and shopping system and stored on Buyer's Computer 1c enable Buyer's Computer 1c to generate more useful information for Buyer 1a that allows Buyer 1a to improve their operation, interaction with the supply chain being managed by the personal automation and shopping system, or better achieve their goals. For example, if personal automation and shopping system is used to support the grocery supply chain, personal automation and shopping system combines consumption information about each member of Buyer 1a's household, personal information about each member of the household (e.g. dietary or health requirements like low fat, high fiber)), and Other Data 1i (e.g.

fat and fiber targets for good heart health) to provide feedback that the meals being served are too fatty.

Manufacturer 1g can be any manufacturer (mfg.) or service supplier, including but not limited to: packaged goods manufacturers (e.g. grocery manufacturer like Kraft Foods), office supply mfg., building supply mfg. (e.g. Georgia-Pacific), auto repair, etc. Product information can be added to the Catalog & Cookbook 1k and the Removable Media 1h by either the Manufactuer B, the Seller 1f, or the company manufacturing and selling the personal automation and shopping system. This is for both the initial sale of the personal automation and shopping system and subsequent, periodic updates. The information can also be gleened from $3^{rd}$ parties via Other Data 1i, such as 1800SKUfinder (www. SKUfinder.com)

The personal automation and shopping system also provides integrated ways for Manufacturer 1g and Seller 1f to manage the supply chain between them either directly (e.g. virtual private network, direct connection over leased data lines, etc.) or via the Communications Network le using standard protocols (e.g. XML, SOAP, HTTPS, etc.) This integrated interaction includes exchanging information, included but not limited to: ordering, delivery confirmation, pricing, return authorization, warranty requests, manufacturer specials, etc.

The Seller's Input/Output Kiosk 1j servers several functions. It provides product location information within Seller 1f's store, it allows Buyer 1a to their KDED 1b to the store and download their KDED 1b at the Seller's Input/Output Kiosk 1j which contains a store-centric version of the Home Market Manager (HMM) application portion of the personal automation and shopping system. This kiosk version of HMM has as similar look, feel, and functionality as the one running on Buyer's Computer 1c (i.e. it can organize, store, manipulate, shopping list and customer information). However, when it comes to printing out a shopping list, it's already set to print a list optimized for that store. HMM, whether in the store or home version, can divide the list into a portion of the products to be pulled from the shelves or backroom stock by Seller 1f and the remainder to be fetched manually by Buyer 1a. This enables Buyer 1a to organize the actually fulfillment in the most satisfying way (e.g. done all by Seller 1f for maximum time savings; done all by Buyer 1a for maximum flexibility; heavy, bulky, and boring stuff {e.g. dog food, cases of printer paper, etc.} fetched by Seller 1f. Seller's Input/Output Kiosk 1j can also interact with Buyer's Input/Output Device 1d. In an additional embodiment Seller's Input/Output Kiosk 1j can be configured as a self checkout stand for Buyer 1a.

The KDED 1b can also be used to build a layout for the store of any Seller 1f, not just those Sellers If using the personal automation and shopping system. This layout information stored in the KDED 1b is then download to Buyer's Computer 1c where it can be stored and manipulated. The Buyer 1a signifies that all following barcodes constitute a store's layout by first scanning a barcode of personal automation and shopping system used to indicate that all subsequent barcodes until the Layout End barcode constitute a store's layout in the order Buyer 1a wants to navigate the store and the order in which product groups (e.g. canned peas followed by canned corn) will appear as Buyer 1a navigates through the store in the specified order. This feature of personal automation and shopping system allows Buyer 1a to decide how detailed a store and product layout they want to construct by how many product group barcodes they scan while recording a store's aisle and shelf layout.

The software and database portions of the personal automation and shopping system store, manipulate, track, and present both products, various other product information, shopping and other types of lists, payment information, store information, and a variety of other data and information relating to products bought or consumed and the particular market that the personal automation and shopping system is supporting. In the grocery market, such additional information might include, but not be limited to:

Nutritional requirements and information,

Exercise information,

Multimedia cooking instruction

Establish relative consumption rates or amounts for the various family members which could be combined with the above nutritional information and then provide feedback on each family members consumption of good and bad food products (e.g. servings of fruits and vegetables vs fats and sugars) over time combined with weight and exercise information; thereby improving users' knowledge of their consumption patterns and the results these consumption patterns have on attainment of the users' long term goals (e.g. living long and healthily).

By Seller

Seller can use the personal automation and shopping system in a variety of ways. Seller 1f can provide the personal automation and shopping system manufacturer with an extract of Seller 1f's inventory for inclusion on the Removable Media 1h at an interval of Seller's choosing; thereby allowing Buyer 1a to customize their shopping list, both in content and in organization for the particular Seller 1f Buyer 1a plans to shop at. At the next level Seller 1f install Seller's Input/Output Kiosk 1j in their store to enable Buyer 1a to download the KDED 1b in the store, and then manipulate the shopping list at the Kiosk. At the next level of participation, Seller 1f can allow Buyer 1a to send their shopping list to Seller 1f electronically via Communications Network 1e (e.g. using a fax over the public old telephone system, the Internet, some wireless network, or any other communications network which might become available in the future). Buyer's Computer 1c can also retrieve information on product specials via the Communications Network 1e directly from manufacturers 1g and Other Data 1i (e.g. coupon services, etc.) Seller can send out updated Removable Media 1b itself, or contract with the personal automation and shopping system manufacturer to do so, who can also extract updated information directly from Seller 1f's database system using standard query language calls or via custom applications extracting the updates via XML, SOAP or other Web Services.

Seller 1f can also chose to use the personal automation and shopping system to generate two-part pull lists for filling orders sent to Seller 1f by Buyer's Computer 1c via Communications Network 1e. FIG. 22 shows one embodiment of such a pull list, all embodiments of which are contained within this personal automation and shopping system; other embodiments can be created to suit the needs of Seller 1f as part of this personal automation and shopping system. One such embodiment of the personal automation and shopping system puts all the customer identifiable data in the first part of the pull list, which can be tightly controlled by Seller 1f for privacy and security of Buyer 1a's personal and financial information. This embodiment then puts all the product information in part two of the pull list, which is then given to any stock person for fulfillment. The two are linked at payment and checkout time by the Customer Number.

The preferred embodiment of the personal automation and shopping system includes a portable barcode scanner and with readout for use in filling the order. The clerk would first scan the barcode for a product, find the corresponding product on the shelf, fetch the product, scan the products barcode, and the scanner would be programmed to confirm visually with lights, readouts, sounds, or other means whether the clerk has fetch the product exactly matching the item on the pull list. An alternate embodiment of this feature would be to download the pull list into the portable scanner and have he call for each product in the order in which the aisles and shelves can most efficiently be navigated by the clerk. Again the clerk would scan each product as it was removed from the shelf, scan it, and the scanner would confirm that the clerk had pulled the right product. These embodiments of the personal automation and shopping system also have the ability to printout pictures of the product and text descriptions in the dominant or native language of the clerk when it is different from the native language of Seller 1f or Buyer 1a, thereby reducing mistakes in product retrieval. The scanner used by the clerk to pull products could also store the barcodes in memory when the product and pull list scanns match for fast, accurate check out by simply downloading the list of UPC's pulled and the Customer Number for Buyer 1a. Alternately, the clerk could hide the UPC barcode on the pull list for any items not in stock and not pulled for the customer, then at checkout, the unobscured barcodes on the pull list could be scanned by Seller 1f's point of sale scanner in one continuous succession. Like self-checkout systems in past systems, this eliminates two or three additional handlings of the products pulled (i.e. from the shopping basket to the conveyor belt at the POS terminal, across the scanner at the POS terminal, after scanning at the POS terminal back into transportation containers.) Seller 1f can also add this additional embodiment of the personal automation and shopping system for products pulled by Buyer 1a, again resulting in savings of time and handling.

Sellers 1f who want to use all the features of the personal automation and shopping system can provide the following additional embodiments of the personal automation and shopping system. They can send to Buyer 1a via the Communications Network 1e and the Buyer's Computer 1c product price information, specials, discounts, advertising, confirmation of order receipt, final cost of order, confirmation of delivery or pickup time, etc. which can be presented to Buyer 1a via Buyer's Computer 1c or Buyer's Input/Output Device 1d. For example, FIG. 10 shows a "Club: 2 for 1" special in the yellow "specials" area of the Home Market Manager application catalog window. The Seller 1f portion of the personal automation and shopping system can also organize multiple pull lists so one clerk can pull multiple orders during a single trip around the store, send the pull list electronically within Seller 1f's facility to an automated fulfillment warehousing system, organize delivery routes to minimize time and expense to Seller 1f, By Buyer This Auxiliary Input Keypad 3d can be used to enter also enables dPASS and the KDED 1b to automate other daily functions, including tracking mileage for tax pur From the foregoing description of the personal automation and shopping system it should be seen that the personal automation and shopping system provides Buyer 1a with great flexibility in operating and using the personal automation and shopping system. For example, Buyer 1a can select all products to be bought directly from the PC by using Windows during one or more executions of the Home Market Manager application of the personal automation and shopping system. Buyer 1a can also add products to the KDED 1b as they are consumed during meal preparation as depicted in FIG. 3, KDED Used For Point-Of-Consumption Selection Via UPC barcode. The KDED 1b can sit on the kitchen counter, or be carried by Buyer 1a for immediate, disconnected use anytime and any place (e.g. while watching their child's baseball game or after having a new flavor of soda at a friends house.) Buyer 1a can capture the UPC barcodes from products 3b already on hand that need replenishing before they are depleted. Buyer 1a can also browse through and select from the Catalog & Cookbook 1k, wherever it's convenient. Browsing's easy as shown in FIG. 6, Barcoded Catalog Of Groceries, using Category tabs 6c and Subcategory headings 6d to quickly find the desired page, and then GSET names and pictures 6a easily identify the desired GSET. They then capture the KDED 1b readable identifier 6b using the KDED 1b. Alternately, they can browse through the recipe/cookbook of Catalog & Cookbook 1k, select a recipe they want to make as in FIG. 7, Sample Recipe Page, and either capture the KDED 1b readable identifiers of individual ingredients 7a that they need, or the Recipe Identifier 7b, which will either 1) add all ingredients to the shopping list, or 2) only those ingredients not on hand, assuming Buyer 1a has chosen to establish an ideal inventory. In this way Buyer 1a can plan an entire week's menu and prepare a shopping list quickly from the Catalog & Cookbook 1k while at the kids' ballgame, waiting at the doctor's office, aboard an airplane waiting to takeoff (when Buyer's Computer 1c must be turned off), etc.

Buyer 1a would then either take the KDED 1b directly to Seller's Input/Output Kiosk 1j for download or download the KDED 1b into Buyer's Computer 1c (please see FIGS. 4-9). Typically, Buyer 1a would next adjust quantities on screen, either at Seller's Input/Output Kiosk 1j or Buyer's Computer 1c by either editing the quantity field directly (please see FIG. 9), by using the spinner buttons, or other Window standard methods. Buyer 1a could then type-in or do a progressive search on a product name or UPC using the type-in/drop-down boxes show in FIG. 9.

Again, Buyer 1a can add additional products from the onscreen catalog and recipe database contained on the Removable Media 1h by double-clicking, drag-and-drop, etc. Buyer 1a also use the personal automation and shopping system's IntelliFind™ window (please see FIG. 14) to quickly search for all products with a given name or alphanumeric string in the name, then add the product to the shopping list—in one of the manners previously described—from a progressively shorter list of possibilities as Buyer 1a refines their search criteria. If Seller 1f has decided to use personal automation and shopping system and participate in personal automation and shopping system manufacturer's network, Buyer 1a can also retrieve special, updates, etc. from the Communications Network 1e that can update the database of products stored on Buyer's Computer 1c either directly from Seller 1f's database or from the website or database of the personal automation and shopping system's manufacturer.

Once Buyer 1a is satisfied with their shopping list they will typically do one or more of the following. Buyer 1a can save it on the nonvolatile storage system of Buyer's Computer 1c, send it electronically to Seller 1f via Communications Network 1e as depicted in FIGS. 16-21 of one preferred embodiment for the grocery market. FIG. 16 shows the dialog where the user can select which items they want Seller 1f to pull and have ready for pickup, or that they want delivered (assuming these additional services and embodiments of personal automation and shopping system are support by the Seller 1f of Buyer 1a's choice, or by the Seller 1f providing the personal automation and shopping system to Buyer 1a.) The products not sent to Seller 1f for pickup or deliver can then be printed out on or sent to Buyer's Input/Output Device 1d (please see FIG. 15) for use by Buyer 1a while shopping themselves for these remaining items at Seller ifs store. FIG. 17 shows the dialog tab where the Buyer 1a provides Seller 1f with the payment information. FIG. 18 shows the dialog tab where Buyer 1a can select and provide pickup/delivery time and location.

What happens next depends on whether Buyer 1a then selected home delivery, partial or full pickup of the order after pulling by Seller 1f, or self-shopping. If Buyer 1a selected home delivery, an embodiment of the personal automation and shopping system not shown allows Buyer to easily confirm receipt of the correct products by either downloading the pull list into scanner or PDA embodiment of Buyer's Input/Output Device 1d, and then scanning each product before its put away. The scanner or PDA would provide immediate confirmation of each product as correct or not similar to the way it does in the Seller embodiment of the same feature. The user can also scan each product using the KDED 1b, then download these barcodes or other symbologies/tags into Buyer's Computer 1c to update the current shopping list with what was bought and what wasn't bought should be carried forward to the next shopping list. Buyer 1a can also accomplish this in the store by scanning barcode printed on the shopping list for each item that they pull from the shelf and buy. A PDA embodiment of Buyer's Input/Output Device 1d can also receive the entire shopping list so that it only has to be taken to the store to guide the shopper in the most efficient or preferred route through the store, scan products before they're put into the shopping cart—which then can be download into Buyer's Computer 1c later to update the shopping list—and speed and facilitate checkout by downloading all products pulled directly into Seller's Input/Output Kiosk 1j, if used as a checkout station, or POS terminal.

{**}

If Buyer's Computer 1c is located in the kitchen, it can display the recipe for the meal being prepared, along with step by step multimedia cooking instructions (e.g. showing someone making scrambled eggs.) It can even provide this in real time (e.g. it tells the user to heat the spaghetti sauce on low until the following music passage ends). If Buyer's Computer 1c isn't in the kitchen, the audio portion of the real time instructions for the meal can be download into a portable audio device—like an MP3 player—or text and graphics to a PDA embodiment of Buyer's Input/Output Device Id for use in the kitchen.

FIG. 24 shows the preferred embodiment of the shopping list for Buyer 1a as it would apply to the grocery market. Note the 3 of 9 barcode preceding each product. The leading 3 digits designate the date of the shopping list while the final 11 digits are the UPC for the product. The "B" is used to indicate that this barcode signifies the product was purchased, and should be removed from the shopping list stored in Buyer's Computer 1c when the KDED 1b is again downloaded into Buyer's Computer 1c. Also note how the specific location is specified for each product according to its location within this participating grocery store. The "Coupon!" reminds Buyer 1a that they have a discount coupon for this product. If Buyer 1a has a color printer, this embodiment could also have another column displaying thumbnail pictures of the products.

illustration should not be construed as limiting the scope of personal automation and shopping system in any way to a particular market (e.g. food, office supplies, etc.), Buyer 1a segment (e.g. individual consumer or families and not businesses, or food vendors' and their suppliers, only Americans) or marketplace (e.g. America but not Europe); personal automation and shopping system can be embodied and adapted to any market; Buyer 1a, Seller 1f, and Manufacturer 1g; any country, etc.

Other operational aspects of the Home Market Manager application portion of the personal automation and shopping system not shown in the Figures include:

The ability for Buyer 1a to configure the application for their family (e.g. food preferences, dietary requirements, family composition {which can be used to allocate standard portion sizes of complete meals to individual family members for nutritional or health tracking based on Buyer 1a feedback, automated personal automation and shopping system feedback like scales and vision sensors, or government or other accepted standards; for example, teenage boys eat twice as much as a normal adult}, directories/folders where favorite shopping lists or historical shopping lists should be stored, type of connection to the Communications Network 1e, favorite Sellers 1f, etc.)

The ability to save favorite shopping lists (e.g. standard weekly grocery list, Christmas dinner, kids birthdays, etc.) for subsequent editing, usage, or merging with the current shopping list.

Type of Buyer's Input/Output Device, such as color printer, existence and type of personal digital assistant, etc.

Selection of the Seller 1f where Buyer 1a will be sending this order or using the current shopping list, so they can be organized for that particular Seller 1f. The module that helps create this store specific shopping list also enables Buyer 1a to map the layout and capture the inventory of stores which either don't participate in dPASS or participate but choose not to share this information. In its preferred embodiment, the shopper captures a Quick-Scan 1L denoting the start of a shopping trip. They then travel through the store along the route they prefer. As they pull each product on the shopping list off the shelf, they scan it's identifier on the shopping list, to denote the order in which their shopping list items appear. They also capture the UPC or other identifier for other products they might want to buy in the future or to record grocery categories that don't appear on the shopping list; again each new product ID increases the detail of the store map and buyer's route. Buyer 1a would use Quick-Scans 1L to capture the order in which things like produce and meats appear along his/her route. When finished shopping, Buyer 1a captures a "stop shopping" Quick-Scans 1L. When uploaded, the router in the upload module recognizes the start and stop shopping codes so it knows that:

1. shopping list scans denote both purchases and route information and sends this information to the inventory, store mapping and appropriate shopping list modules for further action;
2. shopping list items not scanned indicate both products not bought and not in this store's inventory, so it routes these to the inventory module update and the shopping list module to be carried forward to the next shopping list; and
3. UPC's indicate both more detailed inventory and route information routing this data to the mapping and inventory modules for processing and storage.

Then when Buyer 1a selects a store for their next shopping trip, the inventory module and route modules can recall the inventory and route for the selected store, create one or more shopping lists (i.e. one if the selected store carries all the items on the list or a second list with those items not carried by the store) and arrange them according to buyer's preferred route for this store. This process also automatically updates the inventory, store layout, and route information each time the buyer shops to reflect changes in store layout, inventory and preferred routing. Naturally, the shopper can skip this update by not capturing the start and stop-shopping codes. Store layouts and inventories can also be update from Removable Media $1i$ or Communications Network $1e$ downloads provided by participating Sellers. Additional embodiments provide store layouts on-screen on Buyer's Computer $1c$ so they can layout or update their route before going to the store. This KDED $1b$ enabled Buyer $1a$ mapping ability is a key automation feature of dPASS and a major reason the shopping system can be distributed and seller independent or cooperative.

Other Sellers $1f$ where Buyer $1a$ may shop

Manual addition of products to the database of products

Create and maintain an ideal inventory and depleted from that inventory; thereby allowing the application to provide Buyer $1a$ with suggestions of meals that can be fixed with the products on hand Storing buying history information and then providing Buyer $1a$ with reminders of products that may be getting low or that appear to have been unintentionally left off the current shopping list based on past buying patterns. This feature of personal automation and shopping system can also recommend on the shopping list or Buyer Input/Output Device $1d$ containing the shopping list a recommended product expiration date to buy if necessary because of slow historical rates of usage of that product.

Display only those products in from the product database stored on Buyer's Computer $1c$ or available on Removable Media $1h$ which conform to dietary or other Buyer $1a$ selectable criteria (e.g. only low fat products or sugar free products) and automatically divide products being downloaded from KDED $1b$ into two shopping lists: one that meets these Buyer $1a$ configurable criteria and those that don't.

Dividing the shopping list into two lists, two parts, or a shopping list for Buyer $1a$ and a pull list for Seller $1f$ based on the selections made on the dialog shown in FIG. 16 or based on what products are available from Seller $1f$ selected by Buyer $1a$ for this shopping trip or order.

Using the KDE device to record the layout of a store belonging to a Seller $1f$ who either isn't using personal automation and shopping system or doesn't provide Buyers $1a$ with store layout information. Buyer $1a$ records a store and shelf layout by first scanning an personal automation and shopping system barcode denoting that all subsequent barcodes or automated product identifies that follow constitute the store and product layout in the order in which Buyer $1a$ plans to navigate the store. When Buyer $1a$ has recorded enough product barcodes to produce a store and product shelf layout to a level of detail they desire, Buyer $1a$ scans an personal automation and shopping system barcode denoting the end of store and product layout barcodes. Buyer then downloads this information into Buyer's Computer $1c$ which stores the designed store and product layout barcodes or automated identification symbol in the layout recorded. The software also prompts Buyer $1a$ to input the name and location of the store corresponding to the layout just downloaded and stored. This process can be intermixed with the scanning of other barcodes before or after the Start and Stop barcodes of the layout barcodes used for other purposes, like products to be added to the shopping list.

The ability to add manually input personal recipes to the database stored on Buyer's Computer $1c$ or download other recipes from the Other Data $1i$ via the Communications Network $1e$ or Removable Media $1h$.

The personal automation and shopping system can automatically or ask to substitute similar products for ones not available in the store selected for shopping. It can also substitute more nutriently appropriate products based upon dietary guidelines stored in the database by Buyer $1a$.

Personal automation and shopping system also provides reminder of items not yet pulled from the store shelf, if shopping list was downloaded to a PDA or similar Input/Output Device $1d$.

Additional Embodiments

Additional Embodiment 1: NylSun Tracker™—Description

The NylSun Tracker would be a distributed dPASS system working in cooperation with manufacturers $1g$ to track the safe working life of personal safety equipment like climbing ropes and harnesses made of materials like nylon that deteriorate as they're exposed to the sun. Since the amount of deterioration increases as sun exposure accumulates, at some point, determined by the Manufacturer $1g$ and/or safety organizations (e.g. OSHA), this accumulated deterioration constitutes an unacceptable risk of equipment failure possibly resulting in bodily injury or death. At this point the safety equipment should be retired. Until now, determining this point has been an educated estimate at best. NylSun Tracker makes determining this point more empirical.

The NylSun Tracker™ is comprised of several cooperative elements or steps. Safety equipment Manufacturers $1g$ would tag their ropes, harnesses, cords and other safety products, with a unique KDED $1b$ readable identifier, like a barcode, and provide buyers $1a$ with information on the maximum recommended amount of sun exposure for each tagged product, Manufacturers $1g$ could distribute this information at the time of purchase, via a website, etc. They might also maintain a dPASS accessible database of these identifiers. Buyers log sun exposure for each tagged item into the NylSun Tracker™ application database via manual or KDED input (a KDED that records the date and time of each scan or data capture is the preferred embodiment). The NylSun Tracker™ application would notify Buyers $1a$ when the equipment had exceeded it's useful life, note this in the manufacturer's $1g$ database $1i$ or other database $1i$ so that anyone buying a $2^{nd}$ hand safety equipment could have an idea if the equipment were still safe to use. The NylSun Tracker™ and Database $1i$ could also provide additional information like: recalls, safety bulletins, manufacture date, etc. This embodiment can be enhance further with a Global Positioning System (GPS) enabled KDED or a separate GPS receiver.

An alternate embodiment uses a central server connected to Communications Network $1e$, and a KDED and/or GPS enabled mobile phone or other device connected to Communications Network $1e$, instead of Buyer's Computer $1c$.

NylSun Tracker™—Operation

Buyer $1a$ would use NylSun Tracker™ by:
1. Loading the safety equipment information into the NylSun Tracker™ application,
2. Recording—either manually or by capturing the identifier with KDED $1b$—the equipment identifier, date, and time the safety equipment is removed-from and returned-to its lightproof/resistant container. He/she also records or captures his/her location or latitude—if known—and any falls arrested by the equipment or chemical exposures using the Quick-Scan card of FIG. 39;

3. Assuming a minor fall, Buyer 1a would capture the Quick-Scan identifier 39c for a minor fall 39a;
4. This information is transferred or input to the NylSun Tracker™ application along with all other KDED captured identifiers. The router module of the KDED upload module routes NylSun Tracker™ and safety identifiers to the appropriate list. After upload of the KDED 1b is completed, the NylSun Tracker™ evaluation module updates its records based on the new information, including: computing length of exposure from the removal/storage identifier time-stamps, time of day and year, any falls, the location and weather, if they were recorded, or if dPASS has access to Other Data 1i, such as online weather reports.
5. NylSun Tracker™ accumulates and tracks this data, alerting Buyer 1a and updating Seller 1f, Manufacturer 1g, and/or Other Data 1i, such as a safety organization, when the equipment reaches the end of its safe life.

Additional Embodiment 2: SafetyTracker™—Description

SafetyTracker™ uses most of the same processes as NylSun Tracker™, except that it always pairs together the last two captures of other safety identifiers that are separated by least a predetermined interval of time or days. It's used to track routine testing and maintenance for ordinary safety equipment like: fire extinguishers (i.e. checking the pressure and loosening the fire suppressant by shaking), tripping ground fault interrupters (GFCI)'s and testing smoke alarms monthly, etc.

FIG. 1—Additional Embodiments

Additional embodiments for the Keyless Data Entry (KDE) Device 2 include: Symbol Technology's CyberPen™ or scanner enabled Palm Pilot, Videx Inc's LaserLite, LaserLite Pro, or TimeWant II portable scanner; optical character recognition via a image scanner, camera, or optical device, or any other keyless data entry method that is or may become available (e.g. reading a radio frequency (RF) tag on the product). Additional embodiments like the Videx LaserLite Pro and TimeWand II have the added benefit of allowing Buyer 1a to type UPC's directly into the KDED 1b via their embedded keypad; a significant advantage when trying to add a product with a poorly defined identifying symbology (e.g. a badly printed UPC barcode with insufficient contrast between light and dark bands, a curved or wet surface, etc.) Because keyless data entry devices like these also contain a human readable display (e.g. a liquid crystal alphanumeric display) they can also provide some of the functions of the Buyer's Input/Output Devices 1d. Additional embodiments for the Buyer's Computer 1c include Apple™ MacIntosh™ PC's, Linux™ PC's, Pocket PC's™, Palm™ personal digital assistants, or any other programmable, general or special purpose computing device.

Additional embodiments for the Buyer's Input/Output Devices 1d can also include, but not be limited to: sensors for determining product consumption amounts (e.g. a weight sensitive placement and digital camera that sends the Buyer's Computer 1c weight and images of each meal course {e.g. meat} added to a family members plate via a Communications Network 1e), results of such consumption (e.g. a cholesterol sensor which sends a family member's periodic cholesterol levels to the Buyer's Computer 1c via a Communications Network 1e for correlation with the previous consumption amounts); thereby allowing the software portion of the personal automation and shopping system to provide feedback to Buyer 1a via Buyer's Computer 1c or Buyer's Input/Output Devices 1d.

Additional embodiments of FIGS. 15, 22-25 would print the characters in an optical character recognition (OCR) found for feedback into Buyer's Computer 1c after delivery of the order or the shopping trip to automate the process of removing the products that were bought from the current shopping list and carrying forward those products that weren't bought.

The Quick Scan Card 1L can also be embodied as barcoded menu items at participating restaurants. This enables Buyer 1a to use personal automation and shopping system when embodied for the grocery supply chain to track nutritional information for meals eaten out at participating restaurants.

FIGS. 2-24—Additional Embodiments

Additional embodiments can include a running total for the current shopping list once a particular Seller 1f has been selected, a connection to Seller 1f has been established across the Communications Network 1e, and assuming the Seller 1f chosen to provide the products on the current shopping list has chosen to use the modules of the personal automation and shopping system that provide Buyer 1a with real time price information.

Additional Embodiment 1—Operation

In additional embodiments of personal automation and shopping system like for the office supply market, Catalog & Cookbook 1k might include publishing projects (e.g. producing a resume, newsletter, or corporate annual report) where scanning that projects barcode or other identifying symbology/tag would add all the office supply products to the shopping list, and any equipment that wasn't already identified to the personal automation and shopping system by Buyer 1a as being available to Buyer 1a, instead of recipes. Similarly, if personal automation and shopping system is embodied for the construction industry, the Catalog & Cookbook 1k and the Removable Media 1h might contain building projects and instructions instead of cooking recipes and instructions. One important and novel aspect of the inventing being is superior flexibility, and easy adaptability to a wide variety of markets, where most of the changes occur in the product, project/recipe, and instructional data stored in and provided with the personal automation and shopping system.

Additional embodiments of personal automation and shopping system can allow Seller 1f to send Buyer 1a suggestions on specials or other products Buyer 1a might like given the items on the pull list. The preference for this additional embodiment of the personal automation and shopping system would to an opt-in system, in keeping with the win-win-win nature of the personal automation and shopping system (i.e. Buyer 1a might accept this intrusive advertising for some sort of compensation or reward from Seller 1f or manufacturer 1g, such as a discounted or fully subsidized KDED 1b or Buyer's Input/Output Device 1d). However, the personal automation and shopping system doesn't preclude personal automation and shopping system from being used in a less than balanced triple-win scenario (i.e. Buyer 1a get only a little benefit while Seller 1f or Manufacturer 1g win a lot.)

Additional embodiments could use FIGS. 15-21 to schedule an outside vendor (e.g. chef, caterer, building contractor, reproduction service, etc.) to complete the project, meal, etc. identified by Buyer 1a using the products selected by Buyer 1a using the personal automation and shopping system.

Additional embodiments allow the Home Market Manager application of the personal automation and shopping system running on Buyer's Computer 1c to suggest which store can provide the greatest number of products on the current shopping list, provide them at the lost price, provide them the fastest, etc. Some of these embodiments are dependent upon which features and embodiments of the personal automation and shopping system Sellers 1f chose to implement.

Buyer 1a use the additional embodiment of barcoded restaurant menu items by either use a personal KDED 1b, which is tied to a particular family member, or first scanning the barcode for a family member followed by the barcode for the restaurant menu items they've ordered. When download into Buyer's Computer 1c this computer uses this information to retrieve the corresponding nutritional data from the restaurant's website, the Removable Media 1h, or the database on Buyer's Computer 1c if this information has already been retrieved and stored. Computer 1c Description—Alternative Embodiments This personal automation and shopping system can also be embodied in other ways. For example, the personal automation and shopping system can be embodied as a wish-list maker (i.e. a way of listing and sharing those products a person would like to receive as a gift {e.g. like a bridal registry}). In this embodiment the personal automation and shopping system provides portable, hands-on selection of the actual item in the store, which is a significant improvement over some past systems which uses either an isolated, stationary kiosk in the Seller 1f's store or a picture on a website. Other features of the personal automation and shopping system, such as printing out a picture on the wish-list, are an improvement over other past systems which does use a portable barcode scanner, but only prints a text listing of the item. Unlike any of the other past systems embodied in this way, this embodiment of the personal automation and shopping system can easily be intergrated with the purchase and shipping portions of the preferred embodiment of the personal automation and shopping system.

FIG. 24—Alternate Embodiment

Instead of the shopping list using the code 3 of 9 barcode described under the preferred embodiment, it could have the normal UPC barcode for the product, so that all the barcodes on the shopping list could be scanned at one time by Seller 1f's POS scanner, instead of scanning each product package as in the current art.

Advantages

From the description above, a number of advantages of my personal automation and shopping system, "Distributed Personal Automation and Shopping Method, Apparatus, and Process", become evident:

(a) My personal automation and shopping system gives the consumer greater freedom and control of their shopping experience and result than the past systems or current methods and systems.

(b) My cuts shopping time significantly. This can range from 50% to more than 90% depending upon the level of retailer participation. With no retailer participation, shopping time can be cut by 50%, because the personal automation and shopping system provides the shopper with a clearly printed list or PDA display organized by standard catagories (e.g. dairy products, canned goods, etc.). With minimal retailer participation (i.e. providing the consumer with their store's inventory and/or layout, shopping time can be cut by 50% to 75%. Store layout information can include the order in which various aisles are laid out to detailing which subcategories of products appear within each aisle (e.g. in the canned goods aisle, canned fruits come before canned vegetables, and within canned vegetables, canned corn comes before canned beans, etc.) With maximum retailer participation (i.e. home delivery), shopping time can be cut by 90% or more.

Conclusion, Ramifications, and Scope

Accordingly, the reader will see that the Distributed Personal Automation and Shopping Method, Apparatus, and Process of this personal automation and shopping system can be used to save product selection time, shopping time, improve product selection and buying accuracy, increase customer loyalty and profits for sellers, repeat purchase and profits for manufacturers. Furthermore, the Distributed Personal Automation and Shopping Method, Apparatus, and Process has the additional advantages in that:

it permits the non-shopping members of a group to more easily select the correct product they're looking for or sample new products without having to go to a seller's location.

it allows the various user segments of a supply chain to work together more easily and at lower cost by allowing each segment to incrementally or progressively adopt additional modules or functions of the personal automation and shopping system previously adopted modules prove their worth it enables information about product usage to more easily be integrated with other data to better enable each user segment of the supply chain to more easily, quickly and effectively attain its goals.

very little data needs to be transmitted across the Communications Network 1e; thereby saving time and communications bandwidth which allows Buyers 1a with slow, low bandwidth connections like dial-up Internet connectivity to still use the personal automation and shopping system with satisfactory speed and richness of the content, which is stored on the Removable Media 1h or only download once when products are added or changed.

Although the description above contains many specificities, these should not be construed as limiting the scope of the personal automation and shopping system but as merely providing illustrations of some of the presently preferred embodiments of this personal automation and shopping system.

Thus the scope of the personal automation and shopping system should be determined by the appended claims and their legal equivalents, rather than by examples given.

Additional Embodiments

1. A process for collecting, manipulating, organizing, storing, displaying, outputting and transmitting information on products or services desired resident on a buyer's personal computer (PC), computer systems, or other data processing system of known type, facilitating acquisition of such items, and updating said data storage with items bought, consumed and location before and after acquisition, comprising:

a. a memory which is able to store a changing database of product information, products desired and acquired, and potential usage along with other information in uniquely addressable locations in either or both volatile and non-volatile said memory, 2. A achine for collecting, manipulating, organizing, storing, displaying, outputting and transmitting information on products or services desired, facilitating acquisition of such items, and updating said data storage with items bought, consumed and location before and after acquisition, comprising:

b. a memory which stores changing database of product information, products desired and acquired, and potential usage along with other information in uniquely addressable locations in either or both volatile and non-volatile said memory, c. a database which is able to store a series of items desired in an easily searchable and counted fashion in said memory, d. multiple product selection means which a buyer/user or other machines can use to store some unique product identifier of said desired items in said database, e. a processor and instructions which is able to manipulate and organize said inputted items and database into various structures of said buyer/user's choosing which are meaningful to said operator or recipient 3. a personal automation and shopping system (process) comprising:
   a. buyers of items including finished products, raw or intermediate materials, and services
   b. manufacturersvendors for said item including retailers, wholesalers, and other businesses facilitating the sale of goods and services between said buyers and said manufacturers of said items 4. a method of improving the selection and acquisition of items by a buyer, a personal automation and shopping system, comprising:
   a. a manual or automated means chosen by said buyer from a plurality of know devices and methods for capturing and storing the unique identifier of items to be acquired, such as products, services, recipe ingredients, project materials and supplies from a multitude of similar and different said items,
   b. one or more catalogs of said items from which buyer can select said items using human readable and searchable information such as name, description, composition, size, quantity, picture and unique identifiers readable by one or more of said devices in (a) above,
   c. a means of transferring said selected items via known Communications Network 1e to a data processor of know type, such as a PC, owned or operated by a Buyer 1a, Seller 1f, or Manufacturer 1g,
   d. a means for said data processor to retrieve, manipulate, store, display, and convey said items in an organized way such as a list or computer file with sufficient detail about said items to be meaningful and useful to Buyer 1a or Seller 1f of said items, or other data processor of know type of said Buyer 1a or Seller 1f which automates some portion of the acquisition of said items,
   e. a means for each Seller 1f to determine the degree of access to their database or inventory of said items, point-of-sale system, and other data processing systems they want to provide to said buyers, what kinds of information they want to make available to said buyers, and what services they want to provide to said buyers including, self checkout, pulling all or a portion of said buyer's acquisition for pickup by said buyer and delivery of acquired items to said buyer,
   f. a means of providing feedback to said buyer's PC for modification or update of said lists stored in said data processor after preceding said list has been acted upon by said Buyer 1a, Seller 1f or their said automating machine,
   g. whereby buyer can acquire said items from any Seller 1f of buyer's choosing from a multitude of said sellers in less time, with greater accuracy, more privacy, more efficiency, and in ways Buyer 1a feels most natural and comfortable using than offered by current methods and past systems systems with their shortcomings, including limited flexibility, limited vendor selection, and limited methods whereby buyer can acquire said items in a variety of different ways at different times, depending on the acquisition method best for Buyer 1a during each acquisition event, such as online ordering for delivery, self-shopping at retail store of any convenient and suitable Seller 1f.

5. The dPASS of claim 4 wherein said user means of choosing include portable and fixed barcode scanners like the Symbol Technologies™ CS-1504 Consumer Memory Scanner, barcode scanning and RFID reading refrigerators or item identifying trash cans, portable voice recorders and voice recognition systems like the Dragon Naturally Speaking Mobile™, and barcode scanning personal digital assistants like the Palm Pilot™ SPT 1800 Series Pocketable Computers, and digital cameras or video recorders.

6. The dPASS of claim 4 wherein unique item identifiers include Universal Product Code (UPC) barcode, forthcoming radio frequency identification tags enclosed with UPC or other unique identifier, product picture, and alphanumeric identifier including name of manufacture, brand, product, flavor and size 7. The dPASS of claim 4 wherein method of storage includes computerized database stored on said PC harddisk, random access memory, other volatile and non-volatile solid state memory, removable media including compact disk read only memory (CD-ROM), digital versatile disc (DVD), ZIP drive, optical disk, and floppy disk, and where item information corresponding to said unique item identifier is retrieved from said database, CD-ROM catalog, printed catalog of items including text, picture, and barcode identifier for each item, a single barcode or other identifier for projects involving use of multiple said items and instructions for completing project, including cooking recipes, construction projects such as a deck or cabinet, and hobby projects where scanning, selecting, otherwise storing said unique project identifier adds all items to shopping list, or just those items not already in buyer's inventory if buyer has configured dPASS to maintain an inventory of items on hand and available for use.

8. The dPASS of claim 4 wherein means of communicating unique item identifiers from said collection device to said PC and from said PC to said vendor data processing systems includes network connections like the Internet or World Wide Web (Web), facsimile transmission of printed list of desired acquisitions via plain old telephone service (POTS) or other switched voice and data network, modem communications over a POTS, direct connection between devices like serial communications or Universal Serial Bus, and wireless connections like infrared, Bluetooth, wireless Ethernet.

9. The dPASS of claim 4 wherein said PC includes International Business Machines™ (IBM) compatible PC's, Apple MacIntosh computers, TablePCs, and Unix computers.

10. The dPASS of claim 4 wherein a vendor can chose to make dPASS available to its own customers in a closed system or participate in the public dPASS with whatever amount of integration they chose. {something about vendor control of participation}

11. The dPASS of claim 4 wherein vendors shall include hardware stores and lumber yards, home improvement warehouses, office supply stores, pharmacies, and grocery stores where each can independently chose what kind and how much information to provide buyers with information on their business including items available, prices, store layouts, and specials or discounts; and where said vendors can independently chose what services to offer to buyer including self checkout by enabling buyer to download their said identifier collection device directly into vendor's POS or scanning the buyer's barcoded shopping list of products being acquired, accepting orders for items via said communications network for delivery or pulling of all or only some items on buyer's transmitted acquisition list (where buyer fetches the remaining items on said list directly from vendor's store shelves) and accepting download or other transfer of unique item identifiers or acquisition list from said buyer's device or storage media to in-store kiosk, customer service representative or other vendor means of accepting said identifiers or list to generate shopping list for buyer's use or use by store personnel to pull items on list for buyer 12. The dPASS of claim 4 wherein organizing said item information in sufficiently meaningful ways shall include display on the PC's visual output device of product information including UPC, manufacture, brand, item name, size, pictures, flavor or other information to help buyer easily distinguish one item from another and where said items can be organized in various ways including by known, categories, alphabetically, and user determined categories, one or more lists of items to be acquired which can be uniquely named by buyer and stored for future use or integration with subsequent shopping lists which can be sorted and displayed in various ways including alphabetically, alphabetically within user defined or generally accepted standard categories like: meats, dairy products, canned goods, pens, paper, notebooks, and where said item identifiers collected by said portable collection device once uploaded into said PC are automatically added to said list or lists as designated by user and said process retrieves and displays said additional item information from said database, where said display of catalog, and where buyer can add more items to one or more lists in known and novel ways including double clicking a displayed item in the catalog, dragging and dropping items, highlighting and selecting items, and speaking items name.

13. The dPASS of claim 4 wherein feedback of information includes buyer scanning UPC barcode with prefix barcode identifying product as coming from said list and meaning that said item has been acquired from said list for each item pulled from vendor shelf and acquired so that said process can delete it from said list after next transfer of data stored in said collection device to said PC, where said transferred information can be collated with nutritional information from said database or said catalog and combined with nutritional information from other items acquired or consumed to provide buyer with feedback on buyer achieve nutritional goals buyer stored in said database on said PC using said process.

14. The dPASS of claim 4 wherein feedback of information includes buyer scanning barcode signifying the start and end of store layout information with all intervening stored UPC's indicating the layout of the specific store and buyer's preferred route through the store, which is then uploaded to said PC and stored in said database and which is used to organize list of items into the order buyer likes to travel through the store and conveyed to buyer's output medium including printout, PDA, TabletPC for display whereby buyer can travel through the store's aisles in the order they find best, most efficient, fastest while reducing backtracking to get missed or forgotten items.

15.

16. a process for operating a data processor of know type as a means for selecting, storing, manipulating, and outputting information about products to be procured from any vendor in ways that are meaningful and useful to individual consumersproviding said products without said data processor being operated independently of vendors data processing systems whereby a buyer running said process on said data processor can acquire said products from any vendor of buyer's choosing from a plurality of vendors in less time, with greater accuracy, with more privacy, or more efficiency that current methods.

17. a process for operating a data processor of know type as a means for synergistically and flexibly connects new and existing known data peripherals including: portable barcode scanners, personal digital assistants (DA), and tablet personal computers (PC) with manufacturers or service suppliers, retailers and consumers into a flexible and dynamic supply chain whereby each participant can determine how much of the personal automation and shopping system they use and how fast they adopt it to best suit their preferred methods of interacting with the supply chain and produces the best results for them, as measured by increased flexibility, reduced stress, more efficient use of time, decreased cost or improved profits.

18. Single-scan addition of all or needed recipe ingredients 19. a method for finding, selecting, storing, organizing, listing items from a multitude of similar and different items to be acquired and acquiring said items from one or more of a multitude of sellers, offering said items from a multitude of manufacturers comprising two or more of the following:
    (a) means for capturing unique identifying symbols of items to be acquired, such as UPC barcode, item name, etc., from a plurality of know input devices, including: keyboard, mouse, keyless data entry devices like barcode scanners, voice recognition, and radio frequency identification,
    (b) sources of said identifying symbols such as printing on said item's packaging, human readable display of said items off a computer readable source, such as a CD-ROM, DVD, or Internet database, or printed catalog of said items including one or more said identifying symbols, including item picture, name, UPC barcode, catalog specific barcode, etc.,
    (c) communication means of know type for transferring said identifying symbols from said input device to data processor of known type owned or operated by said buyer without requiring connection to a public or private communications network or data processor of said seller, comprising:
        (1) communications or input means of know type
        (2) software programmable central processor unit of known type
        (3) volatile and non-volatile memory or storage of known type
        (4) output devices of known type
    (d) software for storing said identifying symbols into lists, files or databases of known type
    (e) machine readable catalogs, databases, files of known type containing additional information about said items accessible using said identifying symbols of said item
    (f) software for updating, retrieving, manipulating, saving, and displaying said identifying symbols and/or other related information of said items for acquisition in ways meaningful and useful to said buyers and sellers, such as a shopping list organized by aisle, shelf and bin for a particular seller according to the route said buyer prefers to make through said sellers store (g) means for buyer to:
  (1) capture layout of stores buyer wants to shop at or accepting layout of said stores from participating sellers,
  (2) identify preferred route through said stores
  (3) store said routes in said buyer controlled data processor
  (4) organize said shopping lists according to said store layout and preferred route of said buyer through said store (h) means for buyer to update said lists stored on said data processor with items actually acquired and those either not found or carried forward on said list for next acquisition action (i) automated or semiautomated means for said buyer to provide said seller with identifying symbols and quantity of said items pulled for acquisition without said seller having to reacquire said identifying symbols from package of said items or purchase more expensive dedicated or special purpose self-checkout systems (j) means for organizing said list of acquisitions in form and format most digestible for each seller who wants to accept electronic requests for purchase of items to be picked up or delivered to said buyers (k) means for performing said computerized functions within the retail store of said sellers by said buyers (l) means for displaying item information on buyers local data processor without connection to a public or private communications network or data processor of said seller (m) optional means for updating information about items such as downloading via a connection to one or more public or private data sources via public or private communications networks of known type or receiving periodic updates on a removable media of known type from said manufacturers or sellers, or vendor of said method whereby adoption resistance of said method by said buyers and sellers and item manufacturers is reduced through incremental adoption of said method in affordable chunks more easily integrated into current methods, whereby:
  (a) said sellers can create a closed supply chain where said buyers can only acquire items from said supply chain;
  (b) said sellers can chose to participate in open supply chain created using said method where said buyer can access item and sales information from said participating sellers, or
  (c) said buyers can improve the speed and accuracy of acquisition while retaining complete independence and maximum flexibility on where, when, and how to acquire items from any seller, whereby said method provides new ways for said sellers and manufacturers to market, sell, delivery items to said buyers and improve their acquisition and retention of said buyers, whereby (c) a process for operating a data processor as a means for selecting, storing, manipulating, and outputting information about products to be procured from any vendor in ways that are meaningful and useful to individual consumers providing said products without said data processor being operated independently of vendors data processing systems whereby a buyer running said process on said data processor can acquire said products from any vendor of buyer's choosing from a plurality of vendors in less time, with greater accuracy, with more privacy, or more efficiency that current methods.

(d) a process for operating a data processor as a means for synergistically and flexibly connects new and existing known data peripherals including: portable barcode scanners, personal digital assistants (PDA), and tablet personal computers (PC) with manufacturers or service suppliers, retailers and consumers into a flexible and dynamic supply chain whereby each participant can determine how much of the personal automation and shopping system they use and how fast they adopt it to best suit their preferred methods of interacting with the supply chain and produces the best results for them, as measured by increased flexibility, reduced stress, more efficient use of time, decreased cost or improved profits.

(e) a method for finding, selecting, storing, organizing, listing items from a multitude of similar and different items to be acquired and acquiring said items from one or more of a multitude of sellers, offering said items from a multitude of manufacturers comprising two or more of the following:

(a) means for capturing unique identifying symbols of items to be acquired, such as UPC barcode, item name, from a plurality of know input devices, including: keyboard, mouse, keyless data entry devices comprising barcode scanners, voice recognition, and radio frequency identification, (b) sources of said identifying symbols such as printing on said item's packaging, human readable display of said items off a computer readable source, such as a CD-ROM, DVD, or Internet database, or printed catalog of said items including one or more said identifying symbols, including item picture, name, UPC barcode, catalog specific barcode, (c) communication means for transferring said identifying symbols from said input device to data processor owned or operated by said buyer without requiring connection to a public or private communications network or data processor of said seller, comprising:

(d) communications or input means of know type (e) software programmable central processor unit (f) volatile and non-volatile memory or storage (g) output devices (h) software for storing said identifying symbols into lists, files or databases (i) machine readable catalogs, databases, files containing additional information about said items accessible using said identifying symbols of said item (j) software for updating, retrieving, manipulating, saving, and displaying said identifying symbols and/or other related information of said items for acquisition in ways meaningful and useful to said buyers and sellers, such as a shopping list organized by aisle, shelf and bin for a particular seller according to the route said buyer prefers to make through said sellers store (k) means for buyer to:

(l) capture layout of stores buyer wants to shop at or accepting layout of said stores from participating sellers, (m) identify preferred route through said stores (n) store said routes in said buyer controlled data processor (o) organize said shopping lists according to said store layout and preferred route of said buyer through said store (p) means for buyer to update said lists stored on said data processor with items actually acquired and those either not found or carried forward on said list for next acquisition action
(q) automated or semiautomated means for said buyer to provide said seller with identifying symbols and quantity of said items pulled for acquisition without said seller having to reacquire said identifying symbols from package of said items or purchase more expensive dedicated or special purpose self-checkout systems
(r) means for organizing said list of acquisitions in form and format most digestible for each seller who wants to accept electronic requests for purchase of items to be picked up or delivered to said buyers
(s) means for performing said computerized functions within the retail store of said sellers by said buyers
(t) means for displaying item information on buyers local data processor without connection to a public or private communications network or data processor of said seller
(u) optional means for updating information about items such as downloading via a connection to one or more public or private data sources via public or private communications networks or receiving periodic updates on a removable media from said manufacturers or sellers, or vendor of said method
(v) means for collecting detailed data about said buyers', demand, shopping behavior, etc.
  whereby adoption resistance of said method by said buyers and sellers and item manufacturers is reduced through incremental adoption of said method in affordable chunks more easily integrated into current methods,
  whereby said sellers can create a closed supply chain where said buyers can only acquire items from said supply chain;
  whereby said sellers can chose to participate in open supply chain created using said method where said buyer can access item and sales information from said participating sellers, or
  whereby said buyers can improve the speed and accuracy of acquisition while retaining complete independence and maximum flexibility on where, when, and how to acquire items from any seller, and
  whereby said method provides new ways for said sellers and manufacturers to market, sell, deliver goods and services to said buyers, improve their acquisition and retention of said buyers, and collect better, more timely, accurate, and detailed data about buyer, buyers' demand, buying habits, etc.
(f) A distributed personal automation and shopping system (dPASS) for selecting, acquiring and tracking/using iventasks from a multitude of similar and different iventasks from one or more of a multitude of sellers of buyers' choosing, comprising:
(w) means for capturing a unique identifier of said iventasks and other data using a key-and-mouseless data entry (KDE) device chosen by said buyer from a plurality of known KDE devices; means for receiving and storing said captured iventask identifiers and data, and other related information on a data processor owned/controlled and operated by said buyer or seller; and means for controlling said data processor to perform at least one of the following manipulations on said stored information: retrieving additional information about said captured iventask identifiers and data, manipulating aggregate information into shopping or pull lists organized to enable a person or other data processing system to more efficiently acquire said items for said buyer, and outputting said lists to output display, media or device of a known type, or to another data processor; updating said lists with iventasks actually acquired; tracking items and quantitites consumed, tasks completed, events attended; creating or maintaining said buyer's route through said store or other physical area, and then organizing said shopping, task, or eventlist according to said route, retrieving and outputting recipes and projects which can be made with items in stock, add additional items to said shopping list necessary to make various said recipes, and provide other information useful to said buyers, sellers and item manufacturers; tracking and outputting information on incentives, coupons, and specials offered by said sellers and manufacturers; whereby said buyer can acquire said items from any Seller of buyer's choosing from a multitude of said sellers in less time, with greater accuracy, more privacy, more efficiency, less stress over forgotten items or getting the wrong item, and in ways most natural and comfortable to said buyer;
  whereby said buyer can acquire said items in a variety of different ways at different times, depending on the acquisition method that is best for buyer during each acquisition event chosen from the group including: electronic ordering for home/office delivery from a participating seller, said electronic ordering for quick pickup at retail store of said seller, self-shopping at retail store of any convenient and suitable Seller, sending a representative to pickup or shop for said items; and
  whereby adoption resistance of said system by said buyers and sellers and item manufacturers is reduced through incremental adoption of said method in affordable increments that are more easily integrated into current methods,
  whereby said sellers can offer said system to said buyers as a closed selection and ordering system thereby improving customer retention, increasing sales, and increasing the quantity and quality of information gathered about said buyers;
1. said KDE device is selected from the group comprising: barcode scanners, and scanner-enabled personal digital assistants, RFID readers, microphones or recording devices combined with voice recognition systems, digital cameras or video recorders and pattern recognition systems, and readers of other rich symbologies or data encoding methods or devices;
(g) A machine for better and faster selection, acquisition, tracking or using of items from a multitude of similar and different items from one or more of a multitude of sellers of buyers' choosing, comprising:
(hh) one or more catalogs of said items from which said buyer can easily find said items using human readable and searchable information and select desired items using a KDE device to capture identifier of said items; means for storing and manipulating said selected items into organized lists for more efficient acquisition of said items; means for communicating said lists to person or other machine responsible for actual acquisition of said listed items; means for updating information stored on said machine including lists stored on said machine with acquisition, consumption, and physical location information for said items, route of said buyer in a store of said seller, item information comprising: description, composition, size, quantity, or a picture; whereby said buyers can select items for acquisition in ways, locations and at times most convenient;

whereby said machine can be owned or operated by said buyer thereby providing said buyer with the freedom to chose any seller from which to acquire said items;

whereby said seller machine can be owned or operated by said buyer thereby providing said buyer with the freedom to chose any seller from which to acquire said items;

whereby said machine can be owned or operated by said buyer thereby providing said buyer with the freedom to chose any seller from which to acquire said items;

whereby buyers without a data process can enjoy be benefits dPASS by using said KDE device, printed catalog, recipe/project book, and said quick-scan sheets to select desired items and then use said data processor at the store of a participating seller to create said shopping list;

(1) The dPASS machine of claim (g) wherein said additional information on said items is provided in human and KDE device readable formats on at least one of the following:

(ll) removable media; specials, promotions, and other distributions by said seller or manufacturer; quick-scan sheet, card, or other one or two sided media listing said items which don't usually possess an identifier capable of capture by said KDE device; and multipage printed catalog of recipes or projects listing instructions, ingredients or materials each with a unique identifier, another recipe-identifying-symbol indicating that all ingredients or materials, or those not on hand if said machine is maintaining an inventory, should be added to said list, and wherein said machine contains the means to use said recipe-identifying-symbol and other stored data to add required ingredients or materials to said list; restaurant menus displaying a KDE device readable identifier for each meal, drink, dessert, side-dish; whereby said buyer has a choice of iventask information sources which enable selection at a variety of locations and situations comprising: 1) using the quick-scan media in the kitchen counter, in a car, or during meetings, 2) using the printed catalog while reclining in an easy chair, waiting on the runway for a plane to take-off when PCs must be turned OFF, 3) quickly and easily finding and selecting iventasks not on hand more quickly from locally available sources than from remote sources over said communications network and when said communications network isn't available, 4) buyers without their own data processor can still select iventasks and then take said KDE device to a participating seller for upload of iventasks selected, 5) means for identifying and outputting to said quick-scan media in human and KDE device readable formats a buyer's most frequently selected items and recipes along with said items' or recipes';

whereby said buyer is free to chose provided or widely available I/O devices and methods he or she is most comfortable with, including: the keyboard or mouse draging-and-dropping items, using arrow and selection keys, cuting-and-pasting, hot-keys, shortcut keys, microphones or recorders and voice recognition, handwriting or graffiti on a tablet PC or personal digital assistant (PDA);

whereby said buyer can search for items more quickly via locally stored catalogs, enjoy the benefits of more timely selection when iventasks are consumed or just completed, while thumbing though a catalog, while looking over coupons and advertisements, browse though an electronic catalog more quickly and more naturally by easily selecting various categories or virtual store aisles and then scrolling or virtually strolling though said categories or aisles;

(h) a process for creating a distributed personal automation and shopping system (dPASS) using programmable data processors, comprising:

(qq) means for interacting with buyer input using a variety of known input/output (I/O) devices (rr)
(i) pull list apparatus (ie list with barcodes): buyer mapped store layout, including scan-to-remove, self checkout, scanner verification
(j) p An apparatus and process for creating a shopping or pull list or device which enables faster checkout by a clerk or self-checkout by said buyer, comprising:

(ss) a data processor which creates said shopping or pull list and outputs it to either:

(tt) a tangible media with human and KDE device readable iventask information including iventask name and qualifiers comprising size or flavor, and an iventask identifier comprising a captioned barcode organized for easy and quick travel through said sellers location where said buyer lines through the identifier of all iventasks not pulled or completed, or scans each iventask identifier on said list as said iventask is pulled or completed; or (uu) a KDE device with integrated means for display information and prompts to said buyer with optional means for accepting in addition to the automated identifier capture means, such that when directed said KDE device prompts said buyer for the next iventask to be pulled or performed, and means to capture the identifier of iventasks actually pulled or completed (vv) a means for said seller to accept input from said shopping/pull list or KDE device of said buyer comprising:

(ww) scanning all unaltered iventask identifiers on said shopping/pull list on said sellers existing POS terminal; or (xx) transferring all iventask identifiers captured during said iventask pull or completion event via communication means;

whereby said buyer enjoys the time saving of a faster checkout and overall iventask acquisition along with fewer movements of physical iventasks between various modes of known iventask conveyance; and whereby said seller enjoys greater productivity and efficiency, greater throughput of buyer through said sellers location, and ability to leverage existing POS systems for new functions at lower costs and effort; hence lower costs and higher profits;

(k) Method for automating man-machine interface and improving buyer efficiency, comprising:

(yy) one or more programmable, general or special purpose data processors capable of:

(zz) interprocessor communication, outputting iventask information and identifier in human readable and keyboardless-and-mouseless data entry (KDE) device readable formats, receiving feedback on said buyer action on said outputted iventasks from said KDE device, and updating iventask information stored based on said feedback; andone or more said KDE devices chosen from a plurality of known KDE devices capable of interacting with said processor(s); whereby said buyer can improve the speed, ease, and efficiency of using outputted iventasks, acting on said outputted iventasks and providing said data processor with updates on said iventask actions thereby enabling said buyer to improve his or her personal efficiency and goal achievement resulting in more free time, more goals or iventasks accomplished and less stress.

(l) A system for finding, selecting, storing, organizing, and listing items from a multitude of similar and different items to be acquired and acquiring said items from one or more of a multitude of sellers, comprising two or more of the following:

(ddd) means for capturing unique identifying symbols of items to be acquired, comprising: UPC barcode, item name, by a plurality of know input devices, including: a keyboard, a mouse, and a keyless data entry device, (eee) means for providing said unique identifying symbols; //wherein said means for providing comprises sources of said identifying symbols comprising at least one of: printing on said items' packaging, human readable display of said items off a CD-ROM, a DVD, an Internet database, or a printed catalog of said items including one or more of said identifying symbols, including an item picture, name, a UPC barcode, or a catalog specific barcode, (fff) communication means for transferring said identifying symbols from said input device to a data processor owned or operated by said buyer without requiring connection to a public or private communications network or data processor of said seller, comprising:

(ggg)

(hhh) software programmable central processor unit of a known type, (iii) volatile and non-volatile memory or storage of a known type, (jjj) output devices of a known type;

(kkk) software for storing said identifying symbols into lists, files or databases;

(lll) software for updating, retrieving, manipulating, saving, and displaying said identifying symbols and/or other related information;

(mmm) means for buyer to:

(nnn) capture layout of stores buyer wants to shop at or accepting layout of said stores from participating sellers, (ooo) //identify preferred route through said stores (ppp) //store said routes in said buyer controlled data processor (qqq) //organize said shopping lists according to said store layout and preferred route of said buyer through said store (rrr) update said lists stored on said data processor with items actually acquired and those either not found or carried forward on said list for next acquisition action (sss) means for said buyer to provide said seller with identifying symbols and quantity of said items pulled for acquisition without said seller having to reacquire said identifying symbols from said item package, purchase more expensive dedicated or special purpose self-checkout systems;

(ttt) means for organizing said list of acquisitions in form and format most digestible for each seller who wants to accept electronic requests for purchase of items to be picked up or delivered to said buyers (uuu) means for performing said computerized functions within the retail store of said sellers by said buyers (vvv) means for displaying item information on buyers local data processor without connection to a public or private communications network or data processor of said seller (www) optional means for updating information about items comprising downloading via a connection to one or more public or private data sources via public or private communications networks, or receiving periodic updates on a removable media from said manufacturers, sellers, or vendors of said method;

whereby adoption resistance of said method by said buyers and sellers and item manufacturers is reduced through incremental adoption of said method in affordable increments that are more easily integrated into current methods;

(a) said sellers can create a closed supply chain where said buyers can only acquire items from said supply chain;

(b) said sellers can chose to participate in open supply chain created using saidsystem where said buyer can access item and sales information from said participating sellers, or (c) said buyers can improve the speed and accuracy of acquisition while retaining complete independence and maximum flexibility on where, when, and how to acquire items from any seller, whereby saidsystem provides new ways for said sellers and manufacturers to market, sell, and deliver items to said buyers and improve their acquisition and retention of said buyers, 6. The dPASS system of claim (1) wherein the means for providing further comprises machine readable catalogs, databases, or files containing additional information about said items accessible by using said identifying symbols of said item.

7. The system of claim (1), wherein at least one of said identifying symbols and other information is provided in the form of a shopping list organized by aisle, shelf and bin for a particular seller according to the route said buyer prefers to make through said seller's store 8. A method of improving selection and acquisition of items by a buyer and sale of said items by a manufacturer and seller, comprising:

(xxx) providing one of a manual means or an automated means to be chosen by said buyer from a plurality of know devices and methods for capturing and storing a unique identifier of items to be acquired comprising products, services, recipe ingredients, project materials or supplies, wherein said items are to be acquired from a multitude of similar and different said items;

(yyy) providing one or more catalogs of said items from which said buyer can select said items using human readable and searchable information and select items by capturing a KDED readable identifier with said KDED;

(zzz) providing a means of transferring information about said selected items via known Communications Network to a data processor owned or operated by a Buyer, Seller, or Manufacturer;

(aaaa) providing a means for said data processor to retrieve, manipulate, store, display, list, or otherwise convey information about said items in an organized way meaningful and useful to said buyer or seller, or other data processor, (bbbb) providing a means for each Seller to select: the degree of access to their database or inventory of said items, point-of-sale system, and other data processing systems to provide to said buyers, what kinds of information they want to make available to said buyers, and what services they want to provide to said buyers including. //self checkout, pulling all or a portion of said buyer's acquisition for pickup by said buyer and delivery of acquired items to said buyer, (cccc) providing a means for providing feedback to said buyer's dataprocessor for modification or update of said lists stored in said data processor after said list has been acted upon by said Buyer, Seller or their said data processor;, whereby buyer can acquire said items from any Seller of buyer's choosing from a multitude of said sellers in less time, with greater accuracy, more privacy, more efficiency, and in ways said buyer feels most natural and comfortable; and whereby said buyer can acquire said items in a variety of different ways at different times, depending on the acquisition method that are best for buyer during each acquisition event including one or more of: online ordering for delivery, self-shopping at retail store of any convenient and suitable Seller.

(m) A modular, incrementally adoptable, integrated system of processes computers for automating selection, storage, editing, outputting and managing usage of products or services to be bought from a supply chain, comprising:

(dddd) one or more off-the-shelf keyless data entry devices for acquiring and storing in memory the machine-readable identifier for each product or service to be acquired or managed;

(eeee) one or more programmable computers each comprising input/output devices, one or more data processors, and memory; wherein and communications systems;

(ffff) zero or more sellers or providers of products or services accessible physically in the real world or electronically;

(gggg) zero or more manufacturers of products accessible physically in the real world or electronically;

(hhhh) a paper catalog of products accessible by humans and machines along with recipes or projects and instructions;

(iiii) removable data storage containing at least the same information contained in the catalog along with multimedia content;

(jjjj) one or more input/output devices that can at least print information stored in said computer and possibly download the shopping list and other information from said computer for manipulation or use while using the items acquired via this personal automation and shopping system or while acquiring such products (kkkk) selective connections through an existing communications network to sellers, manufacturers, the personal automation and shopping system manufacturer, the input/output devices, or other sources of information (llll) processes delineating the relationship and interaction between the components and segments;

(mmmm) software controlling one or more component of the personal automation and shopping system listed above and interacting with other components or software of the personal automation and shopping system.

(n) A process for collecting, manipulating, organizing, storing, displaying, outputting and transmitting information on products or services desired resident on a buyer's personal computer (PC), computer systems, or other data processing system, facilitating acquisition of such items, and updating said data storage with items bought, consumed and location before and after acquisition, comprising:

(nnnn) a memory which is able to store a changing database of product information, products desired and acquired, and potential usage along with other information in uniquely addressable locations in either or both volatile and nonvolatile said memory, (o) A machine for collecting, manipulating, organizing, storing, displaying, outputting and transmitting information on products or services desired, facilitating acquisition of such items, and updating said data storage with items bought, consumed and location before and after acquisition, comprising:

(oooo) a memory which stores changing database of product information, products desired and acquired, and potential usage along with other information in uniquely addressable locations in either or both volatile and nonvolatile said memory, (pppp) a database which is able to store a series of items desired in an easily searchable and counted fashion in said memory, (qqqq) multiple product selection means which a buyer or other machines can use to store some unique product identifier of said desired items in said database, (rrrr) a processor and instructions which is able to manipulate and organize said inputted items and database into various structures of said buyer's choosing which are meaningful to said operator or recipient (p) a personal automation and shopping system (process) comprising:

(ssss) buyers of items including finished products, raw or intermediate materials, and services (tttt) manufacturersvendors for said item including retailers, wholesalers, and other businesses facilitating the sale of goods and services between said buyers and said manufacturers of said items

9.

10. The dPASS of claim 4 wherein unique item identifiers include Universal Product Code (UPC) barcode, forthcoming radio frequency identification tags enclosed with UPC or other unique identifier, product picture, and alphanumeric identifier including name of manufacture, brand, product, flavor and size 12. The dPASS of claim 4 wherein means of communicating unique item identifiers from said collection device to said PC and from said PC to said vendor data processing systems includes network connections, facsimile transmission of printed list of desired acquisitions via plain old telephone service (POTS) or other switched voice and data network, modem communications over a POTS, direct connection between devices, and wireless connections. The dPASS of claim 4 wherein said PC includes International Business Machines™ (IBM) compatible PC's, Apple MacIntosh computers, TablePCs, and Unix computers.

The above described cooperative system for improving the buying, selling, and managing of goods and services, completion of tasks, and attending events or keeping appointments may be further described as follows, and the system includes, at least one keyless data entry device and means of capturing said goods, services, events, appointments, and task data using a mouse, keyboard, voice or handwriting recognition, barcode scanner, radio frequency identification (RFID) tag reader; at least one programmable data processor including a CPU, memory, nonvolatile data storage, and input/output peripherals; with a means for accepting data from human and keyless data entry devices, the means being one of a mouse, keyboard, voice or handwriting recognition, port for downloading or receiving barcode scanner or RFID tag data; a means for retrieving or selecting other goods, services, events, appointments, and task data, the means being the data processor with a scanner capture package or other barcodes or RFID tag; a means for manipulating or transforming available goods, services, events, appointments, and task data and other data including from the CPU, memory, and input/output devices for human interaction by use of the data processor, a means for outputting said source data and transformed goods, services, event, appointment, and task information in human, keyless data entry device, or processor readable formats including printouts, downloads to PDA, uploads to websites or servers, the means being the data processor; and a means for storing said goods, services, events, appointments, and tasks by PC database residing in a RAM and nonvolatile storage, the means including one of a hard disk, DVD, CD, and flash drive. The system further includes at least one source of goods, services, event, appointment, and task data readable by at least one: person, said keyless data entry device, and said processor; whereby said system automates the collection, storage, manipulation, and output of data concerning goods and services, accomplishing tasks, attending events and keeping appointments; and whereby the speed, efficiency, quality, and user satisfaction with acquiring goods and services, accomplishing tasks, attending events and keeping appointments is improved.

The cooperative system may be adapted so that said sources of human readable goods, services, event, appointment, and task data and keyless data entry device readable goods, services, event, appointment, and task identifiers include, but are not limited to: UPC barcodes and captions, radio frequency identification tags on product packaging, words and barcodes on printed material, physical objects easily identified by humans with the keyless data entry device readable identifier, barcoded safety equipment, video systems capable of identifying different foods on a plate and estimating the quantity of each, coupons and product catalogs, database file contents displayed on a data processor output device.

The cooperative system may further comprise at least one of: a modular, incrementally adoptable component and a process for automating selection, storage, editing, outputting and managing usage of products and services bought from a supply chain, comprising: at least one off-the-shelf keyless data entry device for acquiring and storing in memory a machine-readable identifier for each product and service to be acquired or managed; at least one programmable computer comprising input/output devices, one or more data processors, memory; and communications systems; at least one provider of products and services; at least one manufacturer of products; a paper catalog of products accessible by machines, the catalog having at least one of recipes, projects and instructions; a removable data storage containing at least the information contained in the catalog along with multimedia content; one or more input/output devices enabled for printing information stored in said computer and enabled for downloading the shopping list and other information from said computer while using the items acquired; selective connections through an existing communications network to sellers, manufacturers, the personal automation and shopping system manufacturer, and the input/output devices; and software enabled for controlling one or more components of the system and enabled for interacting with other components of the system.

The cooperative system may further comprise a means to inform a shopper or a puller of items that correct items on said list or downloaded into said keyless data entry device when pulled for acquisition, a means for downloading said shopping list into a keyless data entry device, such as by using the data processor with an integrated output means for informing said shopper, such as any device capable of providing a signal perceivable by one or more human senses, the next item to pull; a means for prompting the shopper to capture the identifier of said pulled items such as a device capable of providing a signal perceivable by one or more human senses; and a means for providing said shopper with feedback on whether a correct item has been pulled, repeating as necessary until the correct item is verified, said item is skipped, or said shopper indicates said item identifier captured should be saved as additional store inventory, store layout, or update route information of said shopper through said store, the means being, for instance, the device capable of providing a signal perceivable by one or more human senses; whereby said machine improves percentage of correct items pulled, eliminates need for a printed shopping or pull list, integrates update of said seller's inventory or said buyer's route thereby improving future organization of shopping or pull lists and preferred route with fewer steps by said buyer.

The cooperative system has a programmable data processor with a means for accepting event-driven input from said buyer, the means being any input and output device using standard interface elements and functions along with the input and output devices and at least one element chosen from: a single upload window showing prompts, progress, and status using a sequence of status panels; a means for mapping and storing inventory of various sellers, layout of sellers' stores, and preferred route through said sellers' locations and organizing subsequent lists according to said seller inventory, store layout, and preferred route, the means being the data processor; a means for combining, displaying, and storing information over time charting buyer's progress toward various goals such as improving diet and exercise, the means being the data processor; a means for selecting or capturing a single symbol to select all goods, services, events, appointments, and tasks comprising recipe ingredients, project materials or tasks associated with that summary identifier and adding them to said event, task, shopping or pull list, the means being the data processor, a means for storing and combining various lists such as holiday dinner with weekly grocery purchases into a single list for the next event such as a shopping trip, the means being the data processor; a means for seller to combine said lists from several buyers for more efficient pulling by one individual the means being the data processor, a means for outputting goods, services, event, appointment, and task lists in various languages and various type of prompts including audiovisual prompts on said keyless data entry device, pictures on printed lists, audio prompts on MP3 players, the means being the data processor; a means for creating various quick-scan lists and media, the means being the data processor; a means for dividing said goods, services, event, appointment, and task lists in various ways for pulling or completion by different people or systems, organized by typical aisle, side, and shelf or bin along said buyer's preferred route through real-world store of said buyer's preferred specialty produce and meat market while sending all other items on said shopping list to lowest priced participating commodity-priced supermarket or superstore via fax or internet after comparing prices and/or availability among participating sellers for subsequent pickup at a specified time by said buyer after self-shopping for said meats and produce, the means being the data processor; a means for sellers to offer buyers said keyless data entry device and said software at reduced cost in exchange for locking said buyer into a shopping system usable only at store(s) of said seller, said seller free to decide how much to participate in an open shopping system with said buyers free to decide if they will acquire a distributed personal automation and shopping method apparatus, and process, the means being the data processor; a means for sellers to offer a cooperative system to buyers without their own data processor, the means being said keyless data entry device and at least one keyless data entry device enabled catalog where said buyer brings said keyless data entry device into said seller's location for upload of goods, services, events, appointments, and tasks by seller or by said buyer at an in-store kiosk running cooperative system, or said buyer uploading goods, services, events, appointments, and tasks to said seller via communications means directly from said keyless data entry device; a means for a seller of a cooperative system to offer sellers and manufacturers new virtual shelf space for goods and services which feature pictures, goods, services, event, appointment, and task information in a fast and rich multimedia format, a relative and targeted marketing and advertising, with beneficial statistics on goods, services, events, appointments, and tasks and buyers, including: when, where, how, and by whom goods, services, events, appointments, and tasks are to be selected, the means being said data processor; a means for automating a man-machine interface and automating tracking of various goods, services, events, appointments, and tasks, the means being the data processor; a means for sellers to incrementally adopt usage of a cooperative system, the means being a store inventory and layout available to buyers; a means for manufacturers to reap increased sales resulting from new advertising, marketing and promotional media, and a micro-buy decision process inherent to the cooperative system, wherein said keyless data entry device can capture re-buy decisions at a point an item is consumed, thereby improving the likelihood of a positive re-buy decision, the means being the keyless entry device; and a means for sellers to offer item location service, recipes, promotional, and an instant invention system at a kiosk in said seller's location to enable a buyer to enjoy the benefits of cooperative system by enabling existing buyers to upload keyless data entry device data, the means being the data processor.

I claim:

1. A system for a user to manage the buying and/or selling of goods or services identified with a code for managing a completion of tasks, attendance at events and appointments, said system comprising:
   at least one data entry device for reading said code;
   at least one programmable data processor including a CPU, memory and nonvolatile data storage, and input/output peripherals, in communication with said data entry device, further including:
   (1) means for receiving input from the user and entering the input into said data processor;
   (2) software for manipulating, sorting, categorizing goods or services and/or adding information associated with particular goods, services, event, appointment, and tasks from said input peripherals;
   (3) means for providing output to the user responsive to said user's command;
   (4) means for storing data concerning said goods, services, events, appointments and tasks forming a database accessible by the user whereby the system provides automated collection, storage, sorting and/or manipulation, and output of data concerning goods and services being purchased, tasks to be accomplished, events to be attended and appointments to keep.

2. The system of claim 1 wherein said code includes Universal Product Code, other barcodes or other symbologies, alphanumeric indicators, or radio frequency identification tags on products or product packaging, pictures, or words on product packaging of said goods and said means for providing output to the user includes a printer and/or a display screen, which displays said database file contents at the user's command.

3. The system of claim 2 for automating the purchase of products identified with said code from a sources of supplies using a communication device, said system comprising:
   at least one keyless data entry device for receiving and/or interpreting said code;
   at least one programmable computer including one or more data processors, memory and input and output devices, said computer in connection with said data entry device and said communication network;
   a catalog identifying items, with said code, available to be purchased from each of said sources and said catalog may be stored in said memory or provided in a printable format;
   removable data storage device connected to said memory for storing or updating said catalog;
   one or more output device(s) for printing data or transmitting said data to said source computer from said data storage device utilizing a modem, and/or the internet or other communications network or more input device(s) for receiving said code from the user representing the product desired to be purchased and;
   software used by said data processor for processing said codes received by said keyless data entry device and received by said input devices, and for connecting to said communications network and for storing in said memory and data storage device wherein the user's computer connects to said source's computer using said communications network such that products selected by the user utilizing said keyless data entry device or input device(s) are purchased by user from the supplier.

4. The system of claim 1 wherein the users are a buyer having a data processor and seller of products having a data processor, said system further including:
   means for downloading a list of product items to be purchased from said buyer's data processor to said seller's data processor and;
   means for informing the user that said list of product items has been received by the seller's data processor.

5. The system of claim 1 for use by a buyer at a seller's store, said system further comprising:
   graphical user interface in connection with said data processor and;
   means for displaying images of said goods and product identification and product information available for purchase from said seller, said images retained in said data storage and/or said memory of said processor wherein said images, product identification and product information may be viewed via said output means and the buyer may select products desired for purchase by utilizing said graphical user interface.

6. The system of claim 1 wherein said data entry means is keyless.

7. The system of claim 1 further including recipes having ingredients wherein each ingredient has an associated code and the whole recipe has another unique recipe list code which will store said recipe list code in said memory or said data storage so said software and said data processor may automatically add all recipe ingredients to said shopping list from said memory.

8. The system of claim 3 further including: a voice synthesizer adaptable to function with a data processor, means for inputting and storing directions associated with each recipe, and software for controlling said voice synthesizer such that output means directs said voice synthesizer to provide speech reading said directions with said ingredients enabling the user to create recipes stored in said data storage by following the directions from said voice synthesizer.

9. The system of claim 1 for use by a buyer in conjunction with seller's store having an inventory, said system further comprising:
   means for providing a representation of the locations of said seller's store inventory and storing said locations of inventory with said memory or data storage device;
   software for creating a shopping list organized in order of the layout of said store
   whereby said stored locations of store inventory comprise the buyer's preferred route through said seller's store.

* * * * *